United States Patent
Shirakawa

(10) Patent No.: US 6,625,985 B2
(45) Date of Patent: Sep. 30, 2003

(54) CONTROL OF TURBOCHARGER

(75) Inventor: Takashi Shirakawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/049,914

(22) PCT Filed: Sep. 12, 2001

(86) PCT No.: PCT/JP01/07920

§ 371 (c)(1),
(2), (4) Date: Feb. 20, 2002

(87) PCT Pub. No.: WO02/29230

PCT Pub. Date: Apr. 11, 2002

(65) Prior Publication Data

US 2002/0170291 A1 Nov. 21, 2002

(30) Foreign Application Priority Data

Oct. 10, 2000 (JP) .......................... 2000-309557
Oct. 5, 2000 (JP) .......................... 2000-306484

(51) Int. Cl.⁷ .............................................. F02D 23/00
(52) U.S. Cl. ................................. 60/602; 60/605.1
(58) Field of Search ............................. 60/602, 605.1

(56) References Cited

U.S. PATENT DOCUMENTS

| 4,697,422 | A | * | 10/1987 | Ueno et al. ................ 60/602 |
| 4,763,476 | A | * | 8/1988 | Hirabayashi ............... 60/602 |
| 5,440,879 | A | * | 8/1995 | Dellora ....................... 60/602 |
| 5,782,092 | A | | 7/1998 | Schultalbers et al. ..... 60/602 |
| 5,987,888 | A | * | 11/1999 | Weisman et al. ......... 60/605.1 |
| 6,247,311 | B1 | * | 6/2001 | Itoyama et al. ............ 60/602 |
| 6,272,859 | B1 | * | 8/2001 | Barnes et al. .............. 60/602 |
| 6,510,692 | B2 | * | 1/2003 | Shirakawa ................... 60/602 |

FOREIGN PATENT DOCUMENTS

| DE | 33 03 350 A | 8/1984 |
| DE | 40 29 086 A | 3/1992 |
| JP | 60-192827 | 10/1985 |
| JP | 8-86251 | 4/1996 |
| JP | 8-338256 | 12/1996 |
| JP | 10-288071 | 10/1998 |

OTHER PUBLICATIONS

Ito et al., "Injection Rate Shaping Technology with Common Rail Fuel System (ECD–U2)," Lecture Papers of the 13$^{th}$ Symposium on the Internal Combustion Engine (Jul. 1996), pp. 73–77.

Mueller H–M et al., "Electronic Boost Pressure and Knock Control System for S.I. Engines with Turbo Charger," *International Conference on Automotive Electronics*, London, GB, No. 346, pp. 43–47, Oct. 28, 1991 (XP000605588).

* cited by examiner

*Primary Examiner*—Thomas Denion
*Assistant Examiner*—Thai-Ba Trieu
(74) *Attorney, Agent, or Firm*—Foley & Lardner

(57) ABSTRACT

A fresh air amount of an engine (1) is controlled by a variable nozzle (53) of a turbocharger (50). A controller (41) calculates an open loop control value of a drive signal of a variable nozzle (53) based on the running state of the engine (1). A target intake fresh air amount of the engine (1) is calculated based on the running state, and a processing value obtained by smoothing the target intake fresh air amount value is calculated (S132). A feedback control value of the drive signal is calculated so that a real intake fresh air amount coincides with the processing value (S367). The variable nozzle (53) is controlled based on the open loop value and feedback control value. By using the processing value as the target value of the feedback control, unstable factors in feedback control resulting from the time delay from operation of the variable nozzle (53) to change of the intake fresh air amount aspirated by the engine (1), are eliminated.

12 Claims, 76 Drawing Sheets

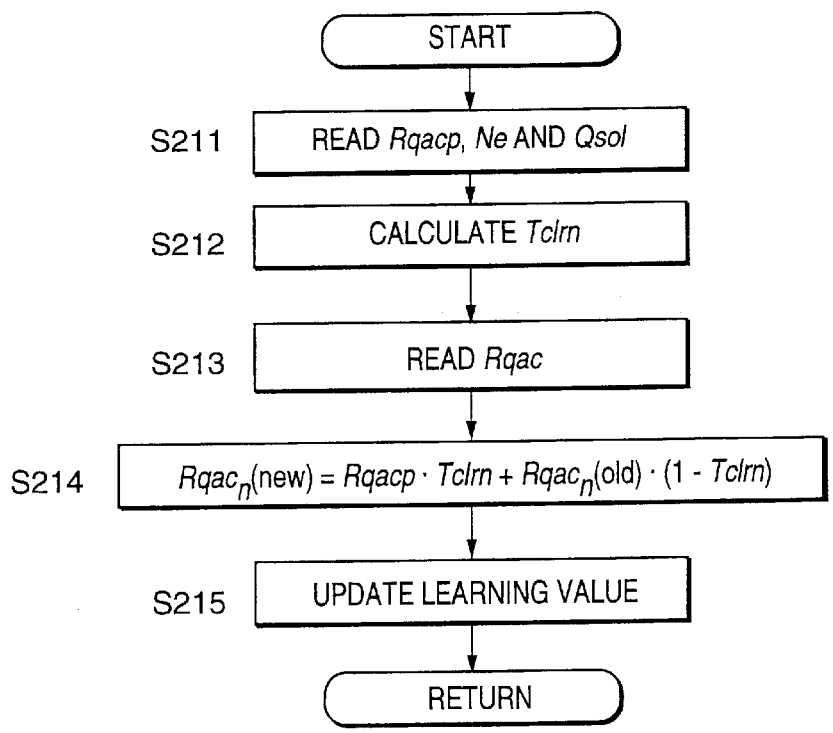

FIG. 61A  Ne 
FIG. 61B  Qsol 
FIG. 61C  tQas0 
FIG. 61D  Tqexhd 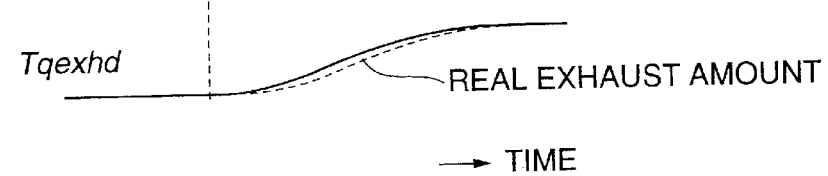
REAL EXHAUST AMOUNT
→ TIME

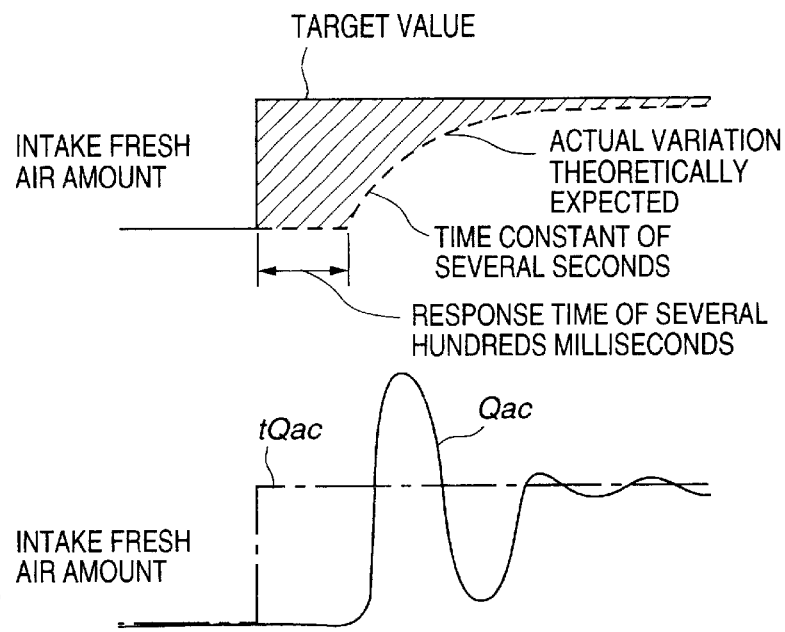
FIG. 104A PRIOR ART
FIG. 104B PRIOR ART
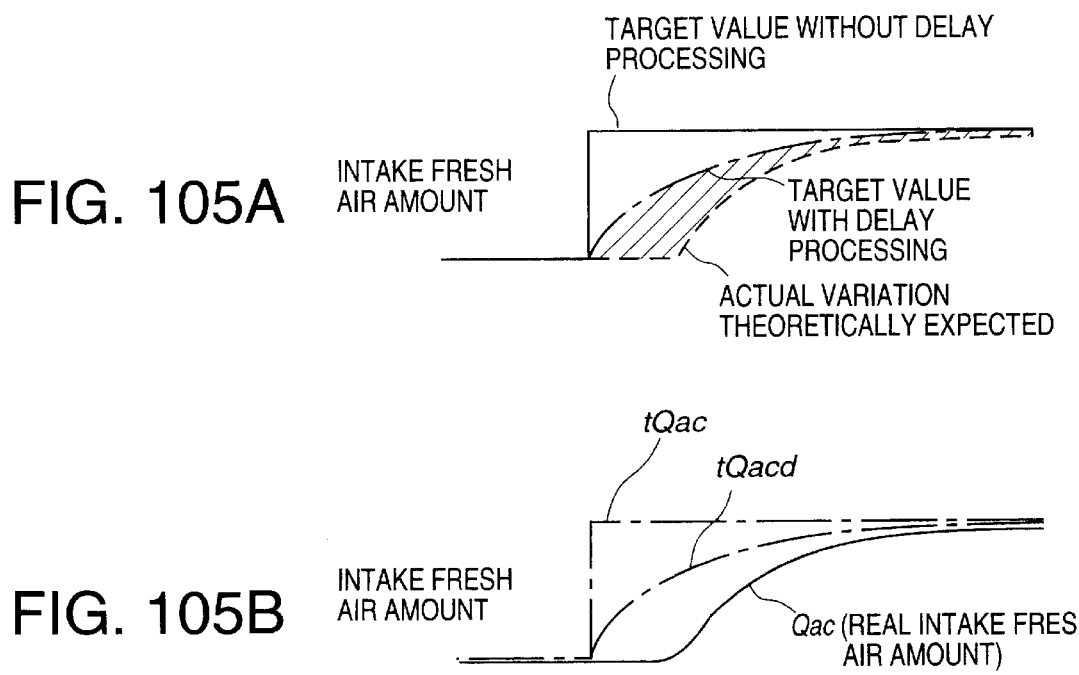
FIG. 105A
FIG. 105B

CONTROL OF TURBOCHARGER

FIELD OF THE INVENTION

This invention relates to control of an intake air amount of an engine provided with a turbocharger.

BACKGROUND OF THE INVENTION

Tokkai Hei 8-338256 published by the Japanese Patent Office published in 1996 discloses a feedback control of a supercharging pressure variation mechanism of a turbocharger of an engine based on a target value.

This prior art technique detects a supercharging pressure or an intake air amount of the engine, and operates the supercharging pressure variation mechanism so that the detected value coincides with a target value that was determined according to the running condition of the engine.

The turbocharger comprises an exhaust gas turbine disposed in an exhaust passage of an engine, and a compressor driven by the exhaust gas turbine which compresses air, and supplies it to an intake passage of the engine.

The supercharging pressure variation mechanism comprises for example a gate which varies an inflow cross-sectional area of exhaust gas to the exhaust gas turbine.

SUMMARY OF THE INVENTION

Such feedback control also compensates scatter in the performance of sensors which detect the supercharging pressure or intake air amount, and the performance of an actuator which operates the supercharging pressure variation mechanism. However, there is a considerable response delay in a process wherein the gate operation of the exhaust gas turbine affects the intake air amount of the engine.

This response delay is specified by a response time until the intake air amount starts to change after the gate operation, and a time constant representing the variation rate of the intake air amount.

The response time is several hundreds milliseconds and the time constant is in units of several seconds.

If the intake air amount is set as a target value and feedback control of the gate opening is performed by the well-known differential/integral feedback control, the following problem will arise due to this response delay.

When the intake air amount changes in a stepwise manner, an integral correction value in feedback control accumulates due to the response delay in the real fresh air amount.

This accumulation of the integral correction value affects the opening command value of the gate, and causes the intake air amount to oscillate around the target value. In an engine which performs exhaust recirculation (EGR) which returns part of the exhaust gas to the intake air, oscillation of the intake air amount leads to an impairment of the exhaust gas composition of the engine.

It is therefore an object of this invention to suppress oscillation of the intake air amount of the engine resulting from operation of a supercharging pressure variation mechanism.

In order to achieve the above objects, this invention provides a control device for a turbocharger of an engine, wherein the turbocharger is provided with an exhaust gas turbine driven by an exhaust gas of the engine, a compressor which supplies fresh air to the engine under a supercharging pressure according to a rotation of the exhaust gas turbine, and a mechanism which adjusts a flowpath cross-sectional area of the exhaust gas led to the exhaust gas turbine. The control device comprises a sensor which detects a running state of the engine, a sensor which detects an intake air amount of the engine, and a controller. The controller is functioning to set an open loop control value of the flowpath cross-sectional area based on the running state, set a target intake air amount of the engine based on the running state, calculate a processing value wherein predetermined smoothing is performed on the target intake air amount, calculate a feedback correction amount which makes the intake air amount coincide with the processing value, and control the exhaust gas flowpath cross-sectional area of the mechanism based on the open loop control value and feedback correction amount.

This invention also provides a control method of a turbocharger of an engine, wherein the turbocharger is provided with an exhaust gas turbine driven by an exhaust gas of the engine, a compressor which supplies fresh air to the engine under a supercharging pressure according to a rotation of the exhaust gas turbine, and a mechanism which adjusts a flowpath cross-sectional area of the exhaust gas led to the exhaust gas turbine. The control method comprising detecting a running state of the engine, detecting an intake air amount of the engine, setting an open loop control value of the flowpath cross-sectional area based on the running state, set a target intake air amount of the engine based on the running state, calculating a processing value wherein predetermined smoothing is performed on the target intake air amount, calculating a feedback correction amount which makes the intake air amount coincide with the processing value, and controlling the exhaust gas flowpath cross-sectional area of the mechanism based on the open loop control value and feedback correction amount.

The details as well as other features and advantages of this invention are set forth in the remainder of the specification and are shown in the accompanying drawings.

BRIEF DESCRIPTION OF THE DRAWINGS

FIG. 32 is a diagram describing the contents of a map of an error rate learning value $Rqac_n$ stored by the controller.

FIG. 33 is a flowchart describing a subroutine for updating the error rate learning value $Rqac_n$ performed by the controller.

FIGS. 61A–61D are timing charts describing a variation of an exhaust gas amount of the diesel engine with respect to a variation of a fuel injection amount.

FIGS. 104A and 104B are timing charts describing the variation of the intake fresh air amount under the control of the variable nozzle opening rate according to a prior art.

FIGS. 105A and 105B are timing charts describing the variation of the intake fresh air amount under the control of the variable nozzle opening rate according to this invention.

DESCRIPTION OF THE PREFERRED EMBODIMENTS

Figure 1:
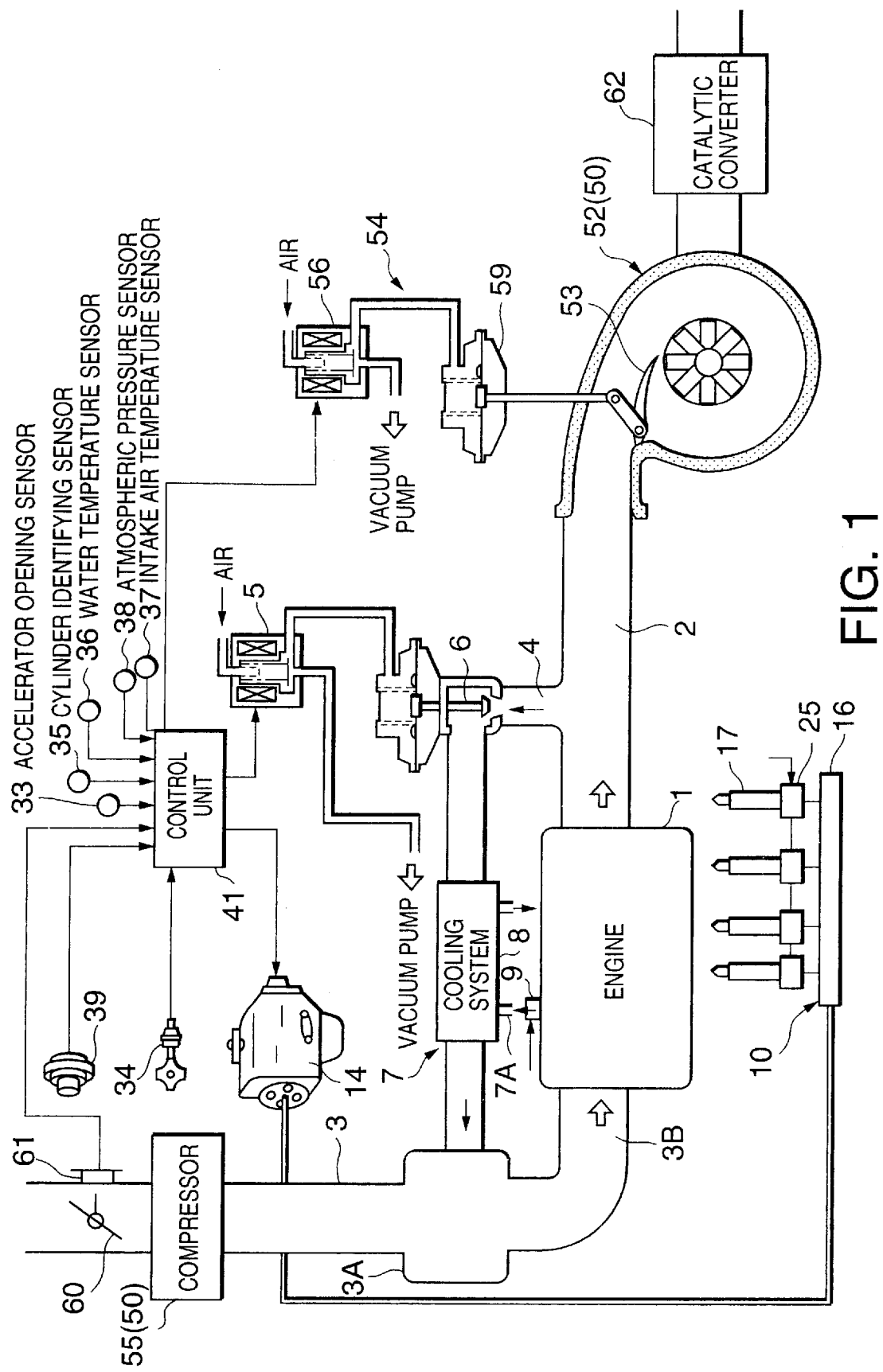
FIG. 1 is a schematic diagram of a control device for a diesel engine according to this invention.

Referring to FIG. 1 of the drawings, a diesel engine 1 comprises an intake passage 3 and exhaust passage 2. The diesel engine 1 is a multi-cylinder diesel engine so constructed that the pattern of heat release is single stage combustion due to performing low temperature pre-mixture combustion. Such a diesel engine is disclosed by Tokkai Hei 8-86251 published by the Japanese Patent Office in 1999. Intake air of the intake air passage 3 is supplied to each cylinder of the diesel engine 1 via a collector 3A.

A compressor 55 of a turbocharger 50 and a intake throttle 60 driven by a throttle actuator 61 are installed in the intake passage 3 upstream of the collector 3A.

A swirl control valve is provided in an intake port leading from the intake passage 3 to each cylinder. When the diesel engine 1 is running at low rotation speed on low load, the swirl control valve closes part of the passage and sets up a swirl in the flow of air flowing into the combustion chamber of the diesel engine 1.

The combustion chamber comprises a large diameter toroidal combustion chamber. This is a combustion chamber wherein a cylindrical cavity of the same diameter is formed on a piston from a cap surface to a base. A conical part is formed at the base of the cavity. As a result, resistance to the swirl flowing in from the outside of the cavity is reduced, and mixing of air and fuel is promoted. Also, due to the shape of the cavity, the swirl diffuses from the center of the cavity to the outside as the piston descends.

The diesel engine 1 comprises a common rail type fuel injection mechanism 10.

Figure 2:
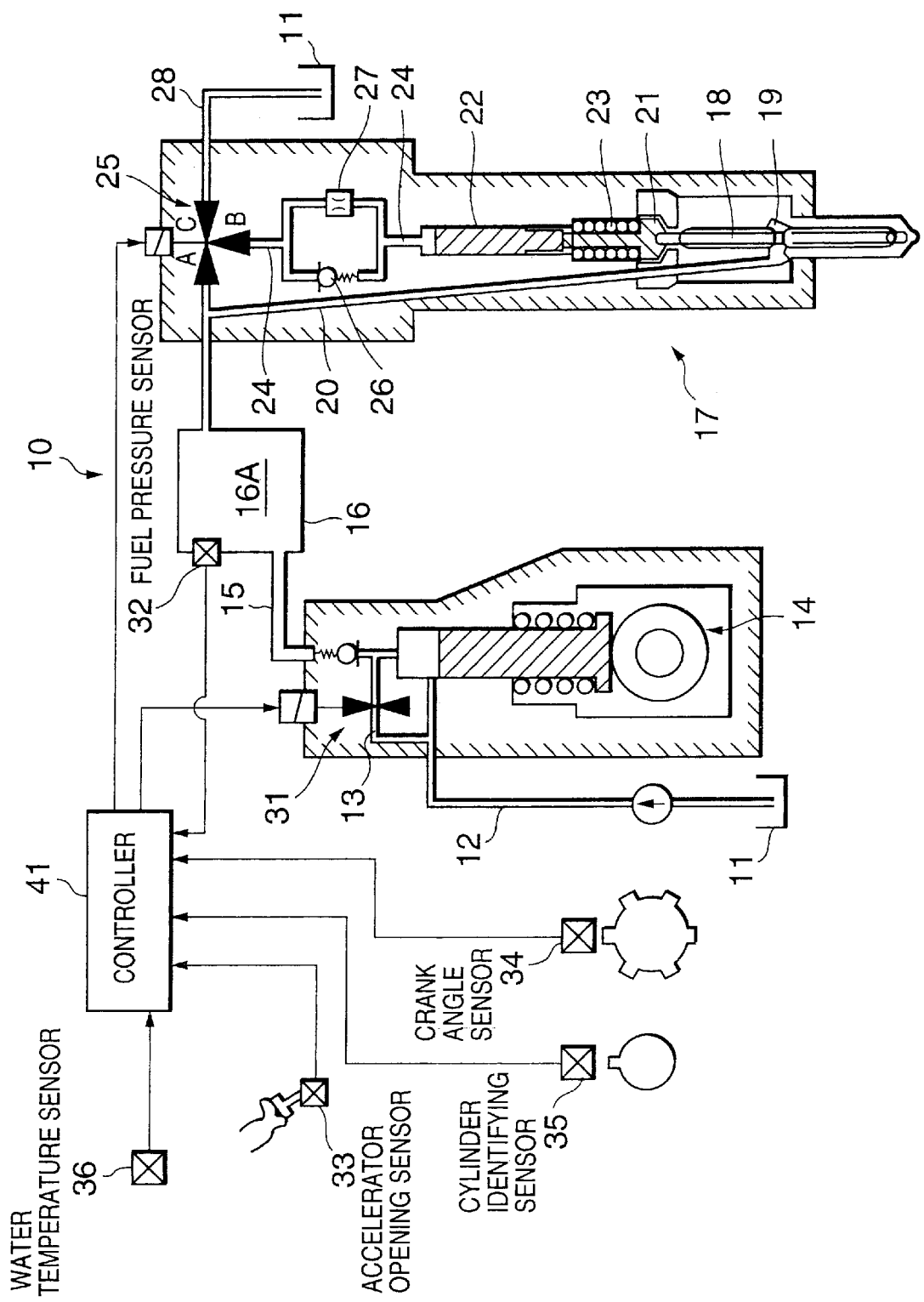
FIG. 2 is a schematic diagram of a common rail fuel injection mechanism with which the diesel engine is provided.

Referring to FIG. 2, a fuel injection mechanism 10 comprises a fuel tank 11, fuel supply passage 12, supply pump 14, pressure accumulating chamber 16A formed in a common rail 16, and a nozzle 17 which is provided for every cylinder. After the fuel supplied from the supply pump 14 is stored in a pressure accumulator 16A via a high pressure fuel passage 15, it is distributed to each of the nozzles 17.

The nozzle 17 comprises a needle valve 18, nozzle chamber 19, fuel passage 20 to the nozzle chamber 19, retainer 21, hydraulic piston 22, return spring 23, fuel passage 24 which leads high pressure fuel to the hydraulic piston 22, and three-way solenoid valve 25 interposed in the fuel passage 24. A check valve 26 and an orifice 27 are also provided in parallel in the fuel passage 24. The return spring 23 pushes the needle valve 18 in the closing direction of the lower part of the figure via the retainer 21. The hydraulic piston 22 comes in contact with the upper edge of the retainer 21.

The three-way valve 25 comprises a port A connected to the pressure accumulating chamber 16A, port B connected to the fuel passage 24 and port C connected to a drain 28. When the three-way valve 25 is OFF, ports A and B are connected and ports B and C are shut off. As a result, the fuel passages 20 and 24 are connected, and high pressure fuel is led to both the upper part of the hydraulic piston 22 and the nozzle chamber 19 from the pressure accumulating chamber 16A. As the pressure-receiving surface area of the hydraulic piston 22 is larger than the pressure-receiving surface area of the needle valve 18, in this state, the needle valve 18 sits in the valve seat, and the nozzle 17 is thereby closed.

In the state where the three-way valve 25 is ON, the ports A and B are shut off, and the ports B and C are connected. Consequently, the fuel pressure of the fuel passage 24 which pushes the hydraulic piston 22 downward is released to the fuel tank 11 via the drain 28, the needle valve 18 lifts due to the fuel pressure of the nozzle chamber 19 which acts on the needle valve 18 in an upward direction, and the fuel of the nozzle chamber 19 is injected from the hole at the end of the nozzle 17. If the three-way valve 25 is returned to the OFF state, the fuel pressure of the pressure accumulating chamber 16A again acts downward on the hydraulic piston 22, the needle valve 18 sits in the valve seat, and fuel injection is terminated.

That is, fuel injection start timing is adjusted by the change-over timing from OFF to ON of the three-way valve 25, and fuel injection amount is adjusted by the duration of the ON state. Therefore, if the pressure of the pressure accumulating chamber 16A is the same, the fuel injection amount increases the longer the ON time of the three-way valve 25.

Further, to adjust the pressure of the pressure accumulating chamber 16A, the fuel injection mechanism 10 comprises a return passage 13 which returns the surplus fuel discharged by the supply pump 14 to the fuel supply passage 12. The return passage 13 is provided with a pressure regulating valve 31. The pressure regulating valve 31 opens and closes the return passage 13, and adjusts the pressure of the pressure accumulating chamber 16A by varying the fuel injection amount to the pressure accumulating chamber 16A.

The fuel pressure of the pressure accumulating chamber 16A is equal to the fuel injection pressure of the nozzle 17, and the fuel injection rate is higher the higher the fuel pressure of the pressure accumulating chamber 16. The three-way valve 25 and the pressure regulating valve 31 function according to the input signal from a controller 41.

The above construction of the fuel injection mechanism 10 is disclosed and known from pp. 73–77, Lecture Papers of the 13th Symposium on the Internal Combustion Engine.

Now, referring again to FIG. 1, after the exhaust gas in the exhaust passage 2 drives an exhaust gas turbine 52 of the turbocharger 50, it is discharged into the atmosphere via a catalytic converter 62. The catalytic converter 62 traps nitrogen oxides (NOx) when the diesel engine 1 operates under a lean air-fuel ratio, and reduces the trapped NOx by hydrocarbon (HC) contained in the exhaust gas when the diesel engine 1 operates under a rich air-fuel ratio.

The turbocharger 50 comprises the exhaust gas turbine 52 and the compressor 55 which supercharges the intake fresh air in the intake passage 3 according to the rotation of the exhaust gas turbine 52. The compressor 55 is provided in the middle of the intake passage 3, and the intake passage 3 supplies air compressed by the compressor 55 to the diesel engine 1. A variable nozzle 53 driven by a pressure actuator 54 is provided at an inlet to the exhaust gas turbine 52.

The pressure actuator 54 comprises a diaphragm actuator 59 which drives the variable nozzle 53 according to a signal pressure, and a pressure control valve 56 which generates the signal pressure according to a signal input from the controller 41.

The controller 41 controls the variable nozzle 53 to reduce the nozzle opening when the rotation speed of the diesel engine 1 is low. As a result, the flow velocity of exhaust gas introduced to the exhaust gas turbine 52 is increased so that a predetermined supercharging pressure is attained. On the other hand, the controller 41 controls the variable nozzle 53 to fully open, when the rotation speed of the diesel engine 1 is high, in order to introduce exhaust gas into the exhaust gas turbine 52 without resistance.

When the air-fuel mixture is burnt in the diesel engine 1, noxious NOx are formed. The NOx amount largely depends on the combustion temperature, and the generation amount of NOx can be suppressed by making the combustion temperature low. This diesel engine 1 reduces the oxygen concentration in the combustion chamber by exhaust recirculation (EGR), and thereby realizes low-temperature combustion. For this purpose, the diesel engine 1 comprises an exhaust gas recirculation (EGR) passage 4 which connects the exhaust passage 2 upstream of the exhaust gas turbine 52 and a collector 3A of the intake passage 3. The EGR passage 4 is provided with a diaphragm type exhaust gas recirculation (EGR) valve 6 which responds to a control negative pressure provided from a negative pressure control valve 5 and a cooling system 7.

The negative pressure control valve 5 generates a negative pressure in response to a duty signal input from the controller 41, and thereby varies the rate of exhaust gas recirculation (EGR rate) via the EGR valve 6.

For example, in the low rotation speed, low load range of the diesel engine 1, the EGR rate is a maximum 100 percent, and as the rotation speed and load of the diesel engine 1 increase, the EGR rate is decreased. On high load, since the exhaust gas temperature is high, intake air temperature will rise if a large amount of EGR is performed. If the intake air temperature rises, NOx will no longer decrease, the ignition delay of injected fuel becomes shorter, and it becomes impossible to achieve pre-mixture combustion. Therefore, the EGR rate is made to decrease in stages as the rotation speed and load of the diesel engine 1 increase.

The cooling system 7 leads part of the engine cooling water to a water jacket 8 surrounding the EGR passage 4, and cools the recirculated exhaust gas in the EGR passage 4. A cooling water inlet 7A of the water jacket 8 is provided with a flow control valve 9 which adjusts the recirculating amount of cooling water according to a signal from the controller 41.

A pressure regulating valve 31, the three-way valve 25, the negative pressure control valve 5, the pressure actuator 54 and the flow control valve 9 are respectively controlled by signals from the controller 41. The controller 41 comprises a microcomputer equipped with a central processing unit (CPU), random access memory (RAM), read-only memory (ROM) and input/output interface (I/O interface). It should be noted that the controller 41 may comprise plural microcomputers.

Signals corresponding to detection values are input to the controller 41 from a pressure sensor 32 which detects a fuel pressure of the pressure accumulating chamber 16A, an accelerator opening sensor 33 which detects an opening Cl of a vehicle accelerator pedal, a crank angle sensor 34 which detects a rotation speed Ne and crank angle of the diesel engine 1, a cylinder identifying sensor 35 which identifies cylinders of the diesel engine 1, a water temperature sensor 36 which detects a cooling water temperature Tw of the diesel engine 1, an intake air temperature sensor 37 which detects an intake air temperature Ta of the diesel engine 1, an atmospheric pressure sensor 38 which detects an atmospheric pressure Pa and an air flow meter 39 which detects an intake fresh air flowrate of the intake passage 3 upstream of the compressor 55. The atmospheric pressure sensor 38 and air flow meter 39 are installed in the intake passage 3 upstream of the intake throttle 60.

Based on the rotation speed of the diesel engine 1 and accelerator opening, the controller 41 calculates a target fuel injection amount of the nozzle 17 and target pressure of the pressure accumulating chamber 16A. The fuel pressure of the pressure accumulating chamber 16A is feedback controlled by opening and closing the pressure regulating valve 31 so that the actual pressure of the pressure accumulating chamber 16A detected by the pressure sensor 32 coincides with the target pressure.

The controller 41 also controls an ON time of the three-way valve 25 according to the calculated target fuel injection amount, and a fuel injection start timing in response to the running conditions of the diesel engine 1 by the change-over timing to ON of the three-way valve 25. For example, when the diesel engine 1 is in a low rotation speed, low load state under a high EGR rate, the fuel injection start timing is delayed near top dead center (TDC) of the piston so that the ignition delay of injected fuel is long. Due to this delay, the combustion chamber temperature at the time of ignition is lowered, and the generation of smoke due to the high EGR rate is suppressed by increasing the pre-mixture combustion ratio. On the other hand, the injection start timing is advanced as the rotation speed and load of the diesel engine 1 increase. This is due to the following reason. Specifically, even if the ignition delay period is constant, the ignition delay crank angle obtained by converting the ignition delay period increases in proportion to the increase in engine speed. Therefore, in order to fire the injected fuel at a predetermined crank angle, the injection start timing needs to be advanced at high rotation speed.

The controller 41 controls the fresh air amount and the EGR amount of the diesel engine 1. The fresh air amount is controlled via the supercharging pressure of the turbocharger 50 via the variable nozzle 53 and the EGR amount is controlled via the EGR valve 6.

However, the supercharging pressure and the EGR amount affect each other, and if the EGR amount is changed, it may be necessary to change the opening of the variable nozzle 53.

As the supercharging pressure control precision and the EGR amount control precision both fall when the engine 1 is in a transient state, it becomes difficult to control these parameters which are affecting each other.

Thus, the controller 41 computes a target intake fresh air amount tQac according to running conditions of the engine 1, and sets a target opening rate Rvnt of the variable nozzle 53 of the turbocharger 50 based on this target intake fresh air amount tQac, and an EGR amount Qec per cylinder in the intake valve position of the diesel engine 1, or an EGR rate Megrd in the intake valve position of the diesel engine 1.

Herein, the target intake fresh air amount tQac is the target value of the intake fresh air amount in the intake valve position of the diesel engine 1. The intake fresh air amount varies according to the supercharging pressure of a turbocharger 50, and a time lag corresponding to the time from when fresh air passes from the compressor 55 through the intake passage 3 to the intake valve, exists between the variation of supercharging pressure and the variation of fresh air amount at the intake valve position. When feedback control of the opening rate of the variable nozzle 53 is performed based on the target fresh air amount tQac, and the target fresh air amount tQac is varied in a stepwise manner, the difference between the target fresh air amount tQac and the real fresh air amount actually aspirated by the cylinder from the intake valve of the diesel engine 1 becomes too large, and the real fresh air amount therefore oscillates considerably until it converges to the target value.

This invention suppresses oscillation of the fresh air amount by smoothing the stepwise variation of the target value. Hence, the controller 41 sets a delay processing value tQacd of the target fresh air amount whereby delay processing is performed on the target fresh air amount tQac, to a feedback control target value of the opening rate of the variable nozzle 53.

The above control performed by the controller 41 will be described with reference to flowcharts. FIG. 3, FIG. 4 and FIGS. 7–13 are known from Tokkai Hei 10-288071 published by the Japanese Patent Office in 1998.

The routine for calculating common parameters used for control of supercharging pressure and the EGR amount will first be described. The common parameters are a target fuel injection amount Qsol of a fuel injection mechanism 10, a target EGR rate Megr of the EGR valve 6, a time constant inverse value Kkin, a real EGR rate Megrd, a cylinder intake fresh air amount Qac, an intake fresh air flowrate Qas0 of the intake passage, the real EGR amount Qec and the target intake fresh air amount tQac.

The time constant inverse value Kkin is a value representing an EGR control delay due to a collector 3A interposed between the EGR valve 6 and the intake valve of the diesel engine 1. The real EGR rate Megrd shows the EGR rate of the intake air which passes through the intake valve of the diesel engine 1. The real EGR rate Megrd varies with a first order delay relative to the target EGR rate Megr. The calculation of these parameters is performed independently of the supercharging pressure control routine, and the EGR amount control routine.

Figure 3:
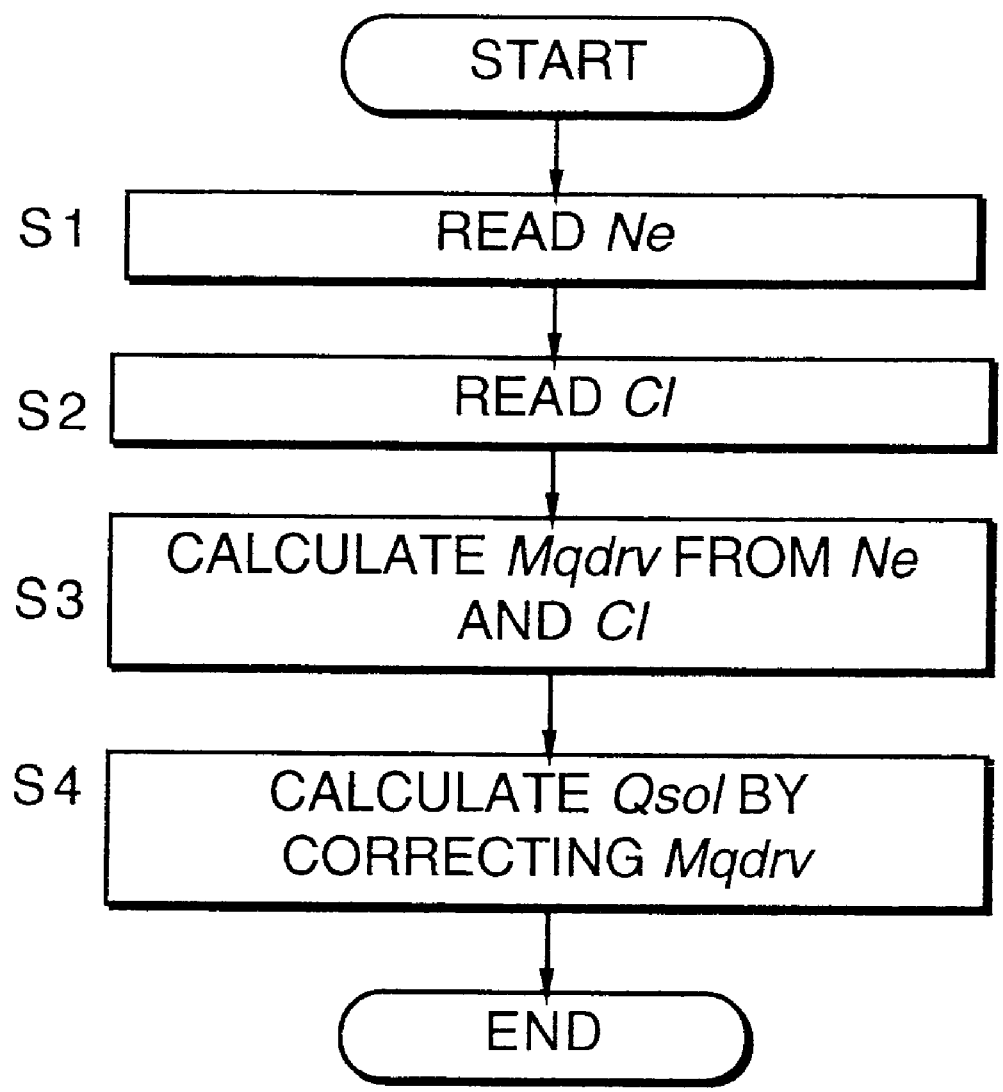
FIG. 3 is a flowchart describing a routine for calculating a target fuel injection amount Qsol performed by a controller according to this invention.

First, referring to FIG. 3, the routine for calculating the target fuel injection amount Qsol will be described. This routine is performed in synchronism with a REF signal output by the crank angle sensor 34 for each reference position of the combustion cycle of each cylinder. In the case of a four-stroke cycle engine, the REF signal is output every 180 degrees for a four cylinder engine, and every 120 degrees for a six cylinder engine.

First, in a step S1, the engine speed Ne is read, and in a step S2, the accelerator opening Cl is read.

Figure 4:
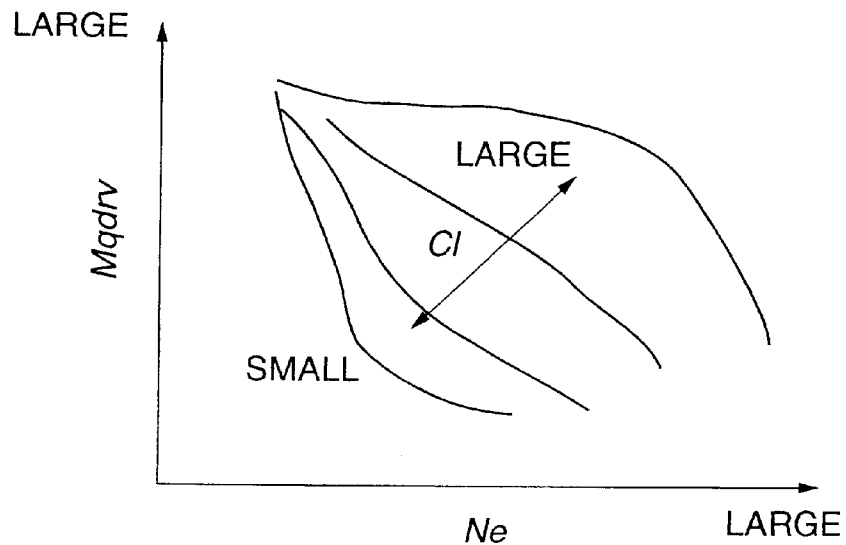
FIG. 4 is a diagram describing the contents of a map of a basic fuel injection amount Mqdrv stored by the controller.

In a step S3, a basic fuel injection amount Mqdrv is calculated by looking up a map shown in FIG. 4 based on the engine rotation speed Ne and the accelerator opening Cl. This map is stored beforehand in the memory of the controller 41.

In a step S4, the target fuel injection amount Qsol is calculated by adding an increase correction based on an engine cooling water temperature Tw, etc., to the basic fuel injection amount Mqdrv.

It should be noted however that the above routine does not consider the residual air amount in the EGR gas. So, according to this invention, the actual fuel injection amount by the fuel injection mechanism 10 is not necessarily equal to the target fuel injection amount Qsol calculated in the above routine, but to a final target fuel injection amount Qfin described later.

Figure 10:
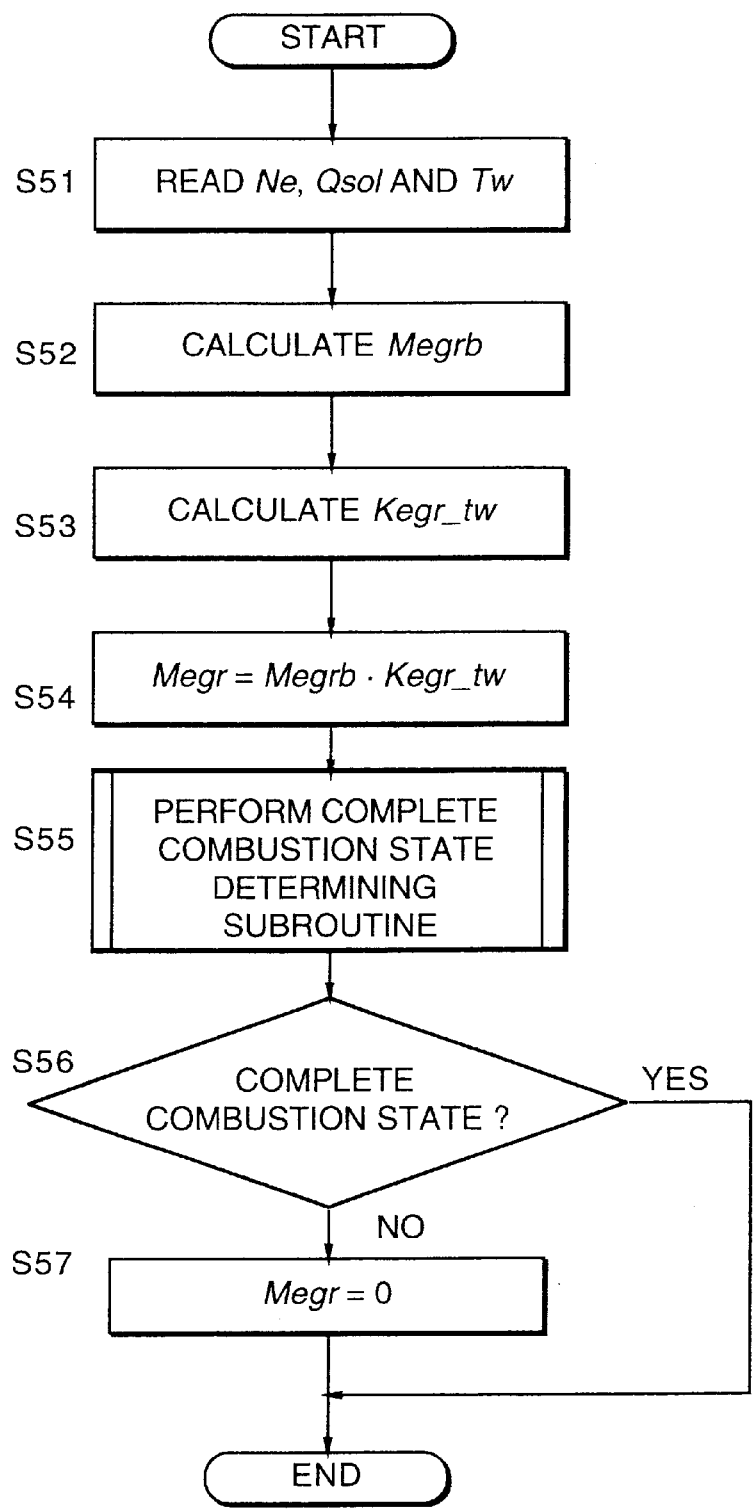
FIG. 10 is a flowchart describing a routine for calculating a target EGR rate Megr performed by the controller.
Figure 11:
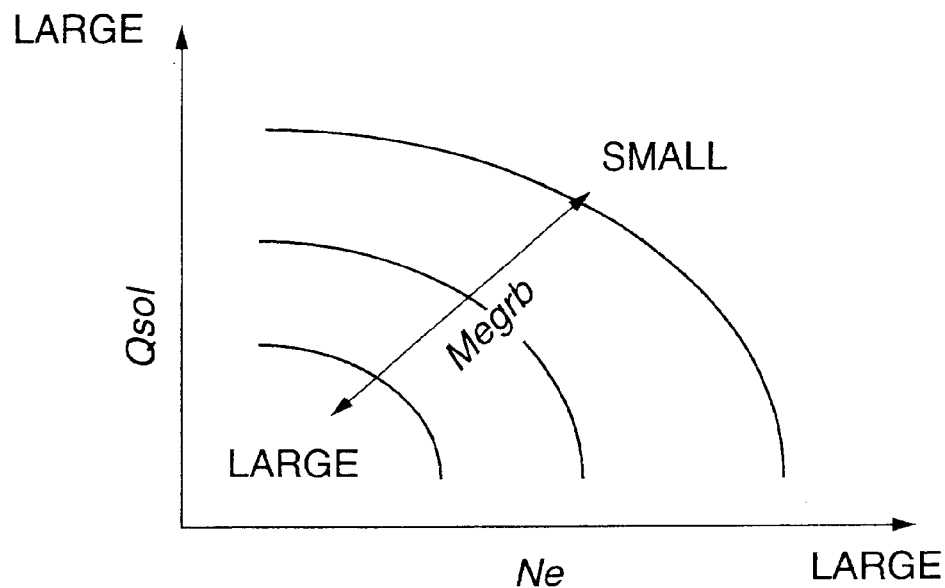
FIG. 11 is a diagram describing the contents of a map of a basic target EGR rate Megrb stored by the controller.

Next, referring to FIG. 10, a routine for calculating the target EGR rate Megr will be described. This routine is also performed in synchronism with the REF signal.

The controller 41 first reads the engine rotation speed Ne, the target fuel injection amount Qsol and the engine cooling water temperature Tw in a step S51.

Figure 12:
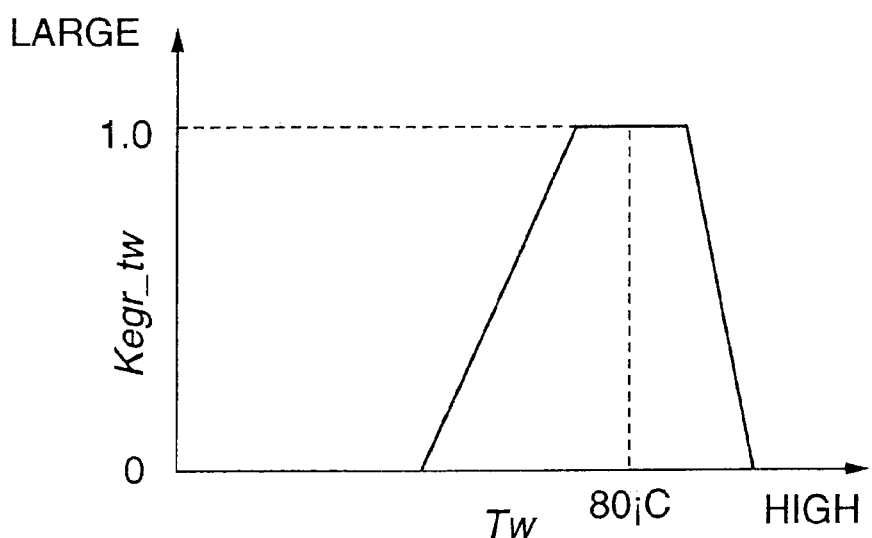
FIG. 12 is a diagram describing the contents of a map of a water temperature correction coefficient Kegr_tw stored by the controller.

In a step S52, referring to a map shown in FIG. 12, the basic target EGR rate Megrb is calculated from the engine rotation speed Ne and the target fuel injection amount Qsol. This map is stored beforehand in the memory of the controller 41. In this map, the basic target EGR rate Megrb is set larger in a region where the operating frequency of the engine is higher. This region corresponds to a region where both the rotation speed Ne and the load are small. In this map, the load is represented by the target fuel injection amount Qsol. When the engine output is high, smoke tends to be generated, so in such a region, the basic target EGR rate Megrb is set to have small values.

Figure 13:
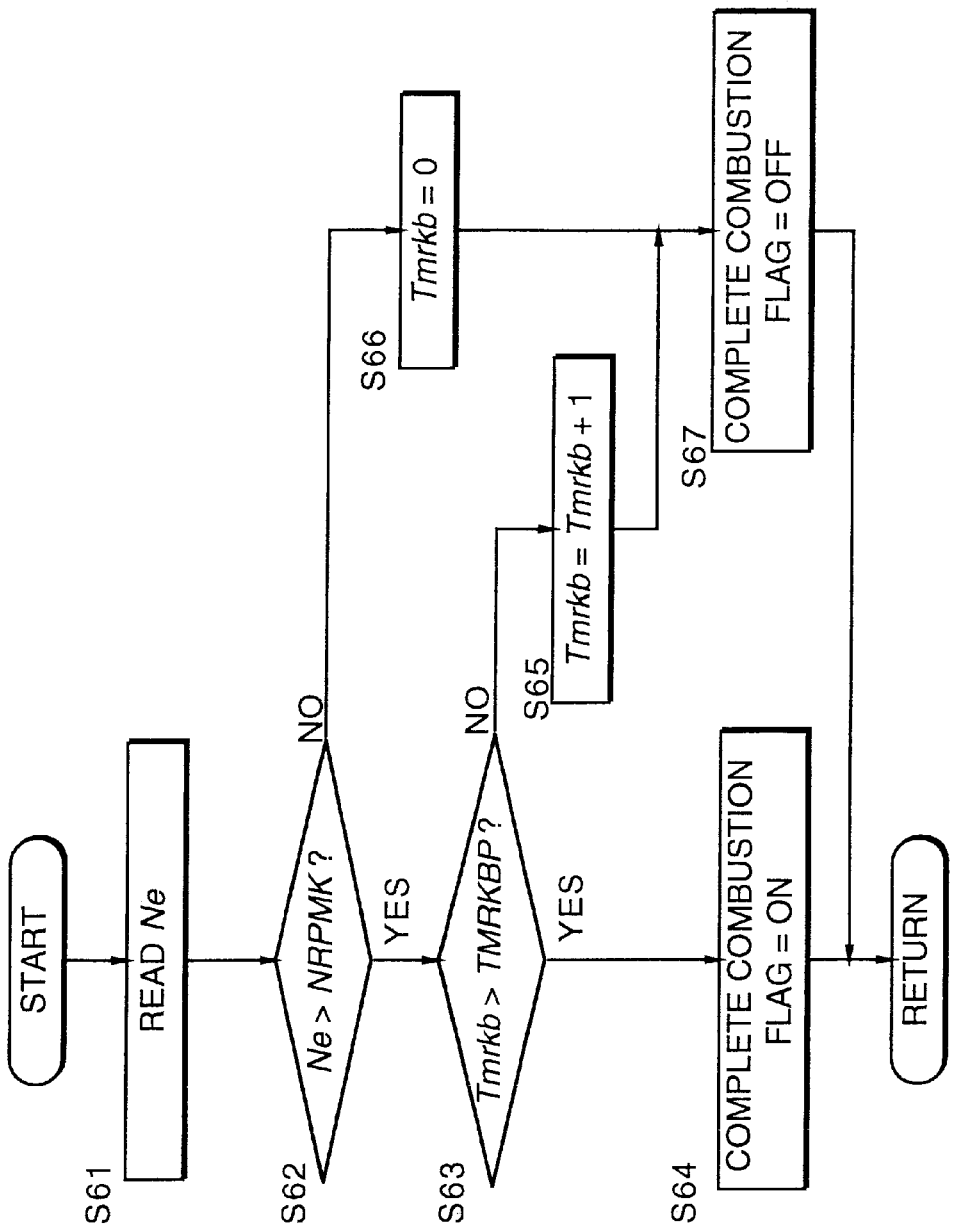
FIG. 13 is a flowchart describing a complete combustion determining routine performed by the controller.

In a step S53, referring to a map shown in FIG. 13, a water temperature correction coefficient Kegr_Tw of the basic target EGR rate Megrb is calculated from the cooling water temperature Tw. This map is also stored in the memory of the controller 41.

In a step S54, the target EGR rate Megr is calculated by the following equation (1) from the basic target EGR rate Megrb and water temperature correction coefficient Kegr_Tw.

$$Megr = Megrb \cdot Kegr\_tw \tag{1}$$

In a step S55, a subroutine shown in FIG. 13 which determines whether or not the diesel engine 1 is in a complete combustion state, is performed.

Describing this subroutine, firstly in a step S61, the engine rotation speed Ne is read, and in a step S62, the engine rotation speed Ne and a complete combustion determining slice level NRPMK corresponding to a complete combustion rotation speed are compared.

The slice level NRPMK is set, for example, to 400 rpm. When the engine rotation speed Ne exceeds the slice level NRPMK, the routine proceeds to a step S63.

Here, a counter value Tmrkb is compared with a predetermined time TMRKBP, and when the counter value Tmrkb is larger than the predetermined time TMRKBP, a complete combustion flag is turned ON in a step S64, and the subroutine is terminated.

When the engine rotation speed Ne is below the slice level NRPMK in the step S62, the subroutine proceeds to a step S66. Here, the counter value Tmrkb is cleared to zero, the complete combustion flag is turned OFF in a next step S67, and the subroutine is terminated.

When the counter value Tmrkb is below the predetermined time TMRKBP in the step S63, the counter value Tmrkb is incremented in a step S65 and the subroutine is terminated.

In this subroutine, even if the engine rotation speed Ne exceeds the slice level NRPMK, the complete combustion flag does not turn ON immediately, and the complete combustion flag only changes to ON after this state has continued for the predetermined time TMRKBP.

Referring again to FIG. 10, after performing the subroutine of FIG. 13, the controller 41 determines the complete combustion flag in a step S56. When the complete combustion flag is ON, the routine of FIG. 10 is terminated. When the complete combustion flag is OFF, the target EGR rate Megr is reset to zero in a step S57, and the routine of FIG. 10 is terminated.

Next, referring to FIGS. 14 and 15, a routine for calculating the time constant inverse value Kkin and the real EGR rate Megrd will now be described. The real EGR rate Megrd varies with a first order delay relative to the target EGR rate Megr.As the calculations of the time constant inverse value Kkin and the real EGR rate Megrd are inter-related, they will be described together.

Figure 15:
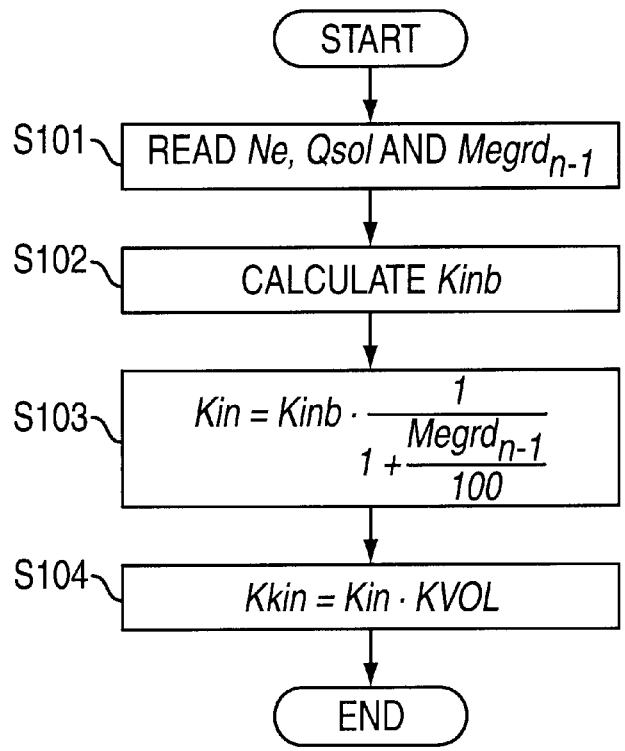
FIG. 15 is a flowchart describing a routine for calculating a time constant inverse value Kkin performed by the controller.

FIG. 15 shows a routine for calculating the time constant inverse value Kkin. This routine is performed in synchronism with the REF signal.

The controller 41 reads the engine rotation speed Ne, the target fuel injection amount Qsol and the immediately preceding value $Megrd_{n-1}$ (%) of the real EGR rate in a step S101. The immediately preceding value $Megrd_{n-1}$ is a value of Megrd calculated on the immediately preceding occasion when the routine was performed.

Figure 16:
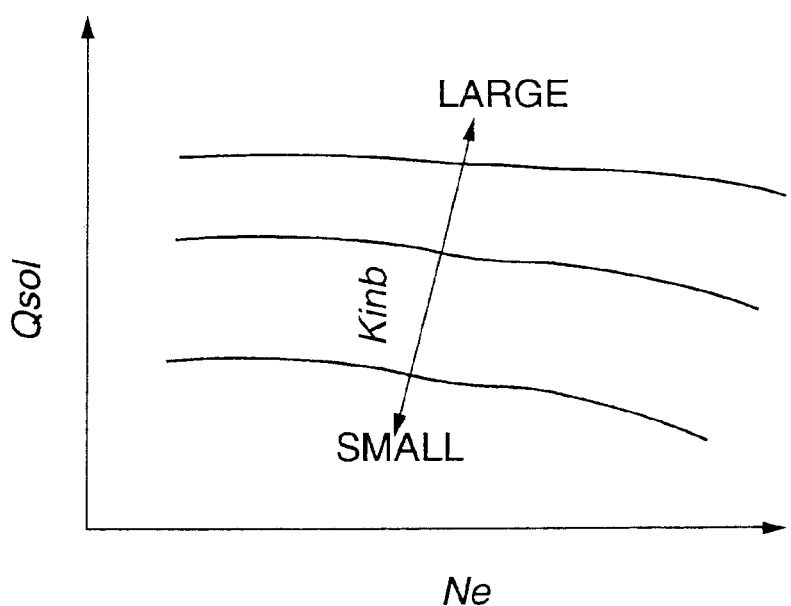
FIG. 16 is a flowchart describing the contents of a map of a volume efficiency equivalent basic value Kinb performed by the controller.

In a step S102, a volume efficiency equivalent basic value Kinb is calculated from the engine rotation speed Ne and the target fuel injection amount Qsol by looking up a map shown in FIG. 16 previously stored in the memory of the controller 41.

In a step S103, a volume efficiency equivalent value Kin is calculated from the following equation (2). When EGR is performed, the proportion of fresh air in the intake air falls, and the volume efficiency decreases. This reduction is reflected in the calculation of the volume efficiency equivalent value Kin via the volume efficiency equivalent basic value Kinb.

$$Kin = Kinb \cdot \frac{1}{1 + \frac{Megrd_{n-1}}{100}} \tag{2}$$

In a step S104, the time constant inverse value Kkin corresponding to the capacity of the collector 3A is calculated by multiplying the volume efficiency equivalent value Kin by a constant KVOL.

The constant KVOL is expressed by the following equation (3).

$$KVOL = (VE/NC)/VM \tag{3}$$

where,
VE=displacement of diesel engine 1,
NC=number of cylinders of diesel engine 1, and
VM=capacity of passage from collector 3A to the intake valve.

Figure 14:
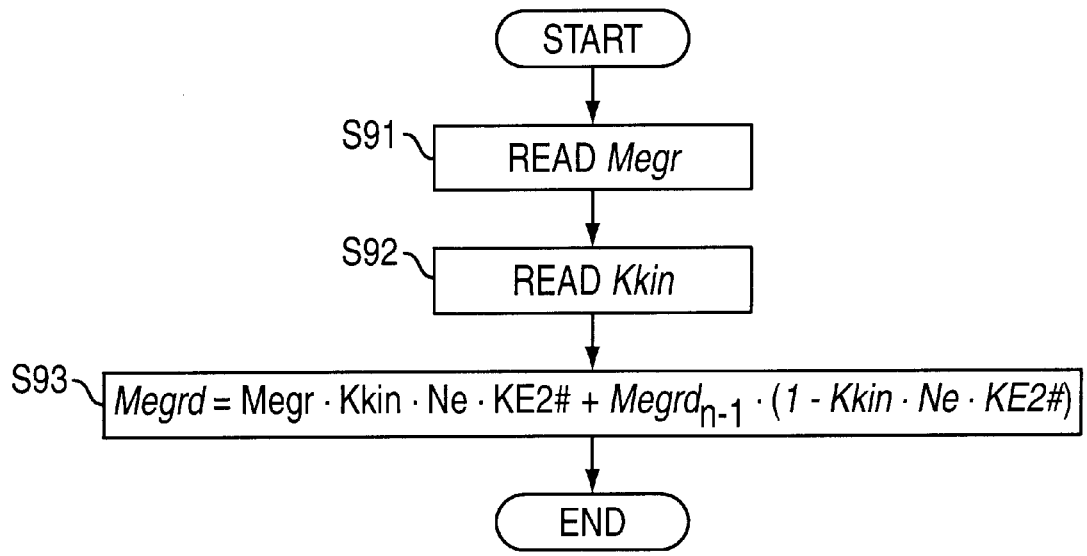
FIG. 14 is a flowchart describing a routine for calculating an EGR rate Megrd in an intake valve position performed by the controller.

FIG. 14 shows the routine for calculating the real EGR rate Megrd. This routine is performed at an interval of ten milliseconds.

The controller 41 first reads the target EGR rate Megr in a step S91.

In a following step S92, the time constant inverse value Kkin is read. The routine of FIG. 15, which calculates the time constant inverse value Kkin, is performed in synchronism with the REF signal, and this routine which calculates the real EGR rate Megrd is performed at an interval of ten milliseconds. Therefore, the time constant inverse value Kkin read here is the time constant inverse value Kkin calculated by the routine of FIG. 15 immediately before the execution of the routine of FIG. 14. Likewise, the immediately preceding value $Megrd_{n-1}$ of the real EGR rate read by the routine of FIG. 15 is the real EGR rate calculated by the routine of FIG. 14 just before the execution of the routine of FIG. 15.

In a step S93, the real EGR rate Megrd is calculated from the following equation (4) using the target EGR rate Megr, immediately preceding value $Megrd_{n-1}$, and time constant inverse value Kkin.

$$Megrd = Megr \cdot Kkin \cdot Ne \cdot KE2\# + Megrd_{n-1} \cdot (1 - Kkin \cdot Ne \cdot KE2\#) \tag{4}$$

where, KE2#=constant.

In this equation, Ne·KE2# is a value to convert the EGR rate per intake stroke of each cylinder, to an EGR rate per unit time.

Figure 7:
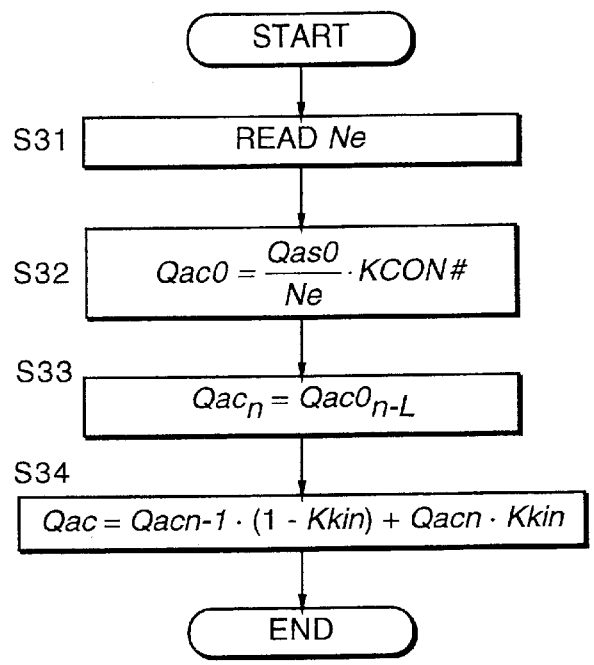
FIG. 7 is a flowchart describing a routine for calculating a cylinder intake fresh air amount Qac performed by the controller.

Next, referring to FIG. 7, a routine for calculating the cylinder intake fresh air amount Qac will be described. This routine is performed in synchronism with the REF signal. The cylinder intake fresh air amount Qac expresses the intake fresh air amount in the intake valve position of one cylinder of the diesel engine 1. The cylinder intake fresh air amount Qac is calculated from the fresh air flowrate Qas0 of the intake passage 3 detected by the air flow meter 39, but as the air flow meter 39 is situated upstream of the compressor 55, the cylinder intake fresh air amount Qac is calculated considering the time until the air which has passed through the air flow meter 39 is taken into the cylinder via the collector 3A.

First, in a step S31, the controller 41 reads the engine rotation speed Ne and the fresh air flowrate Qas0 of the intake passage 3.

In a step S32, the intake fresh air flowrate Qas0 is converted into an intake fresh air amount Qac0 per cylinder by the following formula (5).

$$Qac0 = \frac{Qas0}{Ne} \cdot KCON\# \quad (5)$$

where, KCON#=constant.

The constant KCON# is a constant for converting the intake fresh air flowrate Qas0 of the intake passage 3 into the intake fresh air amount Qac0 per cylinder. In a four-cylinder engine, two cylinders perform air intake in each rotation, so the constant KCON# is 30. In a six-cylinder engine, three cylinders perform air intake in each rotation, so the constant KCON# is 20.

A considerable time is required until the air which has passed through the air flow meter 39 is actually taken into the cylinder. In order to correct for this time difference, the controller 41 performs the processing of steps S33, S34.

In the step S33, considering the time required from the air flow meter 39 to the inlet of the collector 3A, a value $Qac0_{n-L}$ of Qac0 which was EGR flow velocity feedback correction coefficient the routine executed L times ago, is set as an intake fresh air amount Qacn per cylinder at the inlet of the collector 3A. The value of L is determined experimentally.

In the step S34, considering the time difference from the collector 3A to the intake valve of each cylinder of the diesel engine 1, the cylinder intake fresh air amount Qac is calculated by equation (6) of first order delay.

$$Qac = Qac_{n-1} \cdot (1 - Kkin) + Qacn \cdot Kkin \quad (6)$$

where, Kkin time constant inverse value, and $Qac_{n-1}$=Qac calculated on the immediately preceding occasion the routine was executed.

Figure 8:
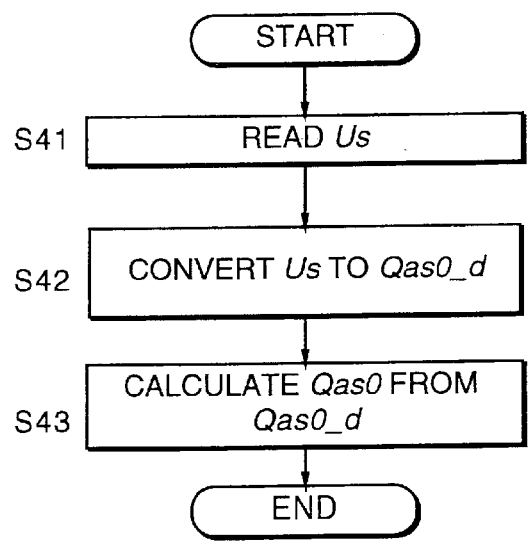
FIG. 8 is a flowchart describing a routine for calculating an intake fresh air flowrate Qas0 of the intake passage performed by the controller.

The signal input into the controller 41 from the air flow meter 39 is an analog voltage signal Us, and the controller 41 converts the analog voltage signal Us into the intake fresh air flowrate Qas0 of the intake passage 3 by performing a routine shown in FIG. 8. This routine is performed at an interval of four milliseconds.

Figure 9:
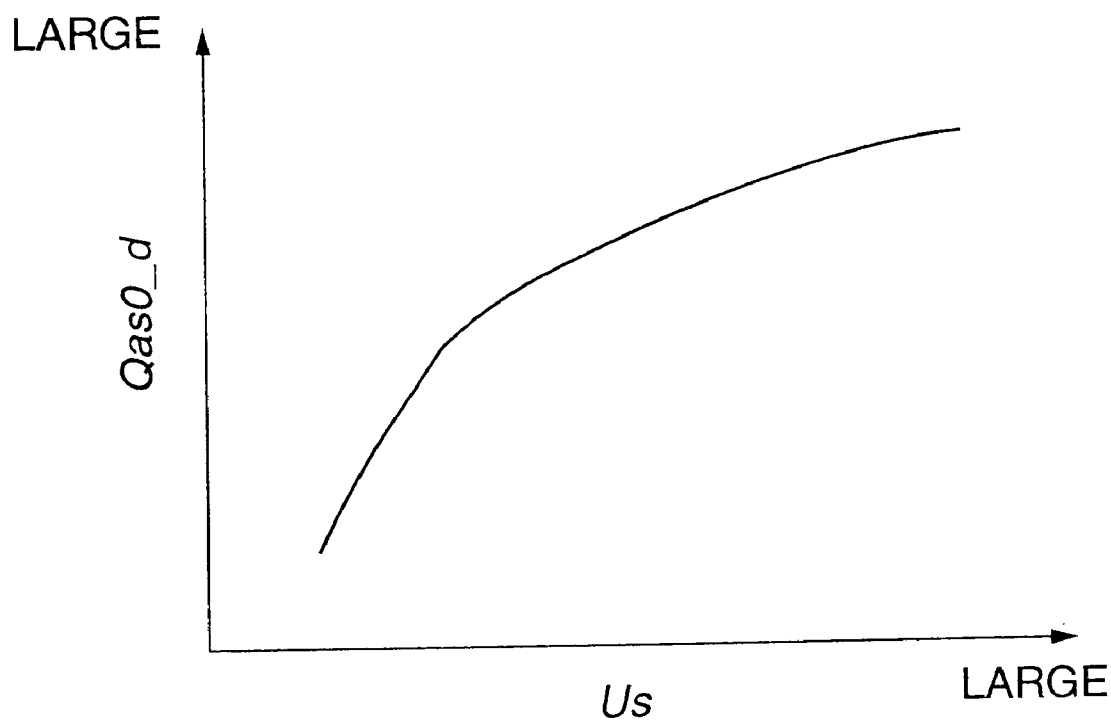
FIG. 9 is a diagram describing the contents of an intake fresh air amount map stored by the controller.

In a step S41, the controller 41 reads the analog voltage signal Us, and in a step S42, converts this into a flowrate Qas0_d by looking up a map shown in FIG. 9. This map is stored beforehand in the memory of the controller 41.

Further, in a step S43, weighted average processing is performed on the flowrate Qas0_d, and the value obtained is taken as the intake fresh air flowrate Qas0 of the intake passage 3.

Next, referring to FIG. 21, a routine for calculating the real EGR amount Qec will be described. The real EGR amount Qec corresponds to an EGR amount per cylinder in the intake valve position. This routine is performed at an interval of ten milliseconds.

Firstly in a step S121, the controller 41 reads the intake fresh air amount Qacn per cylinder at the inlet of the collector 3A, the target EGR rate Megr, and the time constant inverse value Kkin corresponding to the collector capacity. For the intake fresh air amount Qacn per cylinder at the inlet of the collector 3A, a value calculated by the routine of FIG. 7 is used, and for the time constant inverse value Kkin, a value calculated by the routine of FIG. 15 is used.

In a next step S122, an EGR amount Qec0 per cylinder at the inlet of the collector 3A is calculated by the following equation (7).

$$Qec0 = Qacn \cdot Mger \quad (7)$$

In a next step S123, real EGR amount Qec is calculated by the following equation (8) and the routine is terminated.

$$Qec = Qec0 \cdot Kkin \cdot Ne \cdot KE\# + Qec_{n-1} \cdot (1 - Kkin \cdot Ne \cdot KE\#) \quad (8)$$

where, $Qec_{n-1}$=Qec calculated on the immediately preceding occasion the routine was performed.

The EGR amount Qec per cylinder in the intake valve position is equivalent to the real EGR amount per cylinder of the diesel engine 1. In the following description, the EGR amount Qec per cylinder in the intake valve position is referred to as the real EGR amount for simplicity.

Figure 17:
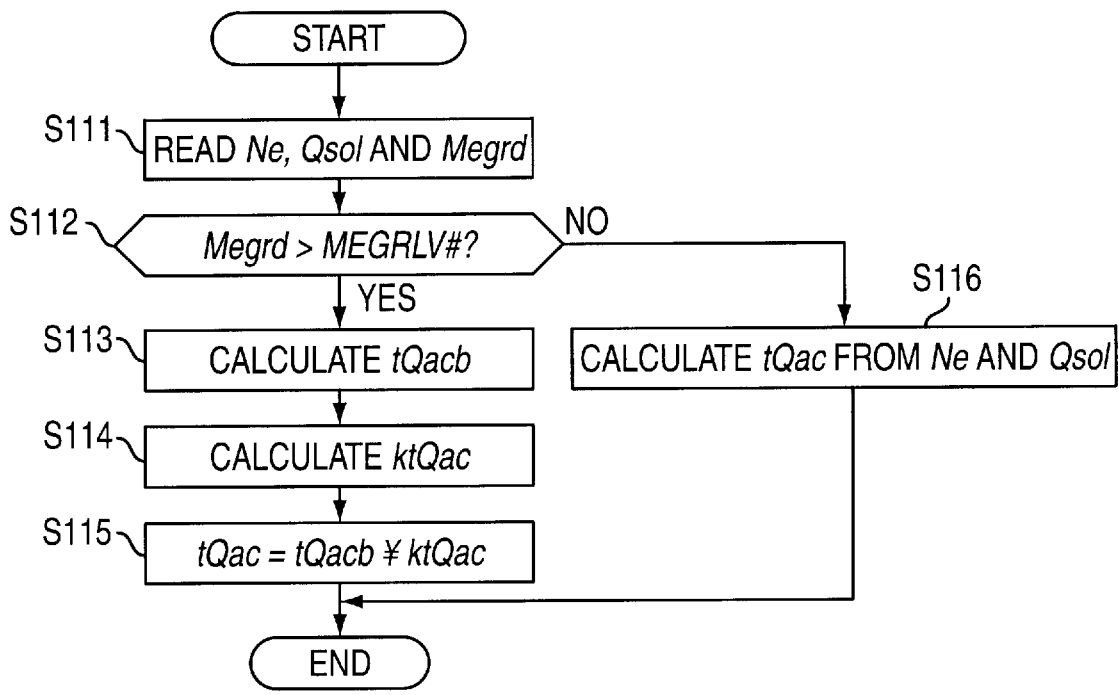
FIG. 17 is a flowchart describing a routine for calculating a target intake fresh air amount tQac performed by the controller.

FIG. 17 shows a routine for calculating the target intake fresh air amount tQac. This routine is performed at an interval of ten milliseconds.

Firstly in a step S111, the control unit 41 reads the engine rotation speed Ne, target fuel injection amount Qsol and real EGR rate Megrd. In a step S112, the real EGR rate Megrd is compared with a predetermined value MEGRLV#. The predetermined value MEGRLV# is a value for determining whether or not exhaust gas recirculation is actually being performed, and is set to, for example, 0.5%.

In the step S112, when Megrd>MEGRL V#, the routine proceeds to a step S113. On the other hand, if Megrd≦MEGRLV#, the routine proceeds to a step S116. In order to treat the case of a very small exhaust gas recirculation to be the same as the case where exhaust gas recirculation is not performed, the predetermined value MEGRLV# is not set to zero.

Figure 18:
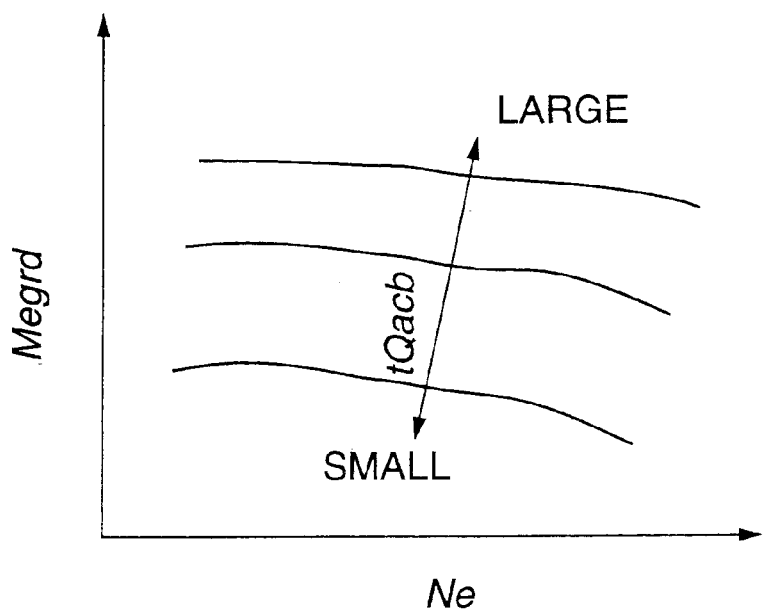
FIG. 18 is a diagram describing the contents of a map of a target intake fresh air amount basic value tQacb stored by the controller.

In the step S113, a target intake fresh air amount basic value tQacb is calculated from the engine rotation speed Ne and real EGR rate Megrd by looking up a map shown in FIG. 18. When the engine rotation speed Ne is constant, this map gives a larger target intake fresh air amount basic value tQacb the larger the real EGR rate Megrd. This map is previously stored in the memory of the control unit 41.

Figure 19:
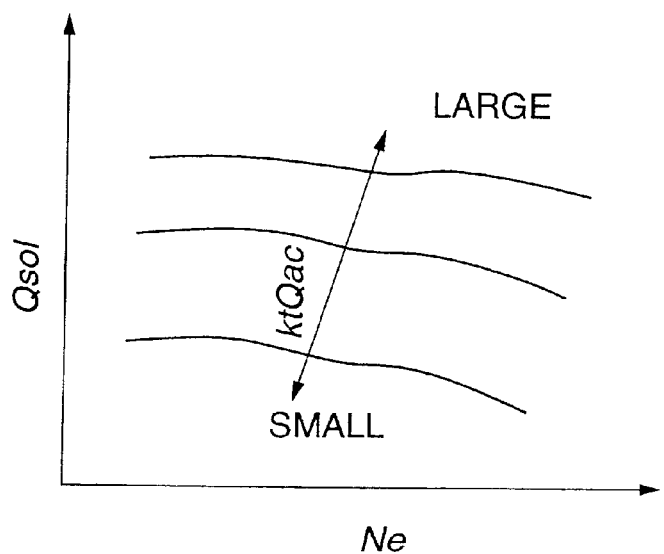
FIG. 19 is a diagram describing the contents of a map of a correction coefficient ktQac stored by the controller.

Next, in a step S114, a correction coefficient ktQac of the target intake fresh air amount is calculated from the engine rotation speed Ne and the target fuel injection amount Qsol by looking up a map shown in FIG. 19. The correction coefficient ktQac is a coefficient for setting the target intake fresh air amount according to the running condition of the vehicle.

In a step S115, the target intake fresh air amount tQac is calculated by multiplying the target intake fresh air amount basic value tQacb by the correction coefficient ktQac.

Figure 20:
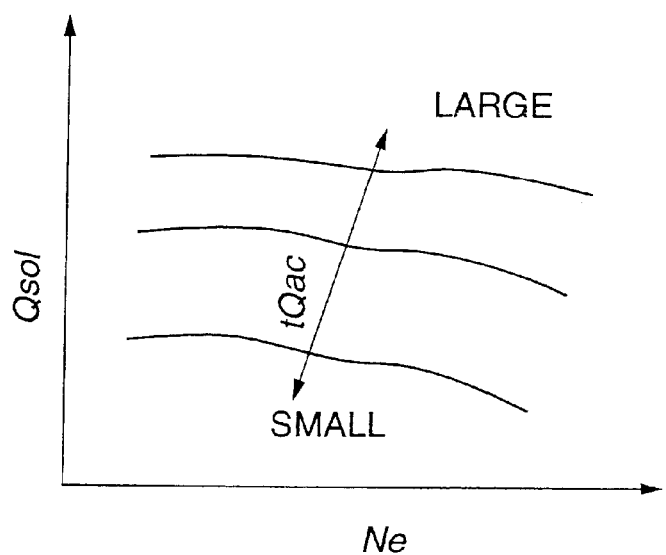
FIG. 20 is a diagram describing the contents of a map of a target intake fresh air amount tQac stored by the controller.

On the other hand, in the step S116, the target intake fresh air amount tQac when exhaust gas recirculation is not performed, is calculated from the engine rotation speed Ne and the target fuel injection amount Qsol by looking up a map shown in FIG. 20.

After calculating the target intake fresh air amount tQac in this way, the routine is terminated.

The control of the EGR amount of the EGR valve 6 as well as the control of the supercharging pressure of the turbocharger 50 by the controller 41 are performed based on these common parameters, the target fuel injection amount Qsol, the time constant inverse value Kkin, the target EGR rate Megr, the real EGR rate Megrd, the cylinder intake fresh air amount Qac, the real EGR amount Qec and the target intake fresh air amount tQac.

The control of the EGR amount is performed by controlling an opening area of the EGR valve 6 to be equal to a target opening area Aev.

Next, the routine for calculating the target opening area Aev of the EGR valve 6 for this control will be described referring to FIG. 37. This routine is performed in synchronism with the REF signal.

First, the controller 41 reads a target EGR amount Tqec per cylinder in the position of the EGR valve 6, an EGR amount feedback correction coefficient Kqac00 and the EGR valve flow velocity Cqe in a step S231.

These values are calculated by separate routines.

Figure 6:
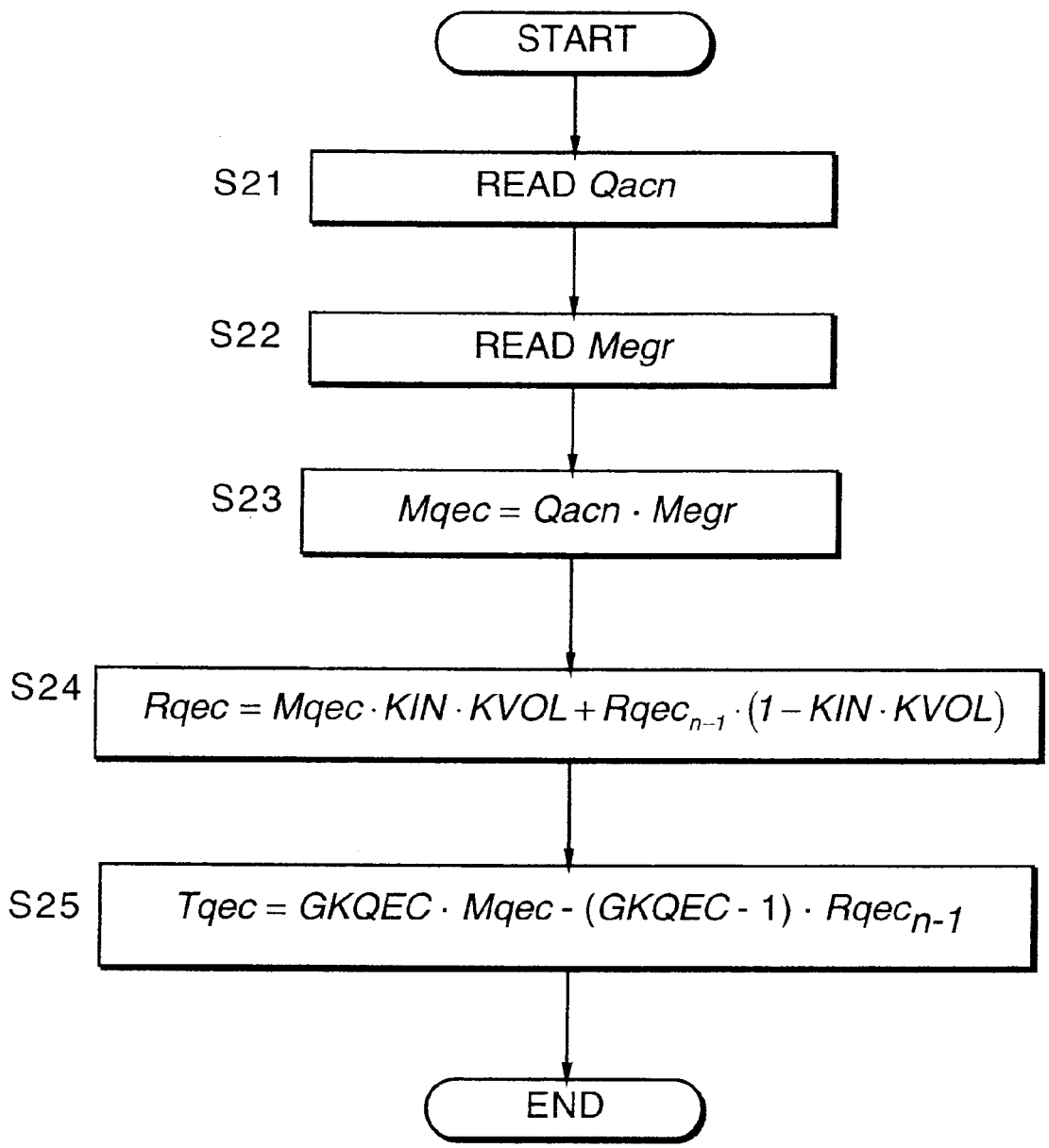
FIG. 6 is a flowchart describing a routine for calculating a target EGR amount Tqec per cylinder performed by the controller.

The target EGR amount Tqec per cylinder in the position of the EGR valve 6 is calculated by the routine shown in FIG. 6. The EGR amount feedback correction coefficient Kqac00 is calculated by a separate routine shown in FIG. 22, and a subroutine shown in FIG. 26. The EGR valve flow velocity Cqe is calculated by the routine shown in FIG. 35.

These routines will first be described.

Referring to FIG. 6, firstly in a step S21, the controller 41 reads the intake fresh air amount Qacn at the inlet of a collector 3A. The intake fresh air amount Qacn per cylinder at the inlet of the collector 3A is a value calculated by the step S33 of FIG. 7.

Next, in a step S22, the target EGR rate Megr is read. The target EGR rate Megr is a value calculated by the routine of FIG. 10.

Next, in a step S23, a required EGR amount Mqec is calculated by equation (9).

$$Mqec = Qacn \cdot Megr \qquad (9)$$

In a next step S24, delay processing is performed on the required EGR amount Mqec by the following equation (10) using a time constant inverse value Kkin calculated by the routine of FIG. 15, and this is converted to an intermediate value corresponding to the required EGR amount per cylinder in the intake valve position of the diesel engine 1.

$$Rqec = Mqec \cdot Kkin + Rqec_{n-1} \cdot (1 - Kkin) \qquad (10)$$

where, $Rqec_{n-1}$=Rqec calculated on the immediately preceding occasion the routine was performed.

In a next step S25, advance processing is performed by the following equation (11) using the intermediate value Rqec and required EGR amount Mqec, to calculate a target EGR amount Tqec per cylinder in the position of the EGR valve 6.

$$Tqec = GKQEC \cdot Mqec - (GKQEC - 1) \cdot Rqec_{n-1} \qquad (11)$$

Figure 22:
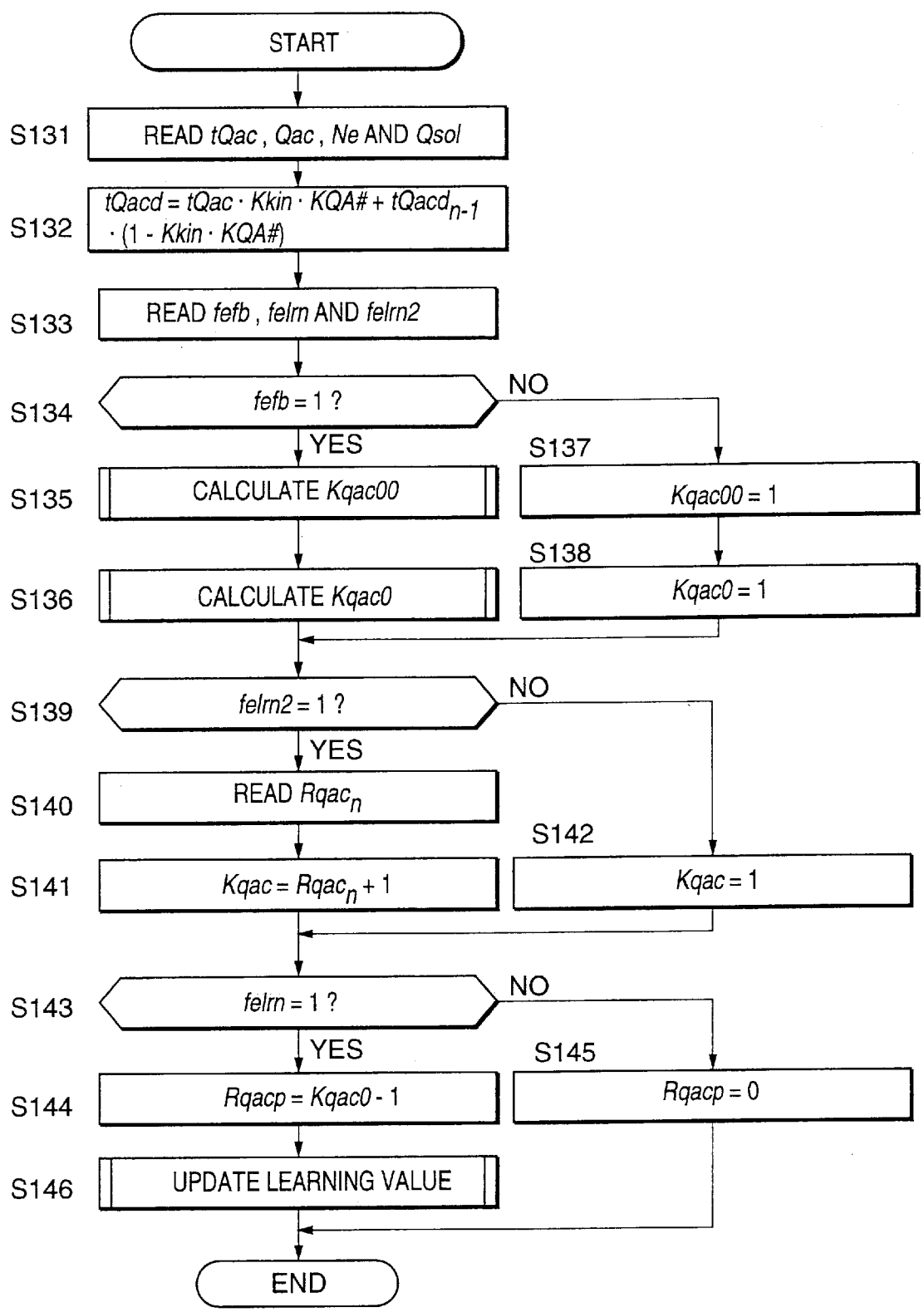
FIG. 22 is a flowchart describing a subroutine for calculating an EGR amount feedback correction coefficients Kqac00, an EGR flow velocity feedback correction coefficient Kqac0, and an EGR flow velocity learning correction coefficient Kqac, performed by the controller.

FIG. 22 shows the routine for calculating the EGR amount feedback correction coefficient Kqac00, an EGR flow velocity feedback correction coefficient Kqac0, and an EGR flow velocity learning correction coefficient Kqac.

This routine is performed in synchronism with the REF signal.

Figure 37:
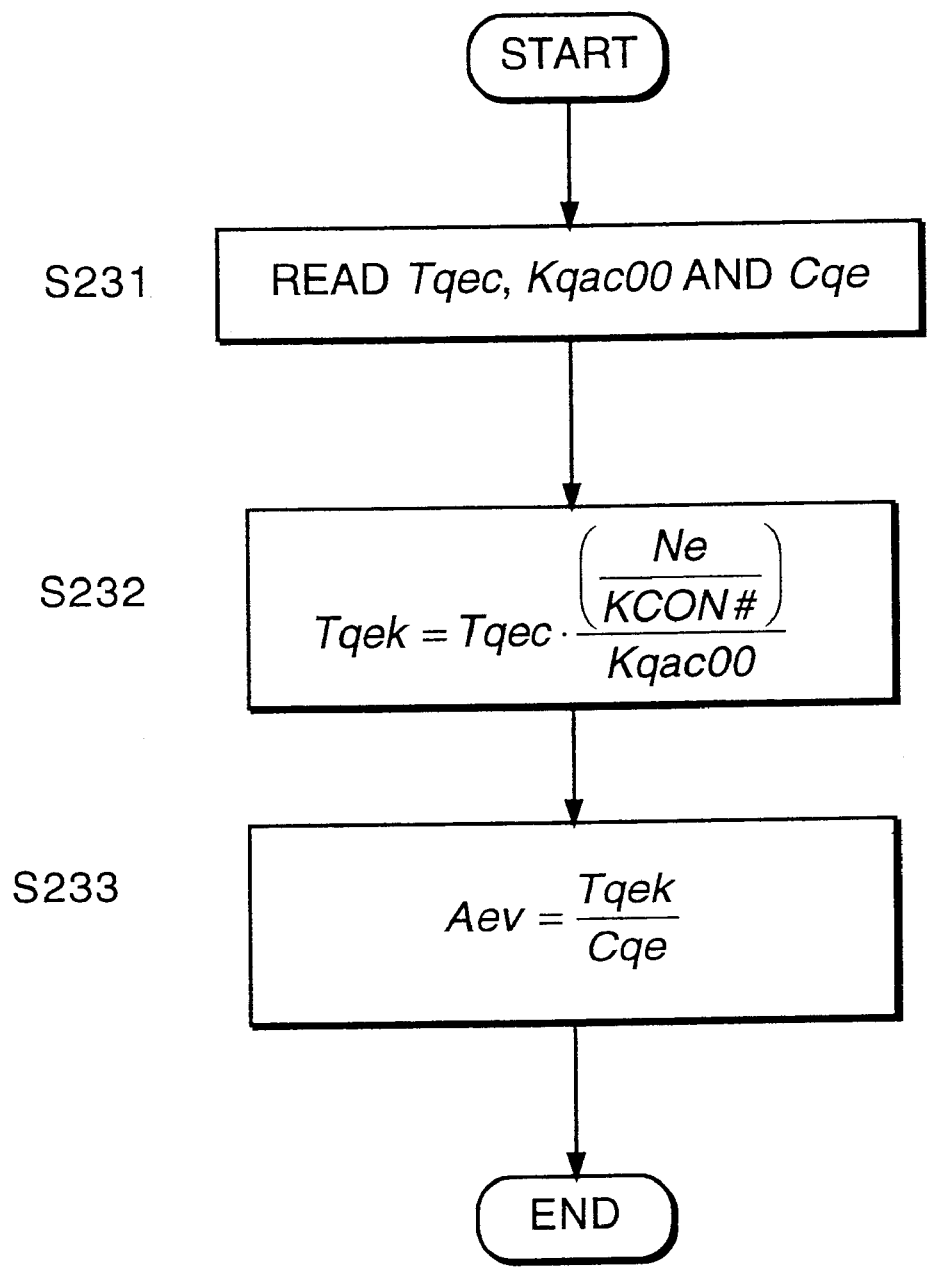
FIG. 37 is a flowchart describing a routine for calculating a target opening area Aev of the EGR valve performed by the controller.

The EGR amount feedback correction coefficient Kqac00 read in a step S231 of FIG. 37 is calculated by this routine.

First, in a step S131, the controller 41 first reads the target intake fresh air amount tQac, cylinder intake fresh air amount Qac, engine rotation speed Ne and target fuel injection amount Qsol.

In a step S132, a delay processing value tQacd of the target intake fresh air amount tQac is calculated using the following equation (12), from the target intake fresh air amount tQac and the time constant inverse value Kkin calculated by the routine of FIG. 15.

$$tQacd = tQac \cdot Kkin \cdot KQA\# + tQacd_{n-1} \cdot (1 - Kkin \cdot KQA\#) \qquad (12)$$

where, KQA#=constant, and $tQacd_{n-1}$=tQacd calculated on the immediately preceding occasion when the routine was executed.

In a following step S133, a feedback control permission flag fefb, a learning permission flag felrn and a learning value reflection permission flag felrn2 which are related to the control of the EGR valve opening are read.

Figure 23:
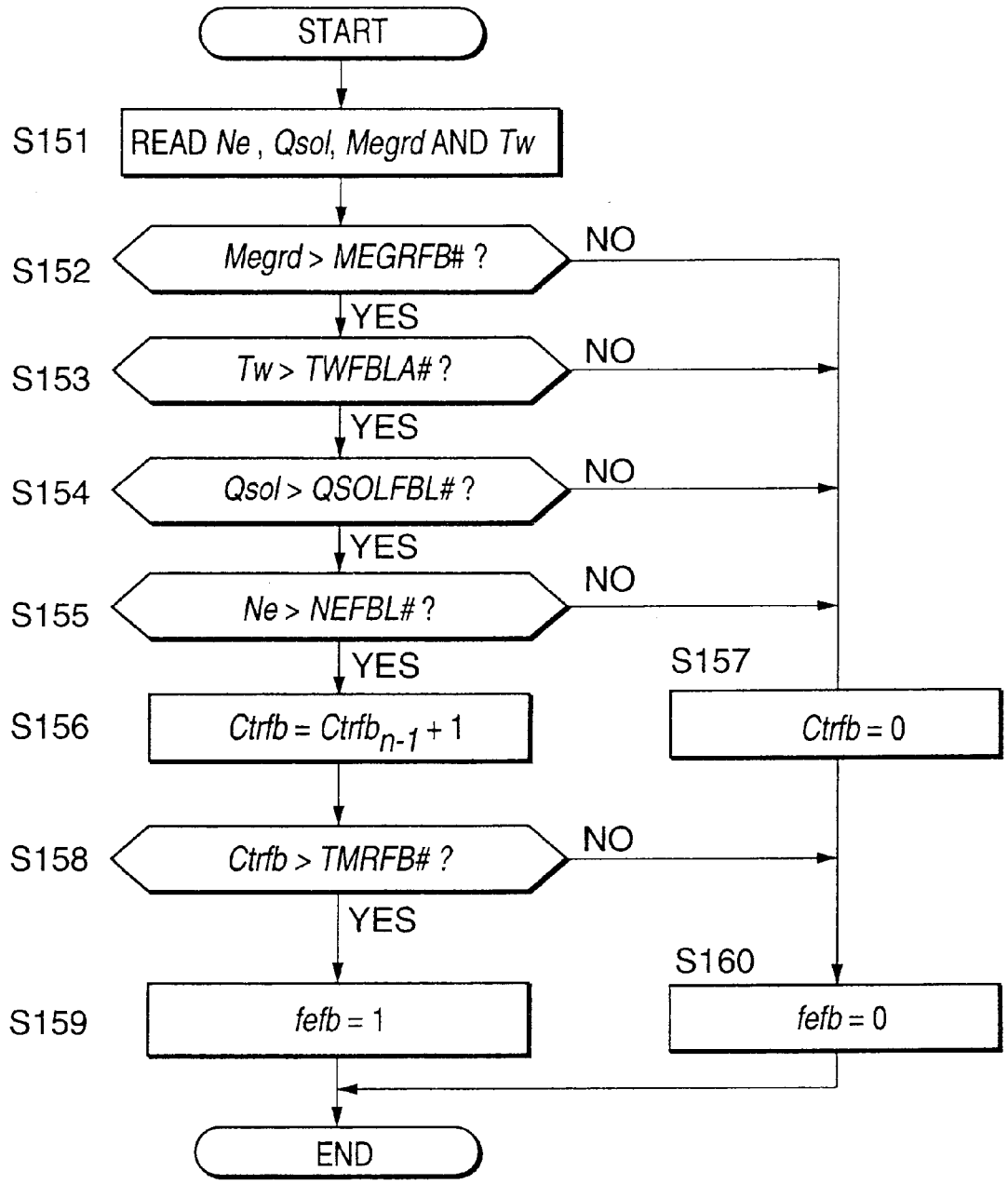
FIG. 23 is a flowchart describing a routine for setting a feedback control permission flag fefb performed by the controller.
Figure 24:
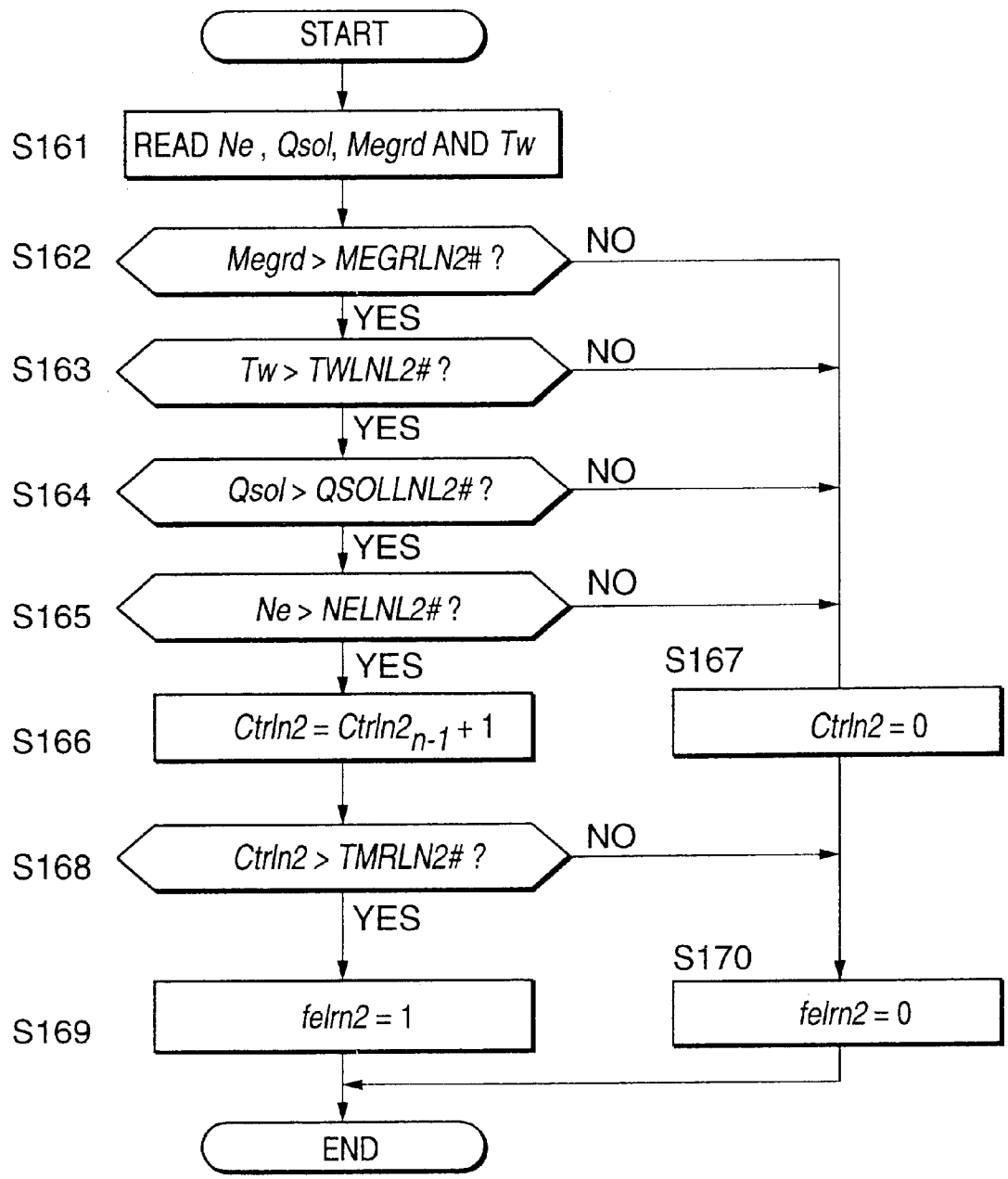
FIG. 24 is a flowchart describing a routine for setting a learning value reflection permission flag felrn2 performed by the controller.
Figure 25:
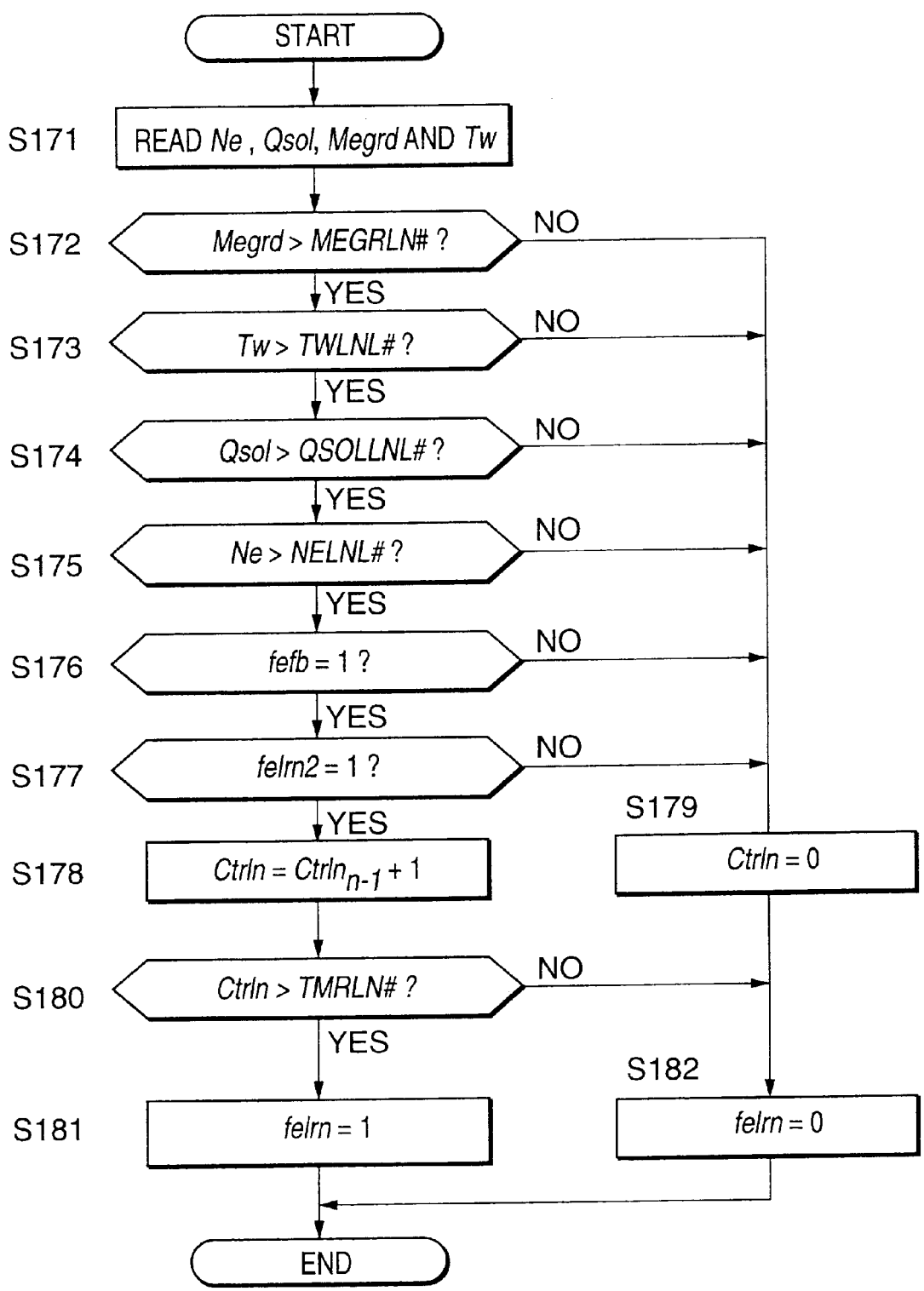
FIG. 25 is a flowchart describing a routine for setting a learning permission flag felrn performed by the controller.

These flags are set by the independent routines shown in FIG. 23, FIG. 24 and FIG. 25, respectively.

FIG. 23 shows the routine for setting the feedback control permission flag fefb. This routine is performed at an interval of ten milliseconds.

Referring to FIG. 23, firstly in a step S271, the controller 41 reads the engine rotation speed Ne, target fuel injection amount Qsol, real EGR rate Megrd and water temperature Tw.

In subsequent steps S152–S155, the EGR amount feedback control conditions are determined.

In the step S152, it is determined whether or not the real EGR rate Megrd exceeds a predetermined value MEGRFB#. The predetermined value MEGRFB# is a value for checking that exhaust gas recirculation is actually performed. In the step S153, it is determined whether or not the cooling water temperature Tw exceeds a predetermined value TwFBL#. The predetermined value TwFBL# is set to 30° C. In a step S154, it is determined whether or not the target fuel injection amount Qsol exceeds a predetermined value QSOLFBL#.

The predetermined value QSOLFBL# is a value for checking that the diesel engine 1 is not in a fuel cut state. In a step S155, it is determined whether or not the engine rotation speed Ne exceeds a predetermined value NeFBL#. The predetermined value NeFBL# is a value for checking that the vehicle is not in a low-speed region where the diesel engine 1 stops rotation.

When all of the conditions of step S152–S155 are satisfied, the routine proceeds to a step S156 and increments a timer value Ctrfb.

In a following step S158, it is determined whether or not the timer value Ctrfb is greater than a predetermined value TMRFB#. The predetermined value TMRFB# is set to, for example, a value less than one second. When the result of this determination is affirmative, the routine sets the feedback control permission flag fefb to one in a step S159, and the routine is terminated.

On the other hand, if any of the conditions of the steps S152–S155 is not satisfied, in a step S157, the routine resets the timer value Ctrfb to zero, and proceeds to a following step S160.

When the determination of the step S158 is negative, the routine also proceeds to the step S160.

In the step S160, the feedback control permission flag fefb is reset to zero and the routine is terminated.

According to this routine, the feedback control permission flag fefb is set to one only when the state where all of the conditions of the steps S152–S155 were satisfied, continues for a time exceeding the predetermined value TMRFB#, and in other cases, the feedback control permission flag fefb is reset to zero.

FIG. 24 shows a routine for setting the learning value reflection permission flag felrn2. This routine is also performed at an interval of ten milliseconds.

Referring to FIG. 24, firstly in a step S161, the controller 41 reads the engine rotation speed Ne, target fuel injection amount Qsol, real EGR rate Megrd and cooling water temperature Tw.

In subsequent steps S162–S165, EGR amount learning value reflection conditions are determined.

In the step S162, it is determined whether or not the real EGR rate Megrd exceeds a predetermined value MEGRLN2#. The predetermined value MEGRLN2# is a value for checking that exhaust gas recirculation is actually performed. In the step S163, it is determined whether or not the cooling water temperature Tw exceeds a predetermined value TwLNL2#. The predetermined value TwLNL2# is set to 20° C. In the step S164, it is determined whether or not the target fuel injection amount Qsol exceeds a predetermined value QSOLLNL2#. The predetermined value QSOLLNL2# is a value for checking that the diesel engine 1 is not in a fuel cut state. In the step S165, it is determined whether or not the engine rotation speed Ne exceeds a predetermined value NeLNL2#. The predetermined value NeLNL2# is a value for checking that the vehicle is not in a low-speed region where the diesel engine 1 stops rotation.

Only when all of the conditions of step S162–S165 are satisfied, the routine proceeds to a step S166 and increments a timer value Ctrln2.

In the following step S168 it is determined whether or not the timer value Ctrln2 exceeds a predetermined value TMRLN2#. The predetermined value TMRLN2# is set to 0.5 seconds. When the result of this determination is affirmative, the routine sets the learning value reflection permission flag felrn2 to one in a step S169, and the routine is terminated.

On the other hand, when any of the conditions of the steps S162–S165 is not satisfied, in a step S167, the routine resets the timer value Ctrln2 to zero, and proceeds to a following step S170. When the determination of the step S168 is negative, the routine also proceeds to the step S170.

In the step S170, the learning value reflection permission flag felrn2 is reset to zero and the routine is terminated.

FIG. 25 shows the routine for setting the learning permission flag felrn. This routine is also performed at an interval of ten milliseconds.

Referring to FIG. 25, firstly in a step S171, the controller 41 reads the engine rotation speed Ne, target fuel injection amount Qsol, real EGR rate Megrd, and water temperature Tw.

In subsequent steps S172–S177, the EGR amount learning permission conditions are determined.

In the step S172, it is determined whether or not the real EGR rate Megrd exceeds a predetermined value MEGRLN#. The predetermined value MEGRLN# is a value for checking that exhaust gas recirculation is actually performed. In the step S173, it is determined whether or not the cooling water temperature Tw exceeds a predetermined value TwLNL#. The predetermined value TwLNL# is set to 70–80° C. In the step S174, it is determined whether or not the target fuel injection amount Qsol exceeds a predetermined value QSOLLNL#. The predetermined value QSOLLNL# is a value for checking that the diesel engine 1 is not in a fuel cut state. In the step S175, it is determined whether or not the engine rotation speed Ne exceeds a predetermined value NeLNL#. The predetermined value NeLNL# is a value for checking that the vehicle is not in a low-speed region where the diesel engine 1 stops rotation. In the step S176, it is determined whether or not the feedback control permission flag fefb is one. In the step S177, it is determined whether or not the learning value reflection permission flag felrn2 is one.

Only when all of the conditions of the steps S172–S177 are satisfied, the routine proceeds to a step S178 and increments a timer value Ctrln.

In a following step S180, it is determined whether or not the timer value Ctrln exceeds a predetermined value TMRLN#. The predetermined value TMRLN# is set to four seconds. When the result of this determination is affirmative, the routine sets the learning permission flag felrn to one in a step S181, and the routine is terminated. On the other hand, if any of the conditions of the steps S172–S177 are not satisfied, in a step S179, the routine resets the timer value Ctrln to zero, and proceeds to a following step S182. The routine also proceeds to the step S182 when the determination of the step S180 is negative. In the step S182, the learning permission flag felrn is reset to zero, and the routine is terminated.

Referring again to FIG. 22, after reading this feedback control permission flag fefb, learning value reflection permission flag felrn2 and learning permission flag felrn, in a step S134, the controller 41 determines whether or not the feedback control permission flag fefb is one.

When the feedback control permission flag fefb is one, after calculating the feedback correction coefficient Kqac00 of the EGR amount in a step S135, and the feedback correction coefficient Kqac0 of the EGR valve flow velocity Cqe in a step S136, the controller 41 proceeds to a step S139.

On the other hand, when the feedback control permission flag fefb is not one in the step S134, the controller 41 sets the feedback correction coefficient Kqac00 of the EGR amount to one in a step S137, sets the feedback correction coefficient Kqac0 to one in a following step S138, and then proceeds to the step S139.

Now, the calculation of the feedback correction coefficient Kqac00 of the EGR amount performed in the step S135 and the calculation of the feedback correction coefficient Kqac0 of the EGR velocity performed in the step S136, will be described.

Figure 26:
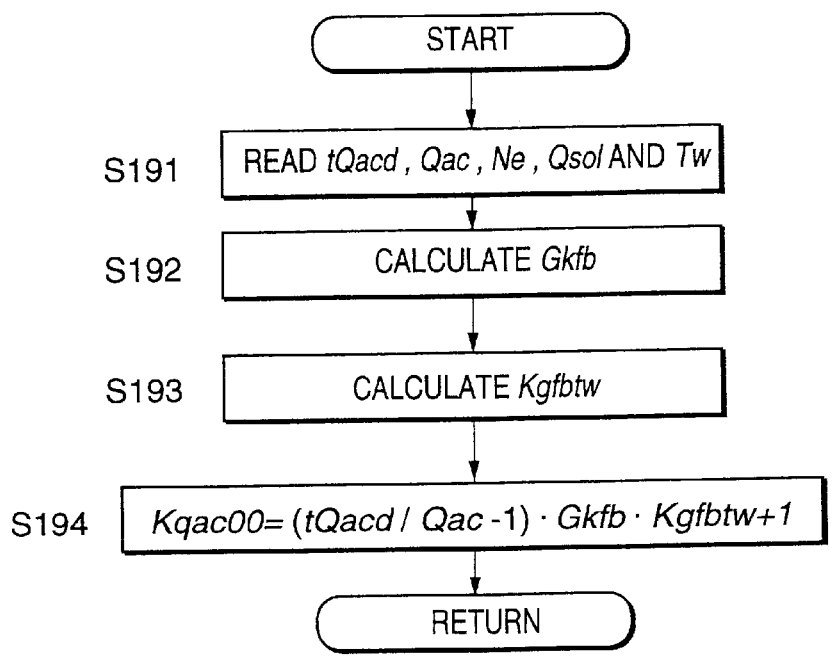
FIG. 26 is a flowchart describing a subroutine for calculating the EGR amount feedback correction coefficient Kqac00 performed by the controller.

The calculation of the feedback correction coefficient Kqac00 of the EGR amount is performed by a subroutine of FIG. 26.

Referring to FIG. 26, in a step S191, the controller 41 first reads the delay processing value tQacd of the target intake fresh air amount, cylinder intake fresh air amount Qac, engine rotation speed Ne, target fuel injection amount Qsol and the cooling water temperature Tw. The delay processing value tQacd is a value calculated in the step S132 of FIG. 22.

Figure 27:
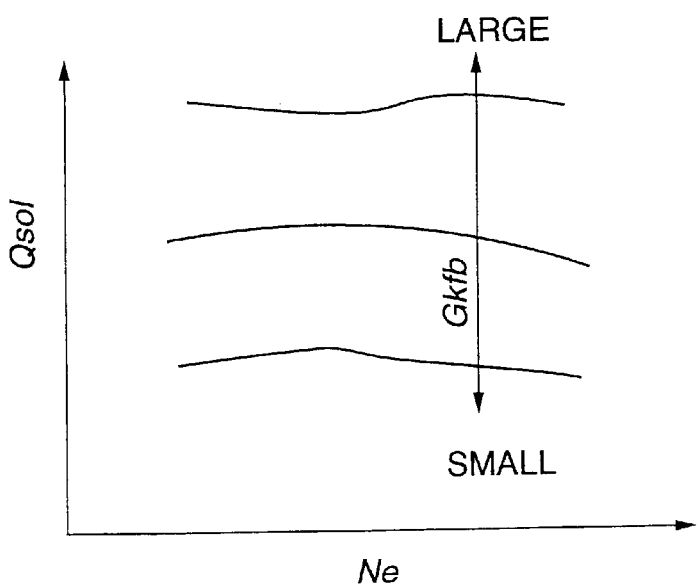
FIG. 27 is a diagram describing the contents of a map of a correction gain Gkfb of an EGR flowrate stored by the controller.
Figure 28:
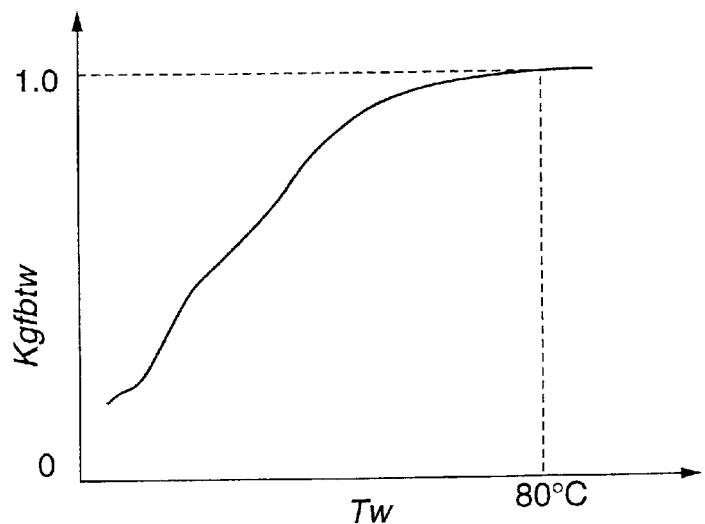
FIG. 28 is a diagram describing the contents of a map of a water temperature correction coefficient Kgfbtw of an EGR amount stored by the controller.

In a step S192, a correction gain Gkfb of the EGR flowrate is calculated by looking up a map shown in FIG. 27 previously stored in the memory of the controller 41, based on the engine rotation speed Ne and the target fuel injection amount Qsol. In a following step S193, a water temperature correction coefficient Kgfbtw of the correction gain is calculated by looking up a map shown in FIG. 28 previously stored in the memory of the controller 41, based on the cooling water temperature Tw.

In a final step S194, the feedback correction coefficient Kqac00 of the EGR amount is calculated by the following equation (13), using the correction gain Gkfb and the water temperature correction coefficient Kgfbtw.

$$Kqac00 = (tQacd/Qac - 1) \cdot Gkfb \cdot Kgfbtw + 1 \quad (13)$$

(tQacd/Qac−1), the first term on the right hand side of equation (13), is an error ratio of the target intake fresh air amount delay processing value tQacd relative to the cylinder intake fresh air amount Qac. Therefore, the feedback correction coefficient Kqac00 of the EGR amount is a value centered on one.

Figure 29:
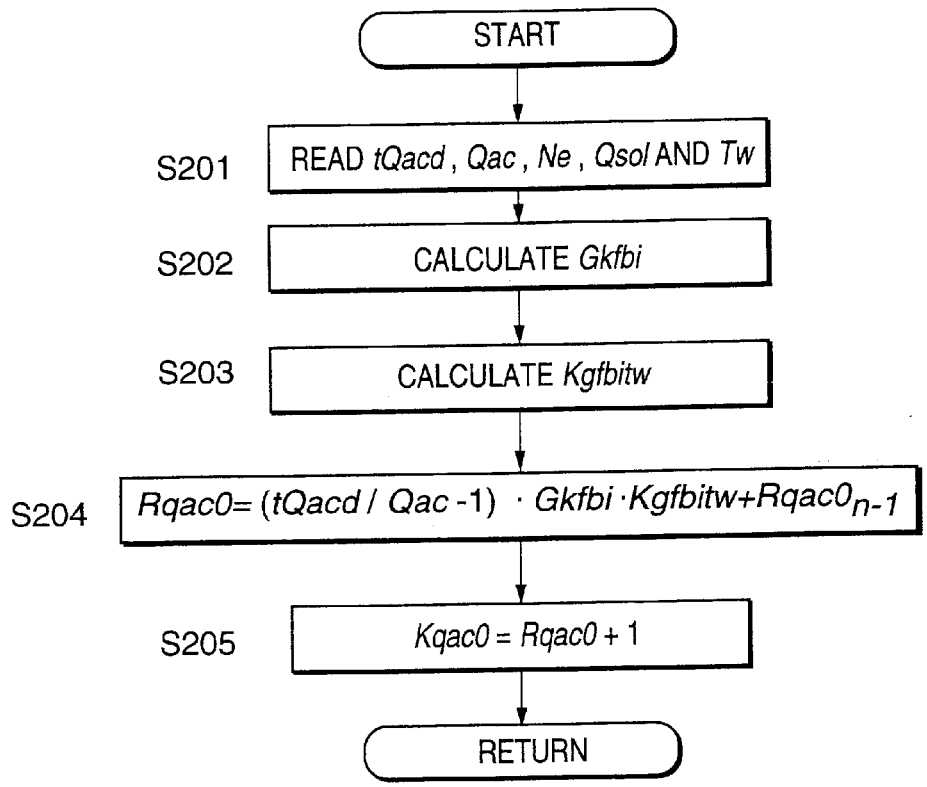
FIG. 29 is a flowchart describing a subroutine for calculating the EGR flow velocity feedback correction coefficient Kqac0 performed by the controller.

The calculation of the feedback correction coefficient Kqac0 of the EGR valve flow velocity is performed by a subroutine shown in FIG. 29.

Referring to FIG. 29, in a step S201, the controller 41 first reads the delay processing value tQacd, cylinder intake fresh air amount Qac, engine rotation speed Ne, target fuel injection amount Qsol and the cooling water temperature Tw.

Figure 30:
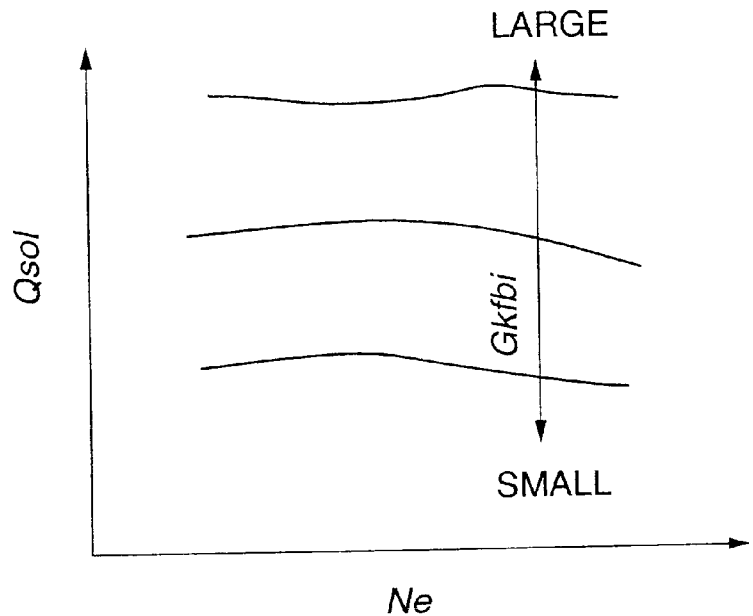
FIG. 30 is a diagram describing the contents of a map of an EGR valve flow velocity correction gain Gkfbi stored by the controller.
Figure 31:
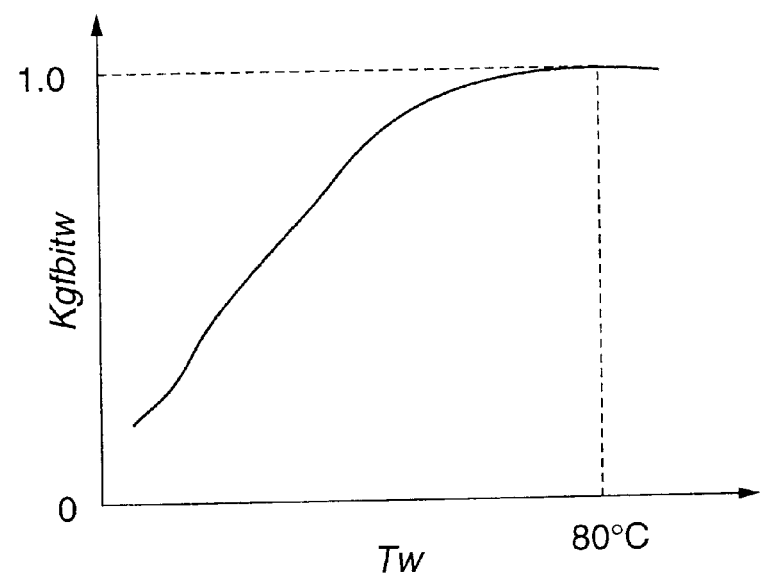
FIG. 31 is a diagram describing the contents of a map of a water temperature correction coefficient Kgfbitw of an EGR flow velocity stored by the controller.

In a step S202, a correction gain Gkfbi of the EGR valve flow velocity is calculated by looking up a map shown in FIG. 30 previously stored in the memory of the controller 41, based on the engine rotation speed Ne and the fuel injection amount QsoL In a step S203, a water temperature correction coefficient Kgfbitw of the correction gain is calculated by looking up a map shown in FIG. 31 previously stored in the memory of the controller 41, based on the cooling water temperature Tw.

In a following step S204, an error ratio Rqac0 is calculated by the following equation (14), using the correction gain Gkfbi and the water temperature correction coefficient Kgfbitw.

$$Rqac0 = (tQacd/Qac - 1) \cdot Gkfbi \cdot Kgfbitw + Rqac0_{n-1} \quad (14)$$

where, $Rqac0_{n-1}$=Rqac0 calculated on the immediately preceding occasion the subroutine was executed.

In a following step S205, by adding one to the error ratio Rqac0, the EGR flow velocity feedback correction coefficient Kqac0 is calculated. Therefore, the feedback correction coefficient Kqac0 of the EGR valve flow velocity is a value proportional to the integral of the error ratio.

Now, referring again to FIG. 22, after setting the feedback correction coefficient Kqac00 of the EGR amount and the feedback correction coefficient Kqac0 of the EGR valve flow velocity, in the step S139, the controller 41 determines whether or not the learning value reflection permission flag felrn2 is one.

When the learning value reflection permission flag felrn2 is one, i.e., when reflection in EGR amount control of the learning value is permitted, in a step S140, the controller 41 reads the error ratio learning value $Rqac_n$ by looking up a map shown in FIG. 32 previously stored in the memory of the controller 41, based on the engine rotation speed Ne and the target fuel injection amount Qsol. In a next step S141, the EGR flow velocity learning correction coefficient Kqac is calculated by adding one to the error ratio learning value $Rqac_n$.

When the learning value reflection permission flag felrn2 is not one in the step S139, the controller 41 sets the EGR flow velocity learning correction coefficient Kqac to one in a step S142.

After the processing of the step S141 or step S142, in a step S143, the controller 41 determines whether or not the learning permission flag felrn is one.

When the learning permission flag felrn is one, in a step S144, the controller 41 subtracts one from the EGR flow velocity feedback correction coefficient Kqac0 to calculate the current value Rqacp of the error ratio. In a following step S146, the learning value is updated using the subroutine of FIG. 33, and the routine is terminated.

When the learning permission flag felrn is not one, in a step S145, the controller 41 resets the current value Rqacp of the error ratio to zero, and terminates the routine of FIG. 22.

Next, the updating of the learning value performed in the step S146 will be described.

Referring to FIG. 33, in a step S211, the controller 41 first reads the engine rotation speed Ne, target fuel injection amount Qsol and error ratio Rqacp calculated in the step S144 of FIG. 22.

Figure 34:
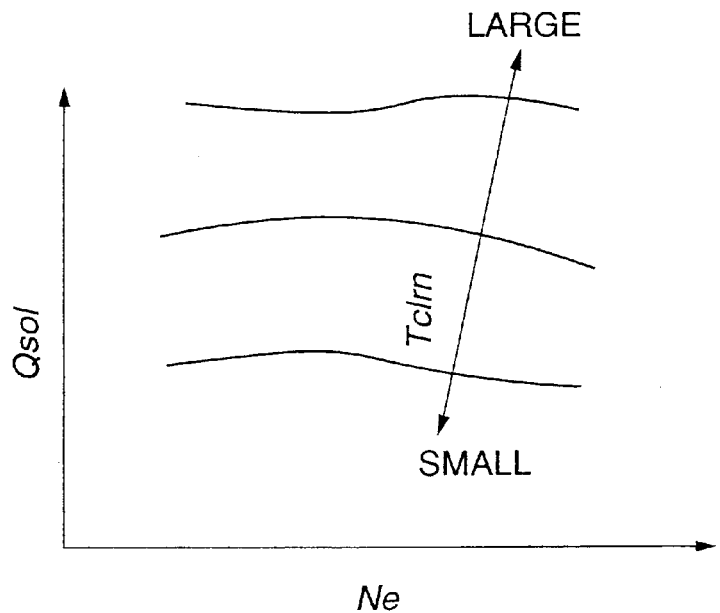
FIG. 34 is a diagram describing the contents of a map of a learning rate Tclrn stored by the controller.

In a step S212, a learning rate Tclrn is calculated by looking up a map shown in FIG. 34 previously stored in the memory of the controller 41, based on the engine rotation speed Ne and target fuel injection amount Qsol.

In a step S213, the error ratio learning value $Rqac_n$ is calculated by looking up the aforesaid map of FIG. 32, based on the engine rotation speed Ne and target fuel injection amount Qsol.

In a following step S214, weighted average processing by the following formula (15) is added to the error ratio Rqacp read in the step S211, and updating of the error ratio learning value is performed.

$$Rqac_n(\text{new}) = Rqacp \cdot Tclrn + Rqac_n(\text{old}) \cdot (1 - Tclrn) \quad (15)$$

where, $Rqac_n$(new)=error ratio learning value $Rqac_n$ to be written on the map, Rqacp=error ratio read in the step S211, and $Rqac_n$(old)=error ratio learning value $Rqac_n$ read from the map in the step S213.

In a next step S215, the stored value of the map of FIG. 32 is overwritten using the error ratio learning value $Rqac_n$ (new) calculated in this way.

By terminating the subroutine of FIG. 33, the controller 41 terminates the processing of the routine of FIG. 22.

Figure 35:
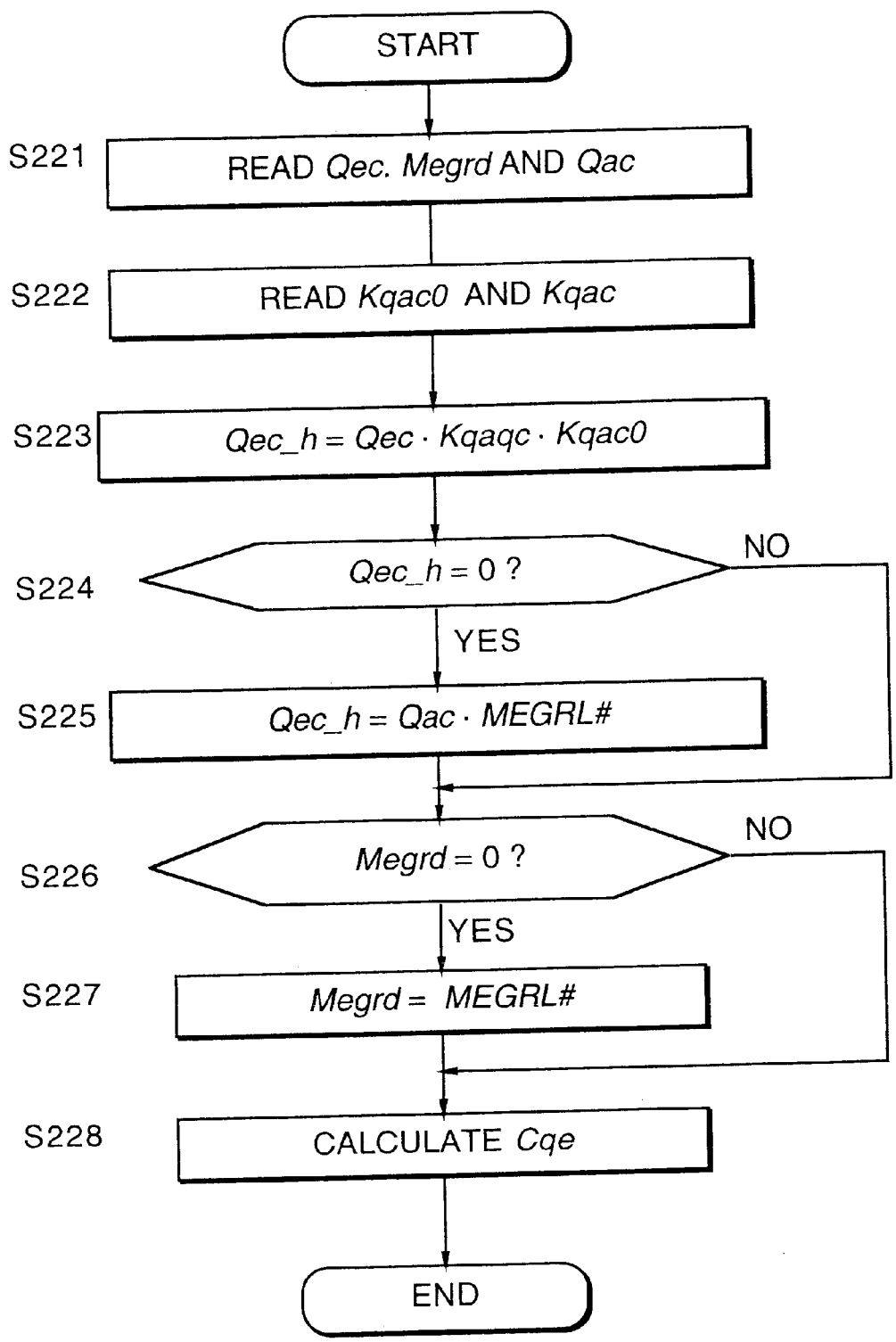
FIG. 35 is a flowchart describing a routine for calculating an EGR valve flow velocity Cqe performed by the controller.

Next, referring to FIG. 35, a routine for calculating the EGR valve flow velocity Cqe will be described.

First, in a step S221, the controller 41 reads the real EGR amount Qec, real EGR rate Megrd and cylinder intake fresh air amount Qac.

In a next step S222, the controller 41 reads the feedback correction coefficient Kqac0 of the EGR valve flow velocity and EGR flow velocity learning correction coefficient Kqac.

In a next step S223, a corrected real EGR amount Qec_h is calculated by the following equation (16)

$$Qec\_h = Qec \cdot Kqac \cdot Kqac0 \quad (16)$$

In steps S224–S227, an initial value of the corrected real EGR amount Qec_h when EGR operation begins, is set. In the step S224, it is determined whether or not the corrected real EGR amount Qec_h is zero. When Qec_h is zero, i.e. when EGR is not operating, the corrected real EGR amount Qec_h is set by the following equation (17) in a step S225, and the routine proceeds to a step S226. When the corrected real EGR amount is not zero in the step S224, the routine bypasses the step S225 and proceeds to the step S226.

$$Qec\_h = Qac \cdot MEGRL\# \quad (17)$$

where, MEGRL#=constant.

In the step S226, it is determined whether or not the real EGR rate Megrd is zero. When the real EGR rate Megrd is zero, the real EGR rate Megrd is set equal to the constant MEGRL# in the step S227, and the routine proceeds to a step S228. When the real EGR rate Megrd is not zero, the routine bypasses the step S227 and proceeds to the step S228.

When the EGR valve 6 is fully closed, the EGR valve flow velocity of the EGR valve 6 is zero, and equations (16) and (17) are equations for setting the initial value of parameters used for flow velocity calculations when EGR operation starts, i.e., when the EGR valve 6 begins to open. The constant MEGRL# may be set to, for example, 0.5.

The differential pressure upstream and downstream of the EGR valve 6 when EGR operation starts is different according to the running conditions of the diesel engine 1, and as a result, the EGR valve flow velocity when EGR operation starts also differs. The differential pressure upstream and downstream of the EGR valve 6 when the EGR valve 6 begins to open, depends on the cylinder intake fresh air amount Qac. Thus, the calculation precision of the EGR valve flow velocity when EGR operation starts, can be improved by making the initial value of Qec_h directly proportional to the cylinder intake fresh air amount Qac by equation (17).

Figure 36:
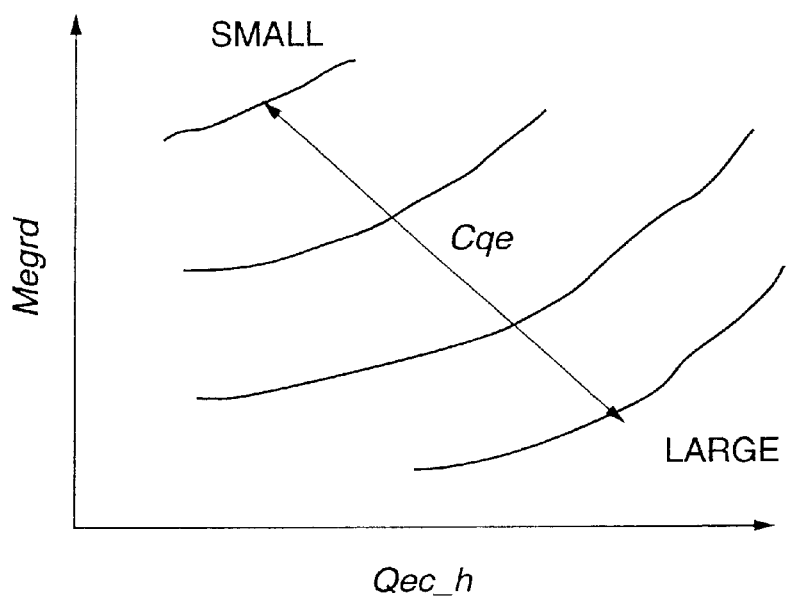
FIG. 36 is a diagram describing the contents of a map of the EGR valve flow velocity Cqe stored by the controller.

Now, in the step S228, the controller 41 calculates the EGR valve flow velocity Cqe by looking up a map shown in FIG. 36 which is previously stored in the memory of the controller 41, based on the corrected real EGR amount Qec_h and real EGR rate Megrd, and the routine is terminated.

In the step S231 of FIG. 37, the target EGR amount Tqec per cylinder in the position of the EGR valve 6, the EGR amount feedback correction coefficient Kqac00 and the EGR valve flow velocity Cqe which were calculated by the above separate routines, are read.

In a next step S232, the target EGR amount Tqec per cylinder in the position of the EGR valve 6 is converted into a target EGR amount Tqek per unit time by the following equation (18).

$$Tqek = Tqec \cdot \frac{\left(\frac{Ne}{KCON\#}\right)}{Kqac00} \quad (18)$$

where, Kqac00=EGR amount feedback correction coefficient.

In a step S233, the target opening area Aev of the EGR valve 6 is calculated by the following equation (19), and the routine is terminated.

$$Aev = \frac{Tqek}{Cqe} \quad (19)$$

Figure 5:
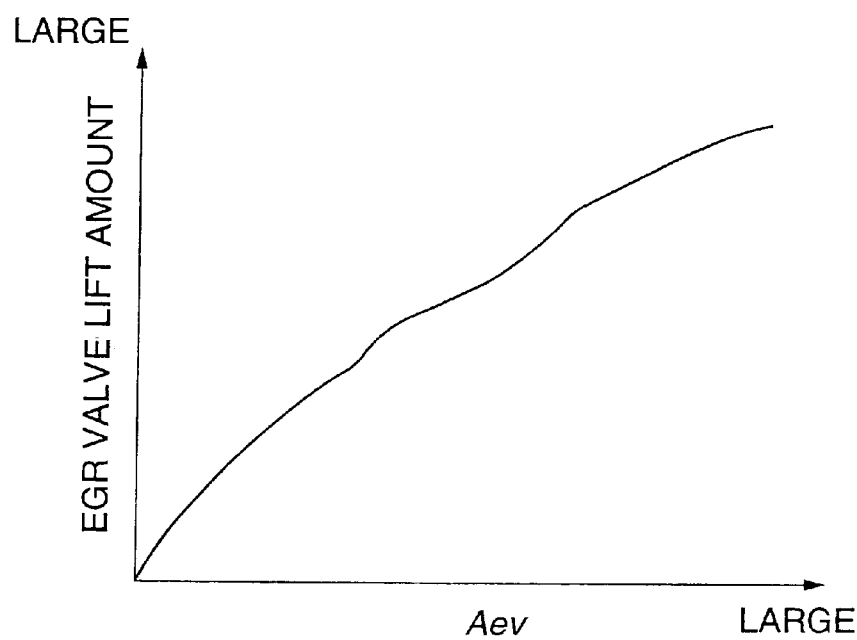
FIG. 5 is a diagram describing the contents of a map of an EGR valve lift amount stored by the controller.

The target opening area Aev of the EGR valve 6 thus obtained is changed into a lift amount of the EGR valve 6 by searching a map having the contents shown in FIG. 5 which is prestored in the controller 41.

The controller 41 outputs a duty control signal to the pressure control valve 56 so that the lift amount of the EGR valve 6 coincides with this value.

On the other hand, control of the supercharging pressure of the turbocharger 50 is performed by varying the opening rate of the variable nozzle 53 by outputting a signal representing a duty value Dtyvnt to the pressure control valve 56.

The routine for calculating the duty value Dtyvnt used for this control will now be described referring to FIG. 38. This routine is performed every ten milliseconds. This routine comprises various subroutines.

Figure 39:
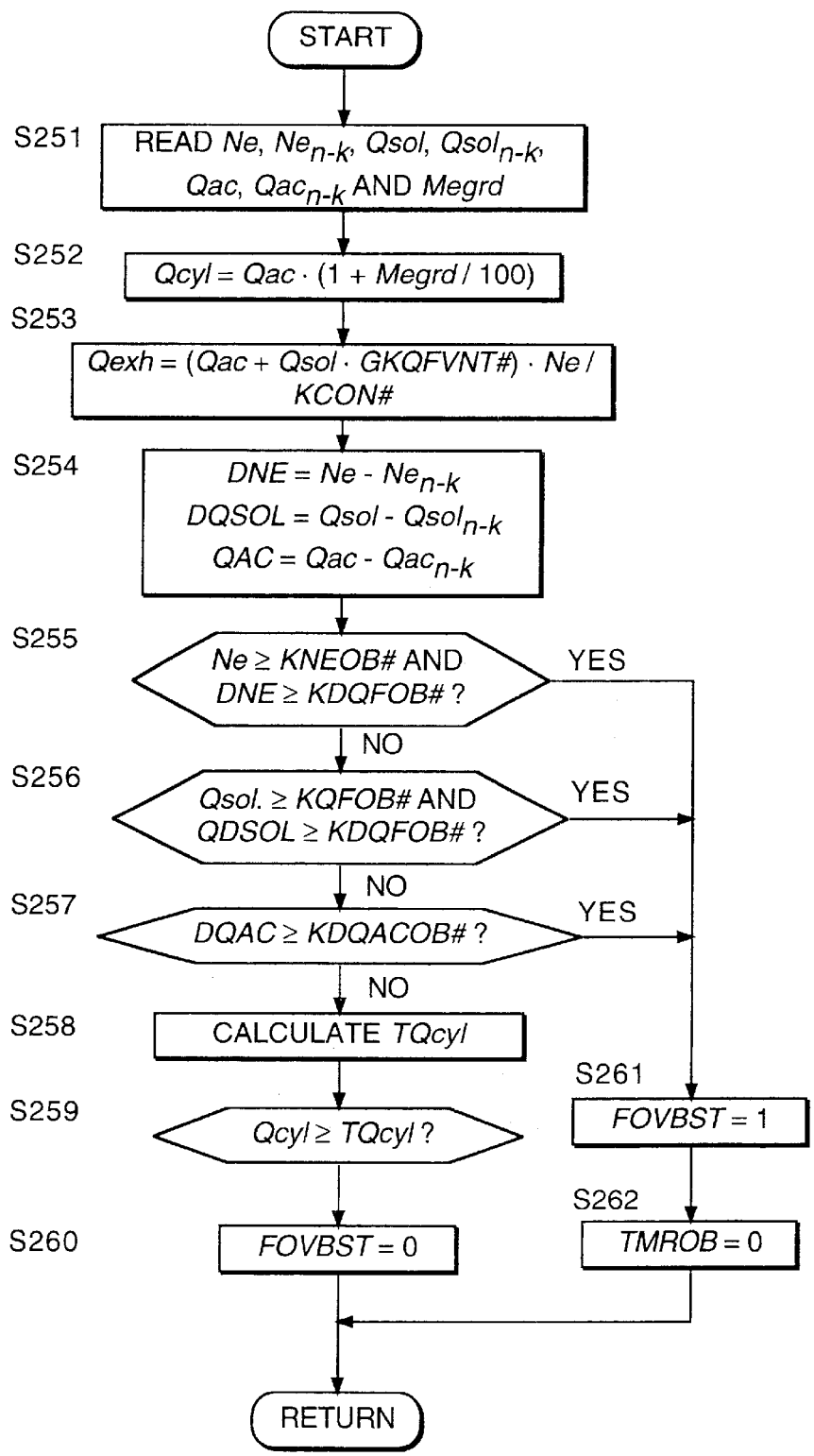
FIG. 39 is a flowchart describing a subroutine for setting an overboost determining flag FOVBST performed by the controller.

First, in a step S241, the controller 41 performs an overboost determining flag setting subroutine shown in FIG. 39.

Here, overboost means a phenomenon wherein the real supercharging pressure exceeds a supercharging limit when the pressure actuator 54 is moved in the closing direction of the variable nozzle 53, i.e., the direction in which the supercharging pressure increases, relative to a change of running conditions of the diesel engine 1. The supercharging limit is a limit above which the supercharging pressure does not increase the performance of the engine 1.

Referring to FIG. 39, in a step S251, the controller 41 first reads an engine rotation speed Ne, target fuel injection amount Qsol, cylinder intake fresh air amount Qac, these values $Ne_{n-k}$, $Qsol_{n-k}$ and $Qac_{n-k}$ when the subroutine was performed on k preceding occasions, and the real EGR rate Megrd.

In a step S252, a cylinder intake gas amount Qcyl (mg) per one stroke cycle of the diesel engine 1 is calculated by the following equation (20) using the cylinder intake fresh air amount Qac and real EGR rate Megrd.

$$Qcyl = Qac \cdot \left(1 + \frac{Megrd}{100}\right) \quad (20)$$

The second term Qac $$Qac \cdot \frac{Megrd}{100}$$

on the right-hand side of equation (20) is the real EGR amount, and the value obtained by adding this real EGR amount to the cylinder intake fresh air amount Qac is the gas amount aspirated per stroke cycle by one cylinder of the diesel engine.

Figure 21:
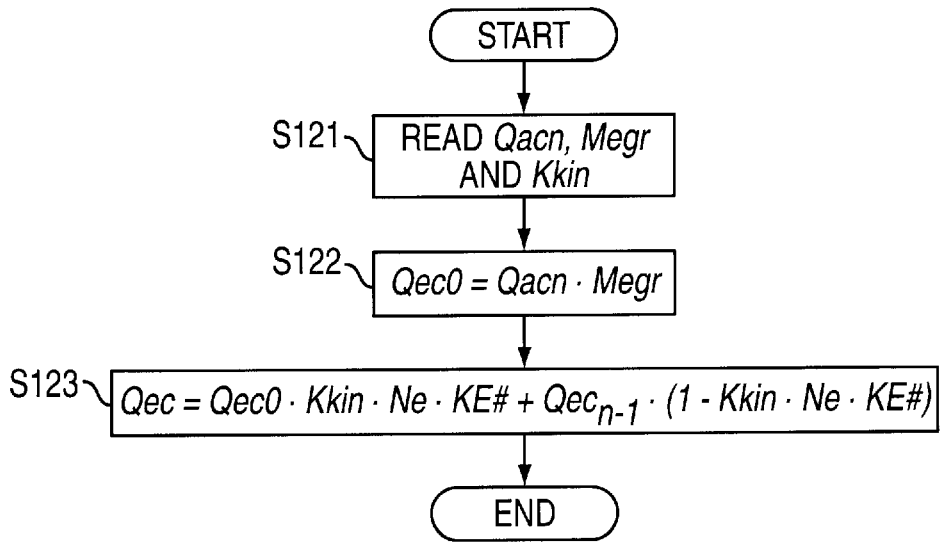
FIG. 21 is a flowchart describing a routine for calculating a real EGR amount Qec performed by the controller.

The real EGR amount Qec calculated by the routine of FIG. 21 may be used as the real EGR amount. In this case, Qcyl=Qac+Qec.

In a step S253, the real exhaust gas amount Qexh per stroke cycle (mg) is calculated by the following equation (21).

$$Qexh = (Qac + Qsol \cdot GKQFVNT\#) \cdot \frac{Ne}{KCON\#} \quad (21)$$

where, GKQFVNT#=scale factor (mg/mm³), and
KCON#=constant.

Here, the difference in the temperature of intake air and exhaust gas is disregarded, and the sum total of the exhaust gas due to combustion of the fuel of the target fuel injection amount Qsol and the cylinder intake fresh air amount Qac is considered to be the exhaust gas amount.

The unit of the target fuel injection amount Qsol is (mm³), and this is converted into mass by multiplying by the conversion factor GKQFVNT#. Further, the mass per stroke cycle (mg) is converted into a mass per second (g) by multiplying by $$\frac{Ne}{KCON\#}.$$

In a step S254, the difference of engine rotation speed Ne, target fuel injection amount Qsol, cylinder intake fresh air amount Qac and the values $Ne_{n-k}$, $Qsol_{n-k}$ and $Qac_{n-k}$ when the subroutine was performed k occasions ago, is calculated as an engine rotation speed variation DNE, fuel injection amount variation amount DQSOL and cylinder intake fresh air amount variation DQAC, respectively.

In steps 255-S257, based on these values, it is determined whether or not overboost will occur.

In the step S255, it is determined whether or not the engine rotation speed Ne is larger than a predetermined value KNEOB#, and the engine rotation speed variation DNE is larger than a predetermined value KDNEOB#.

In the step S256, it is determined whether or not the target fuel injection amount Qsol is larger than a predetermined value KQFOB#, and whether a fuel injection variation amount DQSOL is larger than a predetermined value KDQFOB#.

In the step S257, it is determined whether the cylinder intake fresh air amount DQAC is larger than a predetermined value KDQACOB#.

If any of the conditions of the steps 255-S257 are satisfied, it is considered that overboost occurs. In this case, the subroutine proceeds to a step S261.

On the other hand, when all the determination results of the steps S255–S257 are negative, the subroutine proceeds to a step S258.

Figure 41:
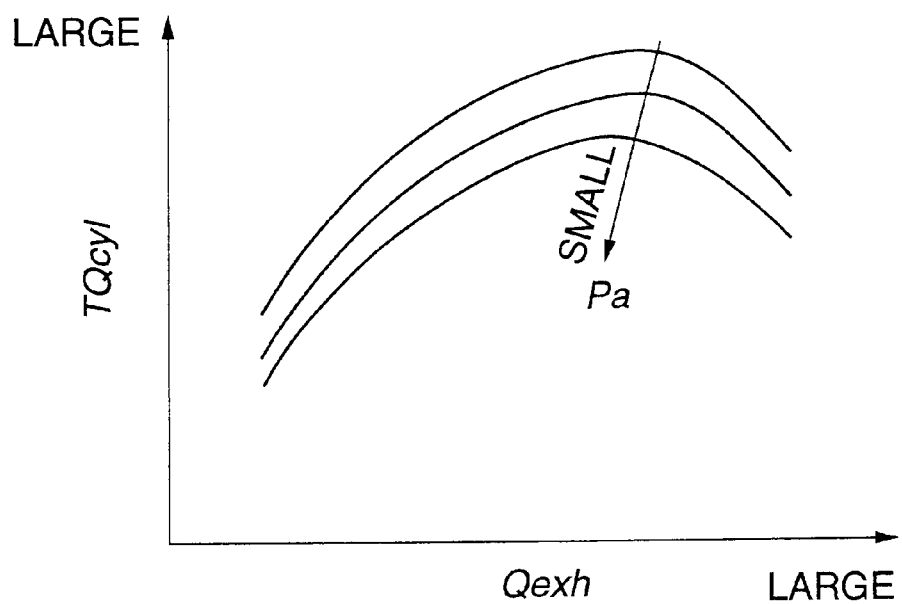
FIG. 41 is a diagram describing the contents of a map of an overboost determining intake gas amount TQcyl stored by the controller.

Here, the controller 41 calculates a corresponding overboost determining intake gas amount TQcyl referring to a map having the contents shown in FIG. 41 which is prestored in the controller 41, based on a real exhaust gas amount Qexh calculated in the step S253.

In FIG. 41, the overboost determining intake gas amount TQcyl has a substantially convex-shaped pattern relative to the real exhaust gas amount Qexh.

Figure 42:
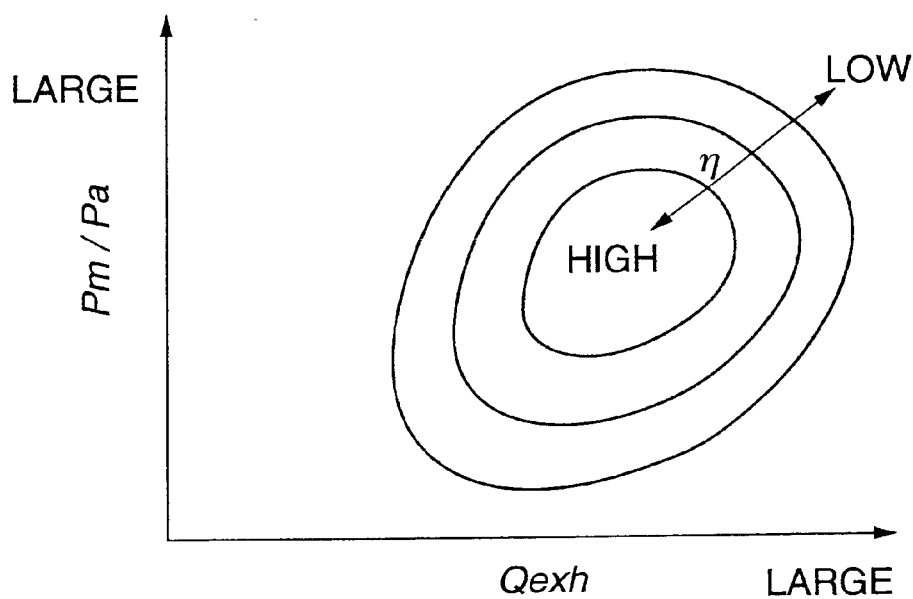
FIG. 42 is a diagram describing the characteristics of an efficiency of a turbocharger with which the diesel engine is provides.

This characteristic will be described referring to FIG. 42.

This diagram shows the relation of the real exhaust gas amount Qexh, pressure ratio Pm/Pa and effectiveness η of the turbocharger taking the pressure of the intake manifold 3B as Pm, and atmospheric pressure as Pa.

The effectiveness η is equivalent to a fresh air amount, and the higher the effectiveness η, the more the fresh air amount aspirated by the diesel engine 1 from the intake passage 3 increases.

When the real exhaust gas amount Qexh increases as shown in this figure, the effectiveness increases up to a certain region under the same pressure ratio Pm/Pa, but if the real exhaust gas amount Qexh increases beyond this region, the effectiveness η will fall.

In FIG. 41, the overboost determining intake gas amount TQcyl changes to a convex type for reflecting the above-mentioned characteristics of the effectiveness η. Also, in the map of FIG. 41, for the same real exhaust gas amount Qexh, the overboost determining intake gas amount TQcyl takes a smaller value the lower the atmospheric pressure.

Now, In the step S259, it is determined whether or not the cylinder intake gas amount Qcyl (mg) per stroke cycle of the diesel engine 1 calculated in the step S252is higher than the overboost determining intake gas amount TQcyl. When this condition is satisfied, the subroutine proceeds to a step S261.

In the step S261, the overboost determining flag FOVBT is set to one, an overboost timer TMROB is reset to zero in the following step S262, and the subroutine is terminated.

On the other hand, in the step S259, when the cylinder intake gas amount Qcyl (mg) per stroke cycle of the diesel engine 1 is less than the overboost determining intake gas amount TOcyl, the subroutine resets the overboost determining flag FOVBT to zero in a step S260, and the routine is terminated. Here, FOVBT=1 shows that control of overboost is required, and FOVBT=0 shows that there is no possibility of overboost.

The overboost determining flag FOVBT is used for suppression in a subroutine for setting the target opening rate Rvnt of the variable nozzle 53 of the turbocharger 50 described later.

The overboost timer TMROB shows the elapsed time after the overboost determining flag FOVBT changes to one from zero.

The change of the accelerator opening Cl and the overboost determining flag FOVBT will now be described, referring to FIG. 40A–40E.

Figures 40A, 40B, 40C, 40D, 40E:
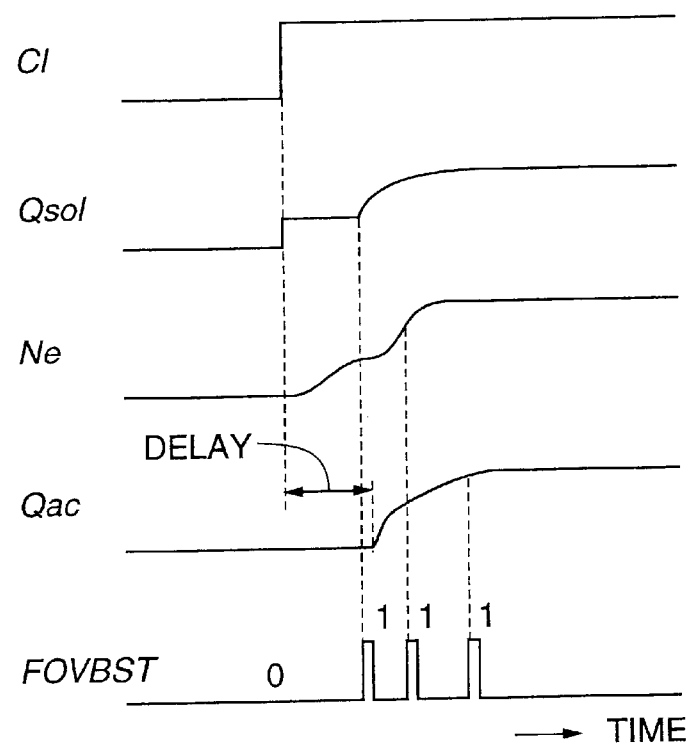
FIGS. 40A–40E are timing charts describing a variation of the overboost determining flag FOVBST with respect to a variation of an accelerator opening.

When the accelerator pedal is sharply depressed as shown in FIG. 40A, firstly, the target fuel injection amount Qsol changes as shown in FIG. 40B, the engine rotation speed Ne changes as shown in FIG. 40C, and the cylinder intake fresh air amount Qac changes as shown in FIG. 40D.

According to the subroutine of FIG. 39, whenever the target fuel injection amount Qsol, engine rotation speed Ne or cylinder intake fresh air amount Qac vary largely, the overboost determining flag FOVBT is set to one.

If determination of overboost is performed depending only on the cylinder intake fresh air amount Qac, the suppression operation may be too late for generation of the overboost, hence according to this invention, the delay in the determination is prevented by adding the target fuel injection amount Qsol and engine rotation speed Ne, which have an earlier reaction, to the basis for determination of overboost.

In FIGS. 40A–40E, a smoke limit is introduced in the target fuel injection amount Qsol.

That is, as the change in the cylinder intake fresh air amount Qac is late for the change of accelerator opening, if the target fuel injection amount Qsol is made to increase rapidly according to the change of accelerator opening, smoke will be produced.

Hence, a restriction is applied to the amount of increase of the target fuel injection amount Qsol. This restriction is the smoke limit, and the increase in the target fuel injection amount Qsol is separated into two phases in FIG. 40B due to the smoke limit.

Figure 43:
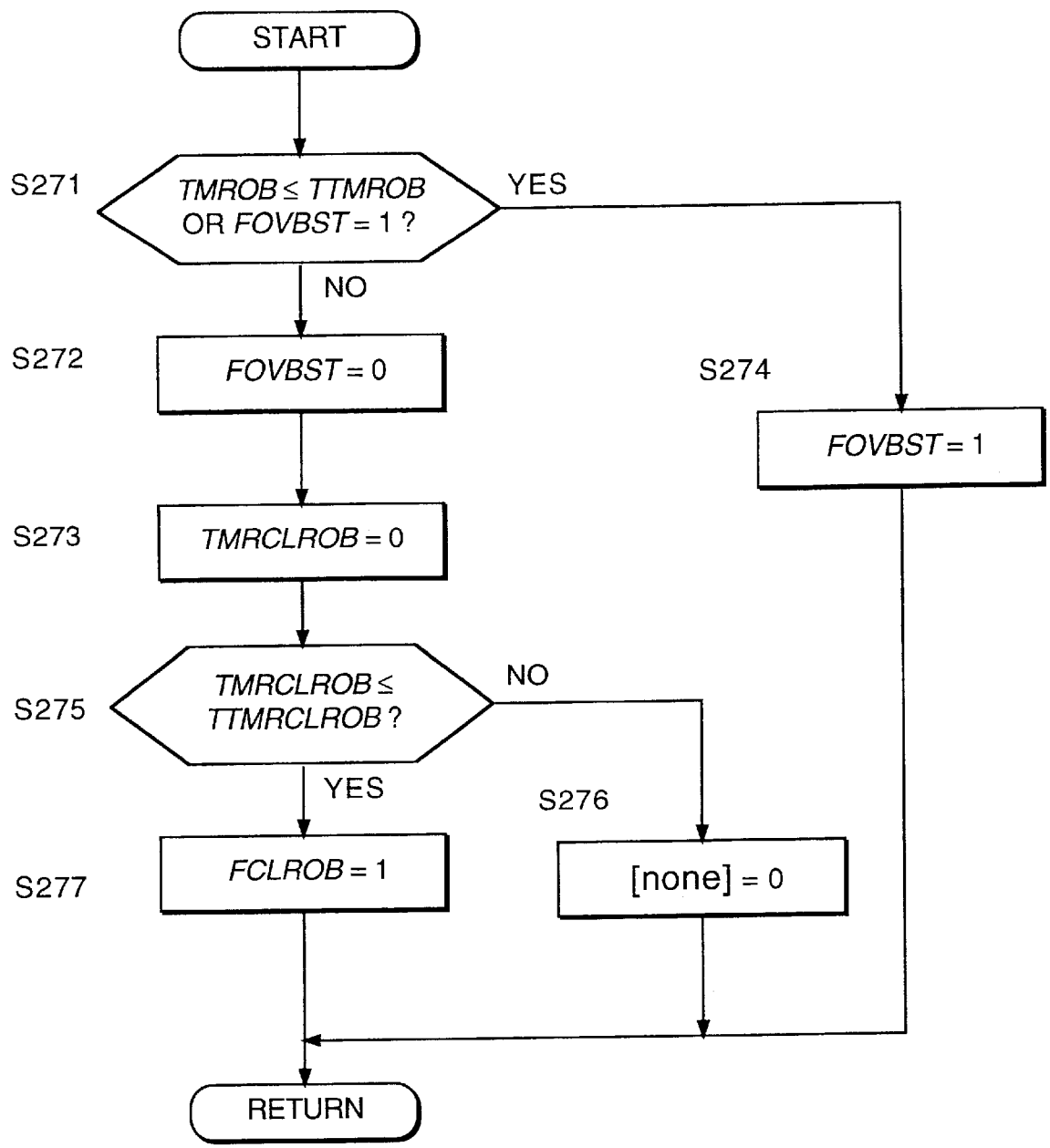
FIG. 43 is a flowchart describing a subroutine for setting a suppression release flag FCLROB performed by the controller.

Now, referring again to FIG. 38, the controller 41 sets a suppression release flag FCLROB by a subroutine shown in FIG. 43 in a step S242.

The suppression release flag FCLROB is introduced due to the following reasons.

Overboost suppression is performed over a predetermined time.

After the predetermined time passes, when the variable nozzle 53 is immediately driven in the closing direction and the supercharging pressure is increased, it may give rise to overboost.

Figure 44:
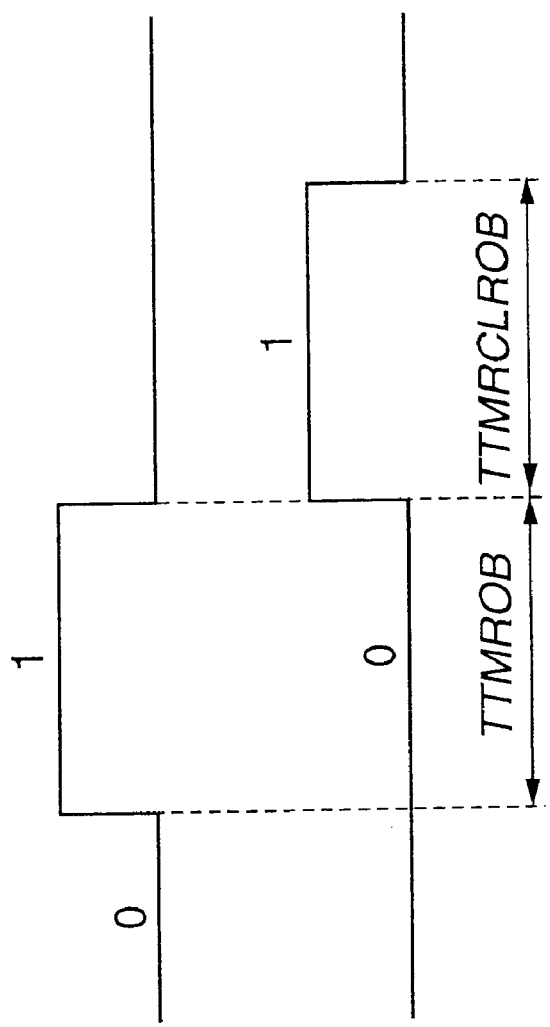
FIGS. 44A and 44B are timing charts describing a variation of the overboost determining flag FOVBST and the suppression release flag FCLROB.

Hence, the suppression release flag FCLROB is introduced, and as shown in FIGS. 44A and 44B, when the overboost determining flag FOVBST changes from one through zero, the suppression release flag FCLROB is changed over from zero to one.

The opening of the variable nozzle 53 is slowly returned to the opening before the suppression of overboost took place in the period when the suppression release flag FCLROB is one.

The above control will be described referring to FIG. 43.

In a step S271, the controller 41 determines whether or not the overboost timer TMROB is below a predetermined suppression period TTMROB, or whether or not the overboost determining flag FOVBST is one When either of the above conditions is satisfied, it is considered that overboost suppression control is underway.

In this case, in a step S274, the subroutine continues the state wherein the overboost determining flag FOVBST=1, and the subroutine is terminated.

When neither of the conditions of step S271 is satisfied, it is considered that overboost suppression control is not being performed. In this case, the subroutine proceeds to a step S272.

In the step S272, the overboost determining flag FOVBST is reset to zero, and an overboost clear timer TMRCLROB is reset to zero in a following step S273.

The overboost clear timer TMRCLROB shows the elapsed time after the overboost determining flag FOVBST changes to zero from one.

In a following step S275, it is determined whether or not the overboost clear timer TMRCLROB is less than a predetermined suppression release period TTMRCLROB.

When the determination result of the step S275 is affirmative, the subroutine proceeds to a step S277, and when it is negative, the subroutine proceeds to a step S276.

In the step S277, the suppression release flag FCLROB is set to one, and the subroutine is terminated.

In the step S276, the suppression release flag FCLROB is reset to zero, and the subroutine is terminated.

When the suppression release flag FCLROB is reset to zero, overboost suppression control is terminated and normal operation of the diesel engine 1 is performed thereafter.

On the other hand, immediately after resetting the overboost determining flag FOVBST to zero in the step S272, the determination result of the step S275 must be affirmative, and the suppression release flag FCLROB changes from zero to one due to operation in the step S277 at this time.

Figure 45:
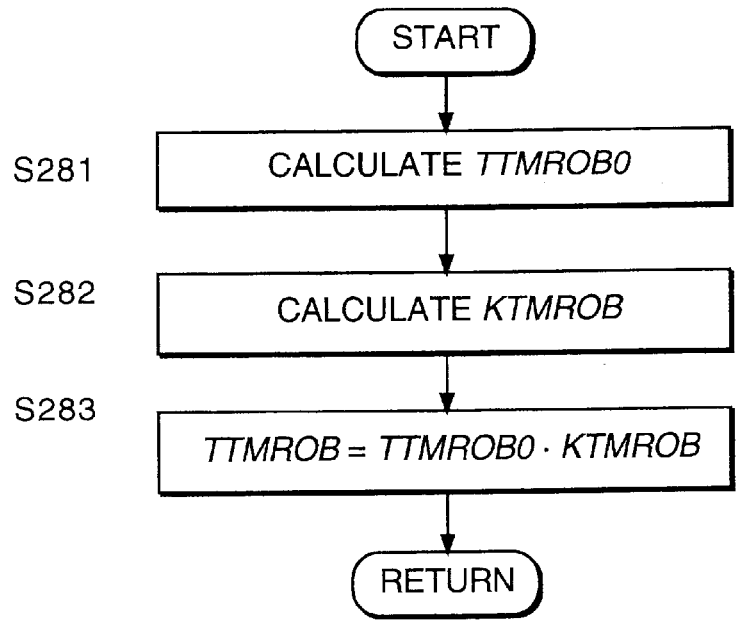
FIG. 45 is a flowchart describing a routine for calculating an overboost suppressing period TTMROB performed by the controller.

The suppression period TTMROB used in the step S271 is calculated by the separate routine shown in FIG. 45. Also, the suppression release period TTMRCLROB used in step S275 is calculated by the separate routine shown in FIG. 48. Each of these separate routines is performed every ten milliseconds.

Figure 46:
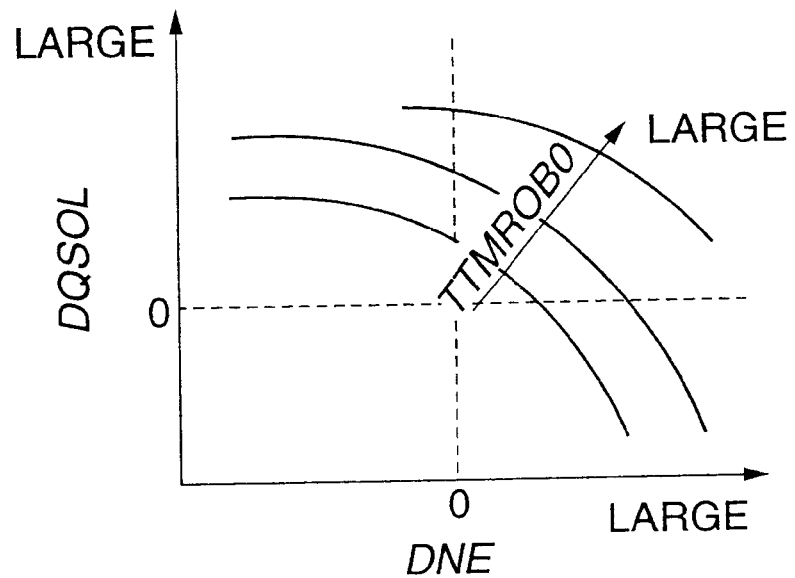
FIG. 46 is a diagram describing the contents of a map of an overboost suppressing period basic value TTMROB0 stored by the controller.

First, referring to FIG. 45, the controller 41 calculates a suppression period basic value TTMROB0 by looking up a map shown in FIG. 46 from the engine rotation speed variation DNE and fuel injection variation amount DQSOL in a step S281.

Figure 47:
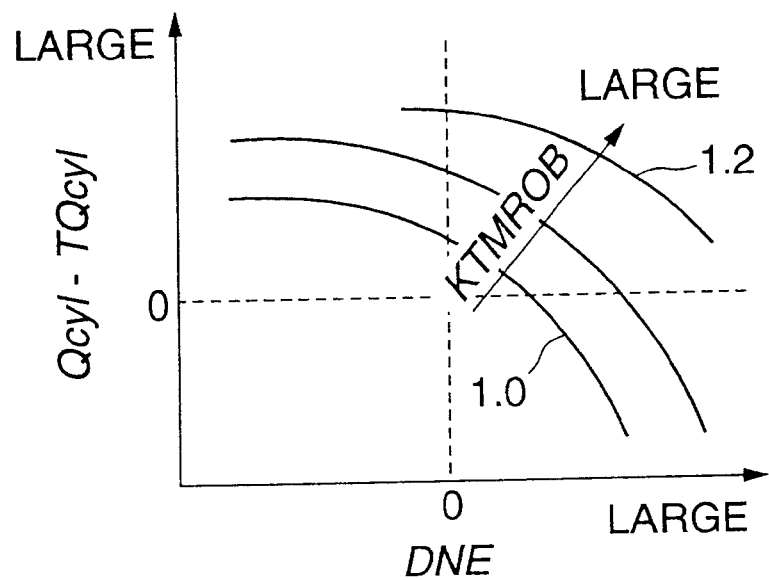
FIG. 47 is a diagram describing the contents of a map of an overboost suppressing period correction coefficient KTMROB stored by the controller.

In a following step S282, a correction coefficient KTMROB of the suppression period is calculated referring to a prestored map in the controller 41 whereof the contents are shown in FIG. 47.

The correction coefficient KTMROB of suppression period is set based on the difference of the cylinder intake fresh air amount variation DQAC, cylinder intake gas amount Qcyl, and overboost determining intake gas amount TQcyl.

In a step S283, the suppression period TTMROB is calculated by multiplying the suppression period basic value TTMROB0 by the correction coefficient KTMROB.

The engine rotation speed variation DNE, the fuel injection variation amount DQSOL and the cylinder intake fresh air amount variation DQA are calculated by the same method as that of the step S254 of FIG. 39.

The cylinder intake gas amount Qcyl is calculated by the same method as that of the step S252 of FIG. 39.

The overboost determining intake gas amount TQcyl is calculated by the same method as that of the step S258 of FIG. 39.

In FIG. 46, the reason why the suppression period basic value TTMROB0 is increased the larger the engine rotation speed variation DNE or the cylinder intake fresh air amount variation DQAC, is because overboost occurs more easily the larger the variation of the engine rotation speed Ne or the target fuel injection amount Qsol which represent the engine load.

In FIG. 47, the reason why the correction coefficient KTMROB is increased as the cylinder intake fresh air amount variation DQAC increases or the difference between the cylinder intake gas amount Qcyl and the overboost determining intake gas amount TQcyl increases, is because overboost occurs more easily as the cylinder intake fresh air amount variation DQAC increases or the difference between the cylinder intake gas amount Qcyl and the overboost determining intake gas amount TQcyl increases.

Figure 48:
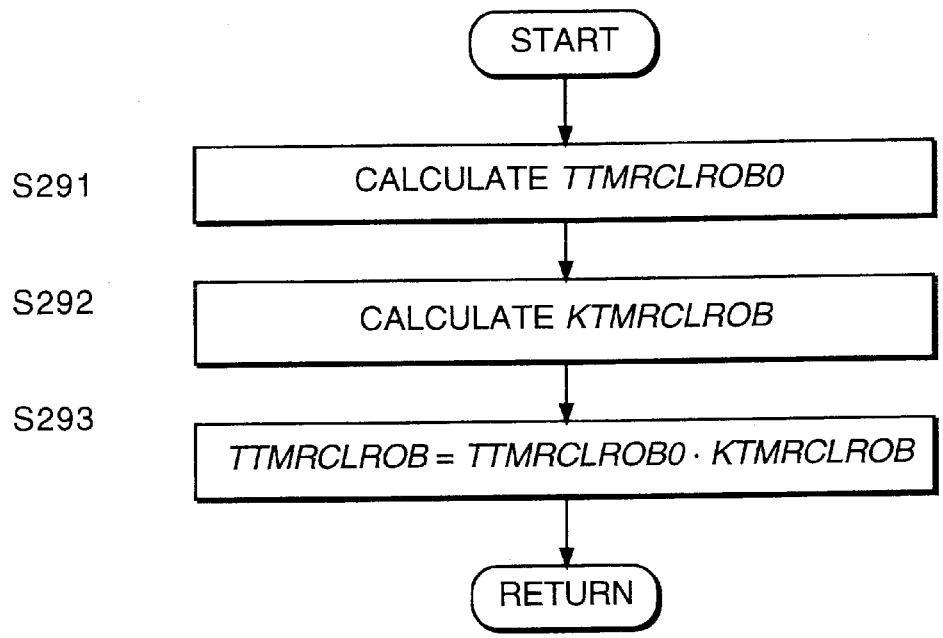
FIG. 48 is a flowchart describing a routine for calculating a suppression release period TTMRCLROB performed by the controller.
Figure 49:
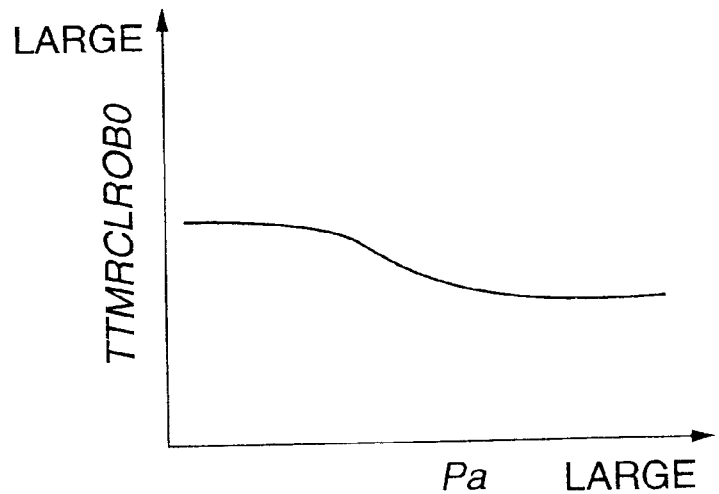
FIG. 49 is a diagram describing the contents of a map of a suppression release period basic value TTMRCLROB0 stored by the controller.

Next, referring to FIG. 48, the suppression release period basic value TTMRCLR is calculated in a step S291 from the atmospheric pressure Pa detected by the atmospheric pressure sensor 38 and a prestored map in the controller 41 whereof the contents are shown in FIG. 49.

In FIG. 49, the reason why the suppression release period basic value TTMRCLROB0 is increased the lower the atmospheric pressure Pa, is as follows.

The exhaust gas amount of the diesel engine 1 is larger, the larger the difference of the exhaust pressure and atmospheric pressure.

If the exhaust pressure is fixed, the exhaust gas amount is larger the lower the atmospheric pressure Pa. The work which the turbocharger 50 performs also becomes large, and it becomes easy to produce an overboost.

Hence, the suppression release period basic value TTMRCLROB0 is increased the lower the atmospheric pressure Pa. A typical condition under which the atmospheric pressure Pa is low, is running on high ground.

Figure 50:
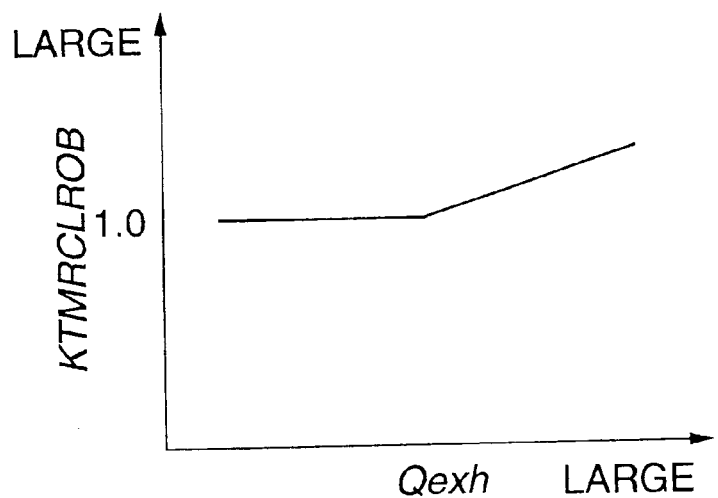
FIG. 50 is a diagram describing the contents of a map of a suppression release period correction coefficient KTMRCLROB stored by the controller.

In a following step S292, a suppression release period correction coefficient KTMRCLROB is calculated from the real exhaust gas amount Qexh, referring to a prestored map in the controller 41 whereof the contents are shown in FIG. 50.

In FIG. 50, when the real exhaust gas amount Qexh increases beyond a certain level, the correction coefficient KTMRCLROB increases because it becomes easy to generate an overboost from this level.

In a following step S293, the suppression release period TTMRCLROB is calculated by multiplying the suppression release period basic value TTMRCLROB0 by the suppression release period correction coefficient KTMRCLROB.

Figure 51:
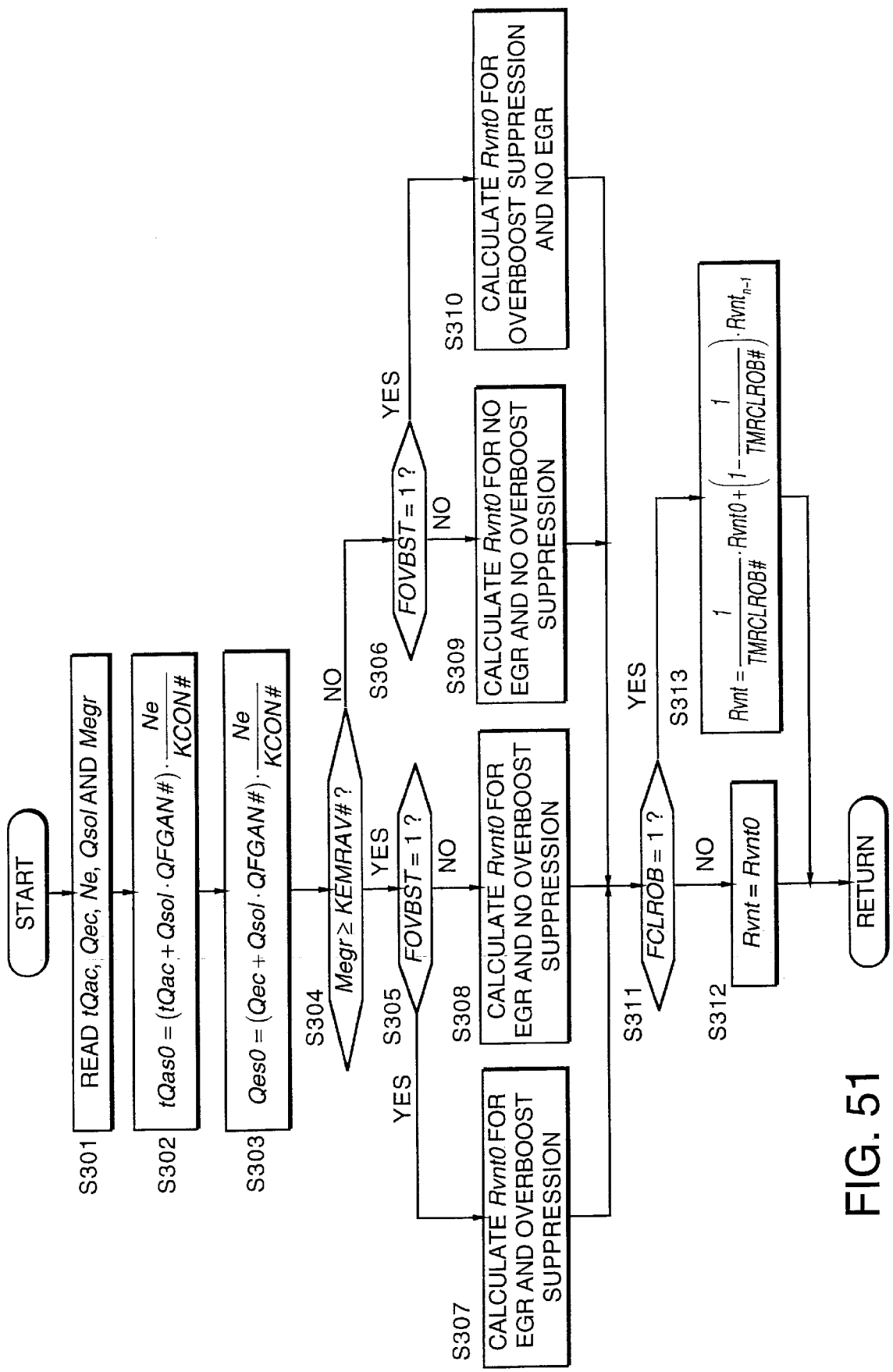
FIG. 51 is a flowchart describing a subroutine for calculating a target opening rate Rvnt of the variable nozzle performed by the controller.

Referring again to FIG. 38, after setting the suppression release flag FCLROB in the step S242, the controller 41 determines the target opening rate Rvnt of the variable nozzle 53 using a subroutine shown in FIG. 51 in the step S243.

The opening rate of the variable nozzle 53 is a numerical value which expresses, as a percentage, the ratio of the opening cross-sectional area to the opening cross-sectional area when the variable nozzle 53 is fully open.

In the fully open state, the opening rate is 100%, and in the closed state, the proportion is 0%. Although the opening rate is used as a general value to represent the opening of the variable nozzle 53 regardless of the relation with the capacity of the turbocharger 50, it is of course also possible to replace the opening rate by the opening area.

The turbocharger 50 used with this device is so constructed that the supercharging pressure is higher the smaller the opening rate of the variable nozzle 53. When the variable nozzle 53 is fully open, the supercharging pressure is a minimum, and when the variable nozzle 53 is fully closed, the supercharging pressure is a maximum, for a given exhaust gas amount.

Now, referring to FIG. 51, firstly in a step S301, the controller reads the target intake fresh air amount tQac, real EGR amount Qec, engine rotation speed Ne, target fuel injection amount Qsol and target EGR rate Megr.

In a following step S302, an intake fresh air amount equivalent value tQas0 for calculating the target opening rate Rvnt of the variable nozzle 53 is calculated by the following equation (22).

$$tQas0 = (tQac + Qsol \cdot QFGAN\#) \cdot \frac{Ne}{KCON\#} \quad (22)$$

where, QFGAN#=gain, and
KCON#=constant.

In a following step S303, an EGR amount equivalent value Qes0 for calculating the target opening rate Rvnt of the variable nozzle 53 is calculated by the following equation (23).

$$Qes0 = (Qec + Qsol \cdot QFGAN\#) \cdot \frac{Ne}{KCON\#} \quad (23)$$

In equations (22) and (23), Ne/KCON# is a multiplier for changing the fresh air amount or the EGR amount per cylinder into a value per unit time.

Also, in equations (22) and (23), Qsol×QFGAN# is added to the target intake fresh air amount tQac or the real EGR amount Qec for changing the target opening rate Rvnt according to the load of the diesel engine 1.

Herein, the target fuel injection amount Qsol is considered to represent the engine load, and the effect of the engine load is adjusted by the gain QFGAN#.

In the following description, tQas0 calculated in this way is referred to as a set intake fresh air amount equivalent value, and Qes0 is referred to as a set EGR amount equivalent value.

In a following step S304, it is determined whether or not the target EGR rate Megr is greater than a predetermined value KEMRAV#.

The predetermined value KEMRAV# is a value for determining from the target EGR rate Megr whether or not exhaust gas recirculation is actually performed.

When the target EGR rate Megr is larger than the predetermined value KEMRAV#, it is determined whether or not the overboost determining flag FOVBST is one in a step S305.

When the target EGR rate Megr is less than the predetermined value KEMRAV#, it is determined whether or not the overboost determining flag FOVBST is one in a step S306.

When the target EGR rate Megr is larger than the predetermined value KEMRAV# and the overboost determining flag FOVBST is one, it indicates that exhaust gas recirculation is performed and overboost suppression is required. In this case, the subroutine proceeds to a step S307.

Figure 52:
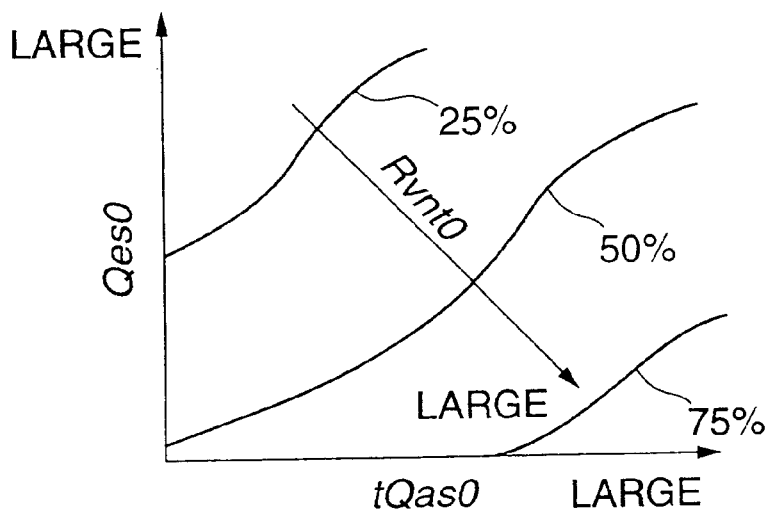
FIG. 52 is a diagram describing the contents of a map of a target opening rate basic value Rvnt0 of the variable nozzle in an EGR operation region under the overboost suppressing control, stored by the controller.

In the step S307, based on the set intake fresh air amount equivalent value tQas0 and the set EGR amount equivalent value Qes0, the target opening rate basic value Rvnt0 of the variable nozzle 53 is calculated by looking up a map prestored in the controller 41 whereof the contents are shown in FIG. 52.

When the target EGR rate Megr is larger than the predetermined value KEMRAV# and the overboost determining flag FOVBST is not one, it indicates that exhaust gas recirculation is performed but overboost suppression is not required. In this case, the subroutine proceeds to a step S308.

Figure 53:
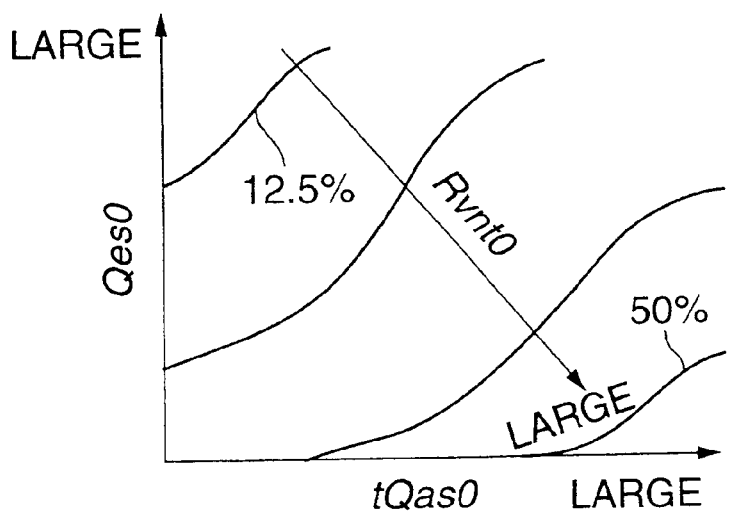
FIG. 53 is a diagram describing the contents of a map of the target opening rate basic value Rvnt0 of the variable nozzle in the EGR operation region under a normal engine control, stored by the controller.

In the step S308, based on the set intake fresh air amount equivalent value tQas0 and the set EGR amount equivalent value Qes0, the target opening rate basic value Rvnt0 of the variable nozzle 53 is calculated by looking up a map prestored in the controller 41 whereof the contents are shown in FIG. 53.

In the maps of FIG. 52 and 53, the target opening rate basic value Rvnt0 is set to decrease as the set EGR amount equivalent value Qes0 increases, due to the following reason.

If the EGR amount increases, the fresh air amount will become less relatively. The air-fuel ratio inclines to the rich side due to reduction in the fresh air amount, and the diesel engine 1 easily generates smoke. To prevent smoke, it is necessary to increase the supercharging pressure of the turbocharger 50 and to ensure the fresh air amount. Thus, the target opening rate basic value Rvnt0 is decreased as the EGR amount increases.

The characteristics of the maps of FIG. 52 and 53 differ depending on whether fuel cost-performance, exhaust composition or acceleration performance is stressed. These characteristics will be described referring to FIGS. 59A–59C.

Figure 59A:
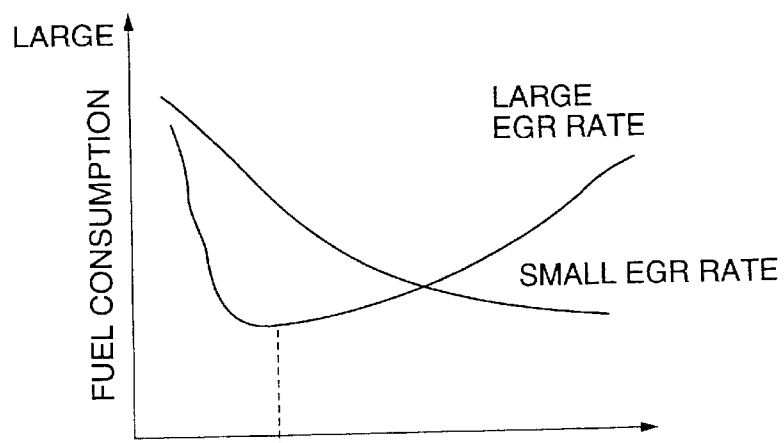
FIGS. 59A–59C are timing charts describing an effect of an EGR rate on an exhaust gas composition and an intake fresh air amount of the diesel engine.
Figure 59B:
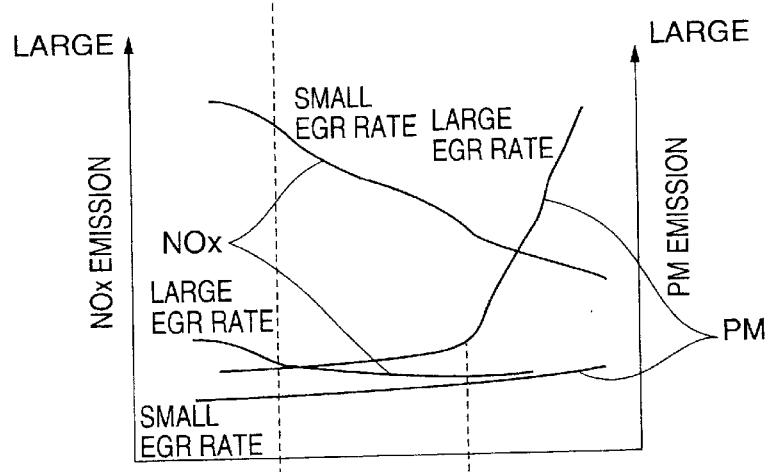
Figure 59C:
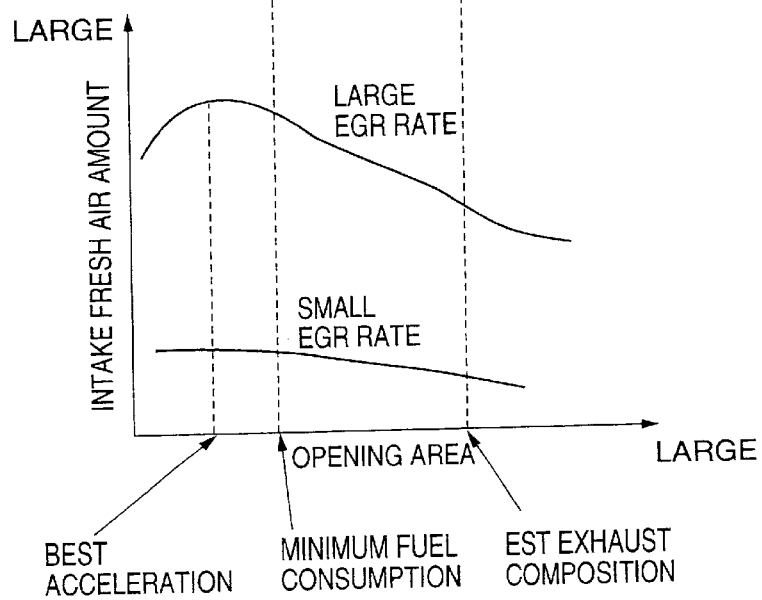

The diagrams of FIGS. 59A–59C, show how fuel consumption, nitrogen oxides (NOx), particulates (PM) and intake fresh air amount vary relative to the opening area of the variable nozzle 53 in the case where the EGR rate is large and the case where it is small, when the engine rotation speed and engine torque are kept constant. The intake fresh air amount corresponds to the fuel injection amount, and the fuel injection amount represents the acceleration performance of the vehicle.

From these diagrams, it is seen that the opening area for minimizing fuel consumption, the opening area for optimizing exhaust composition and the opening area for maximizing acceleration performance, are different.

If fuel consumption is stressed, for example, the opening area of the variable nozzle 53 which minimizes fuel consumption is calculated for various engine speeds and engine torques, and the maps of FIG. 52, 53 are generated based on this data.

When the target EGR rate Megr is smaller than the determined value KEMRAV# in the step S304 and the overboost determining flag FOVBST is one in the step S306, it indicates that exhaust gas recirculation is effectively not performed but overboost suppression is required. In this case, the subroutine proceeds to a step S310. In the step S310, based on the set intake fresh air amount equivalent value tQas0 and the target fuel injection amount Qsol, the target opening rate basic value Rvnt0 of the variable nozzle 53 is calculated referring to a map prestored in the controller 41 whereof the contents are shown in FIG. 54.

When the target EGR rate Megr is smaller than the predetermined value KEMRAV# in the step S304 and the overboost determining flag FOVBST is not one in the step S306, it indicates that exhaust gas recirculation is effectively not performed and overboost suppression is unnecessary. In this case, the subroutine proceeds to a step S309.

Figure 55:
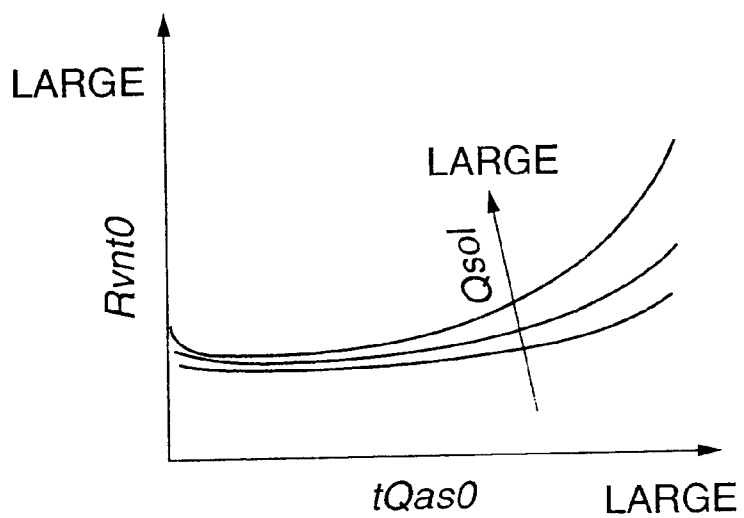
FIG. 55 is a diagram describing the contents of a map of a target opening rate basic value Rvnt0 of the variable nozzle in the non-EGR operation region under the normal engine control, stored by the controller.

In the step S309, based on the set intake fresh air amount equivalent value tQas0 and the target fuel injection amount Qsol, the target opening rate basic value Rvnt0 of the variable nozzle 53 is calculated referring to a map prestored in the controller 41 whereof the contents are shown in FIG. 55.

Figure 54:
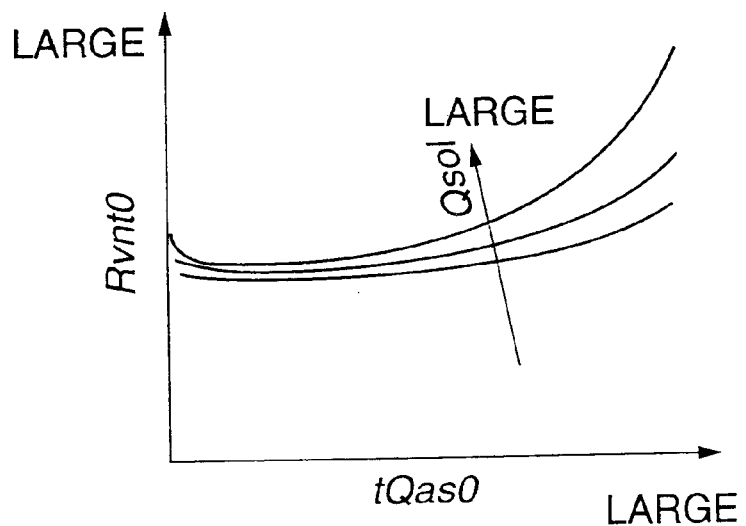
FIG. 54 is a diagram describing the contents of a map of a target opening rate basic value Rvnt0 of the variable nozzle in a non-EGR operation region under the overboost suppressing control, stored by the controller.

The maps of FIG. 52 and FIG. 54 applied during overboost suppression give a larger target opening rate basic value Rvnt0 than the maps of FIG. 53 and FIG. 55 applied during normal running.

In order to suppress the overboost, the supercharging pressure has to be weakened, so Rvnt0 is increased to increase the opening of the variable nozzle 53.

In the maps of FIGS. 52, 53, the target opening rate basic value Rvnt0 is set based on the intake fresh air amount equivalent value tQas0 and the set EGR amount equivalent value Qes0, but it is also possible to set the target opening rate basic value Rvnt0 based on the target intake fresh air amount tQac and the real EGR amount Qec.

Further, it is also possible to set the target opening rate basic value Rvnt0 based on the target intake fresh air amount tQac and the EGR amount Qec0 per cylinder at the inlet of the collector 3A.

In the transient running state of the diesel engine 1, the EGR amount Qec0 per cylinder at the inlet of the collector 3A varies in a stepwise manner, and there is a delay until the real EGR amount Qec catches up with the target value. Due to a deviation in the EGR amount equivalent to this delay, an error arises in the target opening rate basic value Rvnt0.

When the target opening rate basic value Rvnt0 is set, by using the real EGR amount Qec that was obtained by performing delay processing on the EGR amount Qec0 per cylinder at the inlet of the collector 3A, a target intake fresh air amount optimized for one of the preselected fuel consumption, discharge composition and acceleration characteristics is obtained, even when the diesel engine 1 is in a transient running state.

Thus, after calculating the target opening rate basic value Rvnt0, in a step S311, it is determined whether or not the suppression release flag FCLROB is one.

When the suppression release flag FCLROB is not one (i.e., when the flag FCLROB is zero), it shows that the current running state is not in the overboost suppression release period.

In this case, the target opening rate Rvnt is set equal to the target opening rate basic value Rvnt0, and the subroutine is terminated.

When the suppression release flag FCLROB is one, it shows that the current running state is in the suppression release period.

In this case, the target opening rate Rvnt is set by equation (24), and the subroutine is terminated.

$$Rvnt = \frac{1}{TMRCLROB\#} \cdot Rvnt0 + \left(1 - \frac{1}{TMRCLROB\#}\right) \cdot Rvnt_{n-1} \quad (24)$$

where, TMRCLROB#=time constant, and $Rvnt_{n-1}$=Rvnt calculated on immediately preceding occasion when the subroutine was executed.

Thus, generation of overboost is prevented by restricting the closing rate of the variable nozzle 53 by equation (24) during the suppression release period.

Figure 60:
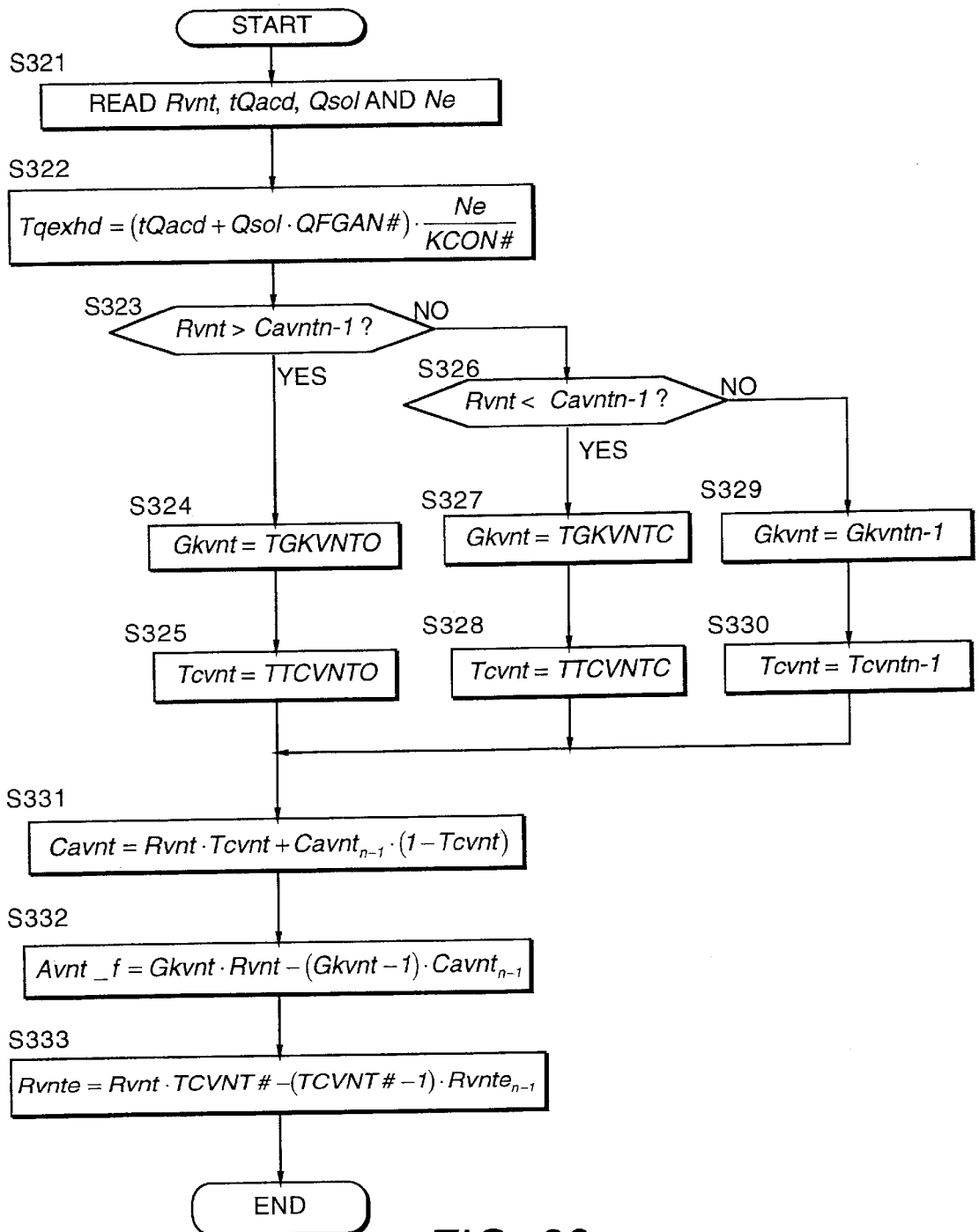
FIG. 60 is a flowchart describing a routine for calculating an open loop control amount Avnt_f of an opening rate of the variable nozzle and a delay processing value Rvnte of the target opening rate Rvnt of the variable nozzle performed by the controller.

Referring again to FIG. 38, after determining the target opening rate Rvnt of the variable nozzle 53 in the step S243, in a following step S244, the controller 41 performs advance processing on the target opening rate Rvnt taking account of the dynamics of the intake air system using a routine shown in FIG. 60. This routine is performed at an interval of ten milliseconds.

The response delay after outputting a duty signal to the pressure control valve 56 until the intake fresh air amount changes, includes a gas flow lag depending on the turbo lag and the flowrate of intake air and exhaust gas, and the response delay of the pressure actuator 54. The time constant of the gas flow lag varies depending on the exhaust gas amount of the diesel engine 1, but the time constant of the response delay of the pressure actuator 54 is fixed.

In this control device, high control precision is obtained by calculating these delays individually and compensating each response delay individually in the control of the opening rate of the variable nozzle 53. Advance processing of the target opening rate Rvnt of step S244 is performed in order to compensate the gas flow lag.

The correction of the response delay of the actuator 54 is performed separately and is described later.

Referring to FIG. 60, the controller 41, in a step S321, first reads the target opening rate Rvnt, the delay processing value tQacd of the target intake fresh air amount which was calculated by the routine of FIG. 22, the target fuel injection amount Qsol and the engine rotation speed Ne. In a following step S322, the cylinder exhaust gas amount Tqexhd (mg) per stroke cycle of the diesel engine 1 is calculated by the following equation (25).

$$Tqexh = (tQacd + Qsol \cdot QFGAN\#) \cdot \frac{Ne}{KCON\#} \quad (25)$$

where, QFGAN#=gain, and

KCON#=constant.

Equation (25) is equivalent to an equation wherein the target intake fresh air amount tQac on the right-hand side of equation (22) is replaced by the delay processing value tQacd of the target intake fresh air amount.

Consequently, the cylinder exhaust gas amount Tqexhd per stroke cycle of the diesel engine 1 obtained instead of the set intake fresh air amount equivalent value tQas0, varies under a time constant set assuming variation of the actual exhaust gas amount.

Hence, the cylinder exhaust gas amount Tqexhd per stroke cycle of the diesel engine 1 is referred to as a real exhaust gas amount equivalent value.

FIGS. 61A–61D show the variation of the set intake fresh air amount equivalent value tQas0 and the real exhaust gas amount equivalent value Tqexhd when the target fuel injection amount Qsol is increased in steps.

It was confirmed by experiments performed by the Inventors that the variation of the real exhaust gas amount equivalent value Tqexhd of FIG. 61D relative to the target fuel injection amount Qsol of FIG. 61B closely follows the variation of the actual exhaust gas amount shown by the broken line in this figure.

In a following step S323, the target opening rate Rvnt is compared with an opening prediction value $Cavnt_{n-1}$ calculated on the immediately preceding occasion the routine was performed. An opening prediction value Cavnt is a weighted average value of the target opening rate Rvnt.

Here, the target opening rate Rvnt is a value which varies in stepwise fashion, and the opening prediction value Cavnt is a value which varies smoothly.

Therefore, when the target opening rate Rvnt is larger than $Cavntn_{n-1}$, it shows that the variable nozzle 53 is operating in the opening direction. When the target opening rate Rvnt is smaller than $Cavnt_{n-1}$, it shows that the variable nozzle 53 is operating in the closing direction.

Figure 62:
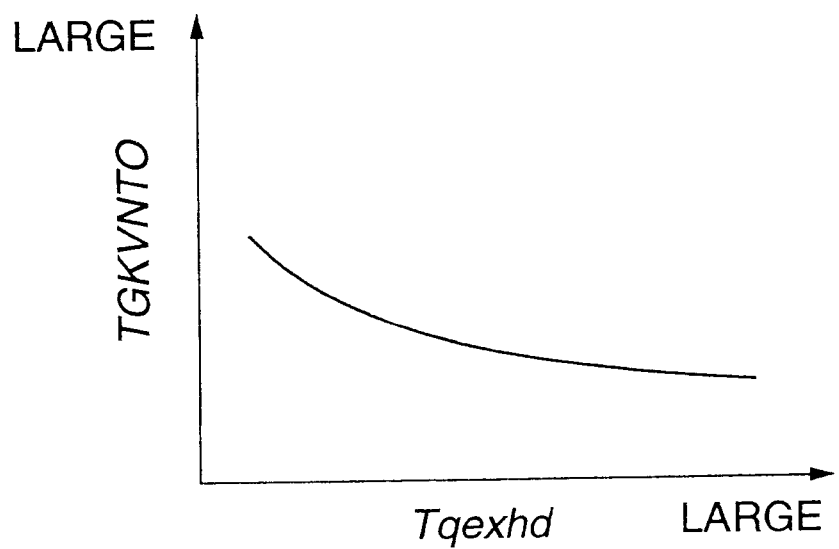
FIG. 62 is a diagram describing the contents of a map of an advance correction gain TGKVNTO when the variable nozzle is operating in an opening direction, stored by the controller.

Hence, when the target opening rate Rvnt is larger than $Cavnt_{n-1}$, in a step S324, the routine calculates an advance correction gain TGKVNTO when the variable nozzle 53 operates in the opening direction from the real exhaust gas amount equivalent value Tqexhd referring to a map having the contents shown in FIG. 62 which is prestored in the controller 41, and sets TGKVNTO to an advance correction gain Gkvnt.

In the following step S325, the time constant equivalent value TTCVNTO of the advance correction when the variable nozzle 53 operates in the opening direction is calculated from the real exhaust gas amount equivalent value Tqexhd referring to a map having the contents shown in FIG. 64 which is prestored in the controller 41, and TTCVNTO is set as an advance correction constant equivalent value Tcvnt. After this processing, the routine proceeds to a step S331.

On the other hand, in the step S323, when the target opening rate Rvnt is not larger than $Cavnt_{n-1}$ on the immediately preceding occasion when the routine was performed, it is determined whether or not the target opening rate Rvnt is smaller than the opening prediction value $Cavnt_{n-1}$ in the step S326.

Figure 63:
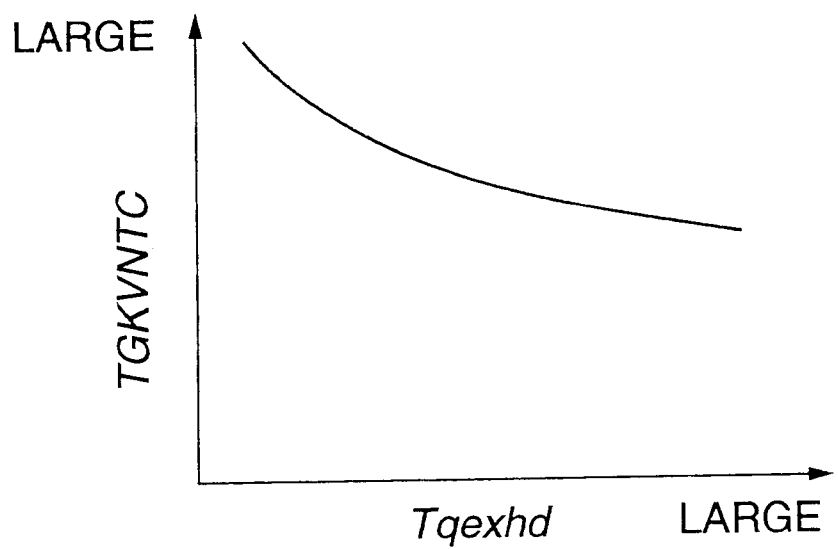
FIG. 63 is a diagram describing the contents of a map of an advance correction gain TGKVNTC when the variable nozzle is operating in a closing direction, stored by the controller.

When the target opening rate Rvnt is smaller than $Cavnt_{n-1}$, in a step S327, the advance correction gain TGKVNTC when the variable nozzle 53 operates in the closing direction, is calculated from the real exhaust gas amount equivalent value Tqexhd, referring to a map having the contents shown in FIG. 63 which is prestored in the controller 41, and TGKVNTC is set as the advance correction gain Gkvnt.

Figure 65:
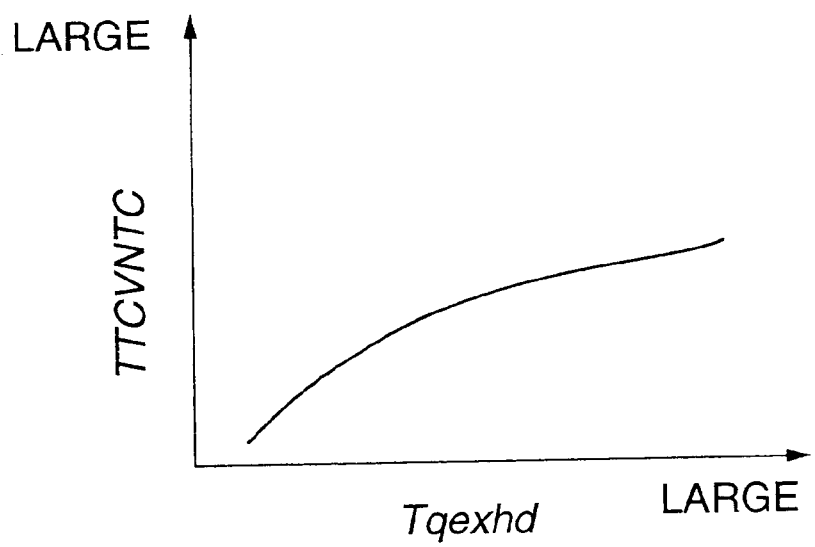
FIG. 65 is a diagram describing the contents of a map of a time constant inverse value TTCVNTC of the advance correction of the opening rate of the variable nozzle when it is operating in the closing direction, stored by the controller.

In a next step S328, the advance correction time constant equivalent value TTCVNTC when the variable nozzle 53 operates in the closing direction is calculated from the real exhaust gas amount equivalent value Tqexhd referring to a map whereof the contents are shown in FIG. 65 which is prestored in the controller 41, and TTCVNTC is set to the advance correction constant equivalent value Tcvnt. After this processing, the routine proceeds to the step S331.

In the step S326, the case when the target opening rate Rvnt is not less than the estimated opening rate $Cavnt_{n-1}$, is the case when the target opening proportion Rvnt is equal to the estimated opening rate $Cavnt_{n-1}$. In this case, the advance correction gain Gkvnt is set equal to the value $Gkvnt_{n-1}$ on the immediately preceding occasion the routine was executed, in a step S329. Likewise, the advance correction time constant equivalent value Tcvnt is set equal to the value $Tcvnt_{n-1}$ on the immediately preceding occasion the routine was executed, in a step S330. After this processing, the routine proceeds to the step S331.

The maps of FIG. 62, FIG. 63 which determine the advance correction gains TGKVNTO, TGKVNTC give a smaller value the larger the real exhaust gas amount equivalent value Tqexhd. This is because the advance correction gain Gkvnt is increased the smaller the exhaust gas amount so as to compensate the fact that the gas flow lag increases the smaller the exhaust gas amount of the diesel engine 1. Further, the reason why TGKVNTC takes a larger value than TGKVNTO for the same real exhaust gas amount equivalent value Tqexhd is because the gas flow lag is larger when the variable nozzle 53 operates in the closing direction than when it operates in the opening direction, and TGKVNTC is set larger than TGKVNTO to compensate this difference.

Figure 64:
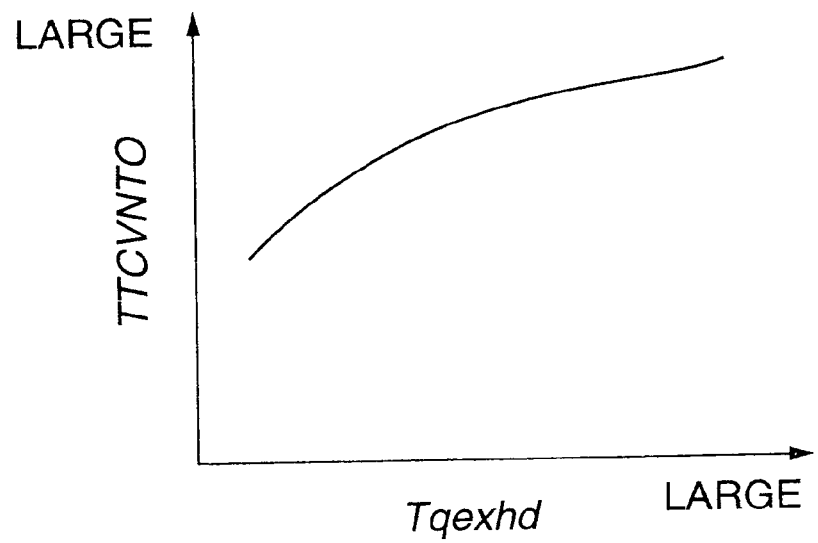
FIG. 64 is a diagram describing the contents of a map of a time constant inverse value TTCVNTO of an advance correction of the opening rate of the variable nozzle when it is operating in the opening direction, stored by the controller.

The maps of FIG. 64, FIG. 65 which determine the time constant equivalent values TTCVNTO, TTCVNTC, give a larger value the larger the real exhaust gas amount equivalent value Tqexhd. Here, the time constant equivalent value is inversely proportional to the time constant. Specifically, the larger the real exhaust gas amount equivalent value Tqexhd, the more the time constant decreases. Therefore, likewise, TTCVNTO takes a larger value than TTCVNTC for the same real exhaust gas amount equivalent value Tqexhd, i.e., the time constant when the variable nozzle 53 operates in the opening direction is less than the time constant when it operates in the closing direction.

In the step S331, the opening prediction value Cavnt is calculated by the following equation (26) using the target opening rate Rvnt and advance correction time constant equivalent value Tcvnt.

$$Cavnt = Rvnt \cdot Tcvnt + Cavnt_{n-1}(1 - Tcvnt) \quad (26)$$

where, $Cavnt_{n-1}$ = Cavnt calculated on the immediately preceding occasion the routine was executed.

In a step S332, an open loop control amount Avnt_f of the opening rate of the variable nozzle 53 is calculated by the following equation (27) from the opening prediction value Cavnt and the target opening rate Rvnt.

$$Avnt\_f = Gkvnt \cdot Rvnt - (Gkvnt - 1) \cdot Cavnt_{n-1} \quad (27)$$

The calculation of the steps S331, S332 is similar to the calculation of the steps S24, S25 in the routine of FIG. 6.

In a last step S333, a delay processing value Rvnte of the target opening rate Rvnt is calculated from the following equation (28).

$$Rvnte = Rvnt \cdot TCVNT\# - (TCVNT\# - 1) \cdot Rvnte_{n-1} \quad (28)$$

where, TCVNT# = time constant equivalent value representing the response delay of the pressure actuator 54, and $Rvnte_{n-1}$ = Rvnte calculated on the immediately preceding occasion the routine was executed.

The delay processing value Rvnte is a value taking account of the response delay of the pressure actuator 54, and corresponds to the real opening rate. In this regard, the delay processing value Rvnte of the opening rate Rvnt will be referred to as the real opening rate.

The response delay of the pressure actuator 54 is identical whether the variable nozzle 53 is closing or whether it is opening. Therefore, the time constant equivalent value TCVNT# is a constant. The real opening rate Rvnte is used for calculating a PI gain opening rate correction coefficient Gkvavnt and an opening rate reflection coefficient Gkvntlav described later.

Figure 38:
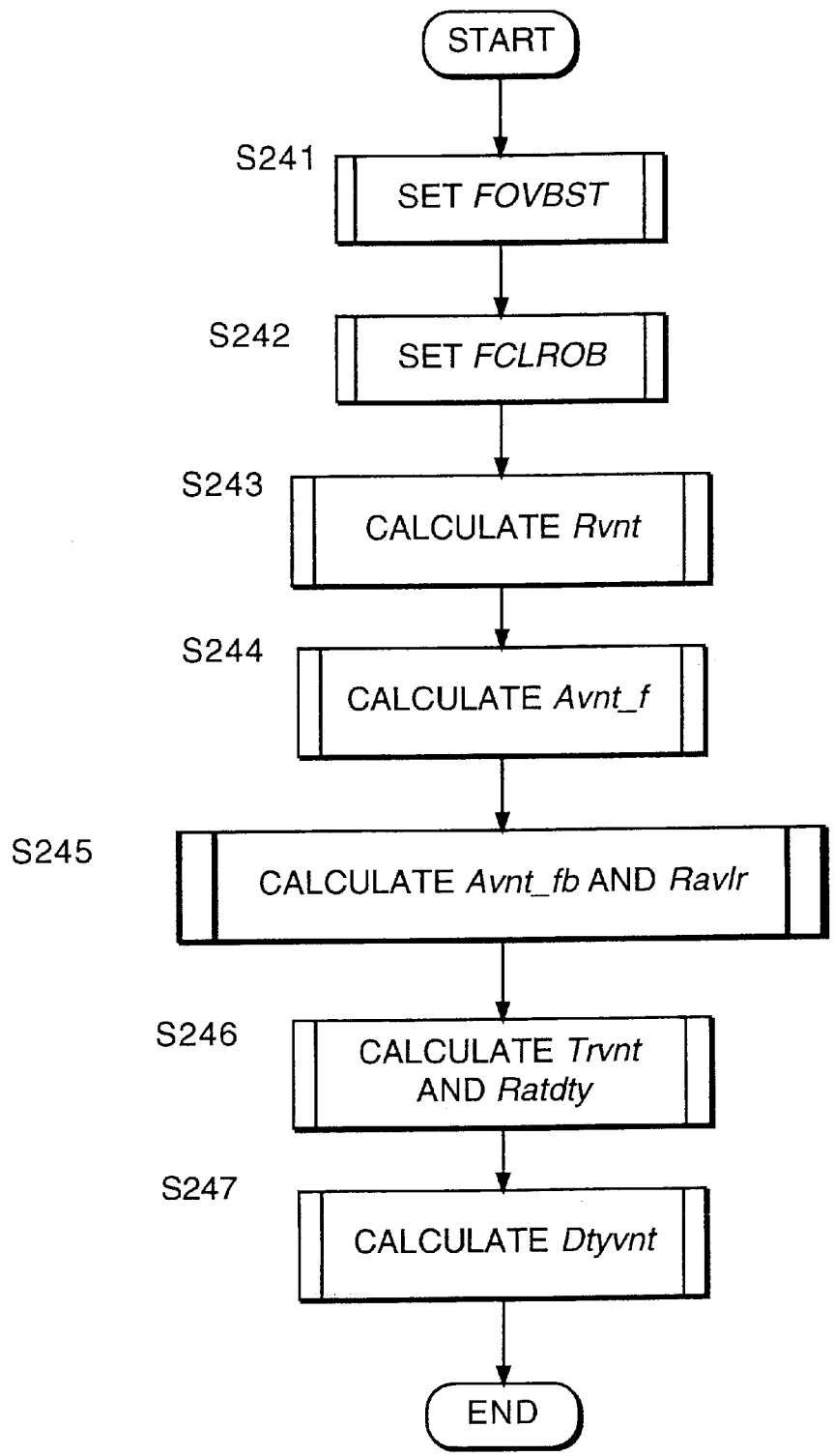
FIG. 38 is a flowchart describing a routine for setting a duty value Dtyvnt of a pressure control valve of a variable nozzle performed by the controller.

After the controller 41 calculates the opening prediction value Cavnt, open loop control amount Avnt_f and the real opening rate Rvnte by the routine of FIG. 60 in this way, a feedback correction amount Avnt_fb of the opening rate and a learning value Ravir related to the feedback correction amount Avnt_fb are calculated in a step S245 of FIG. 38. This calculation is performed by a subroutine shown in FIG. 66.

Figure 66:
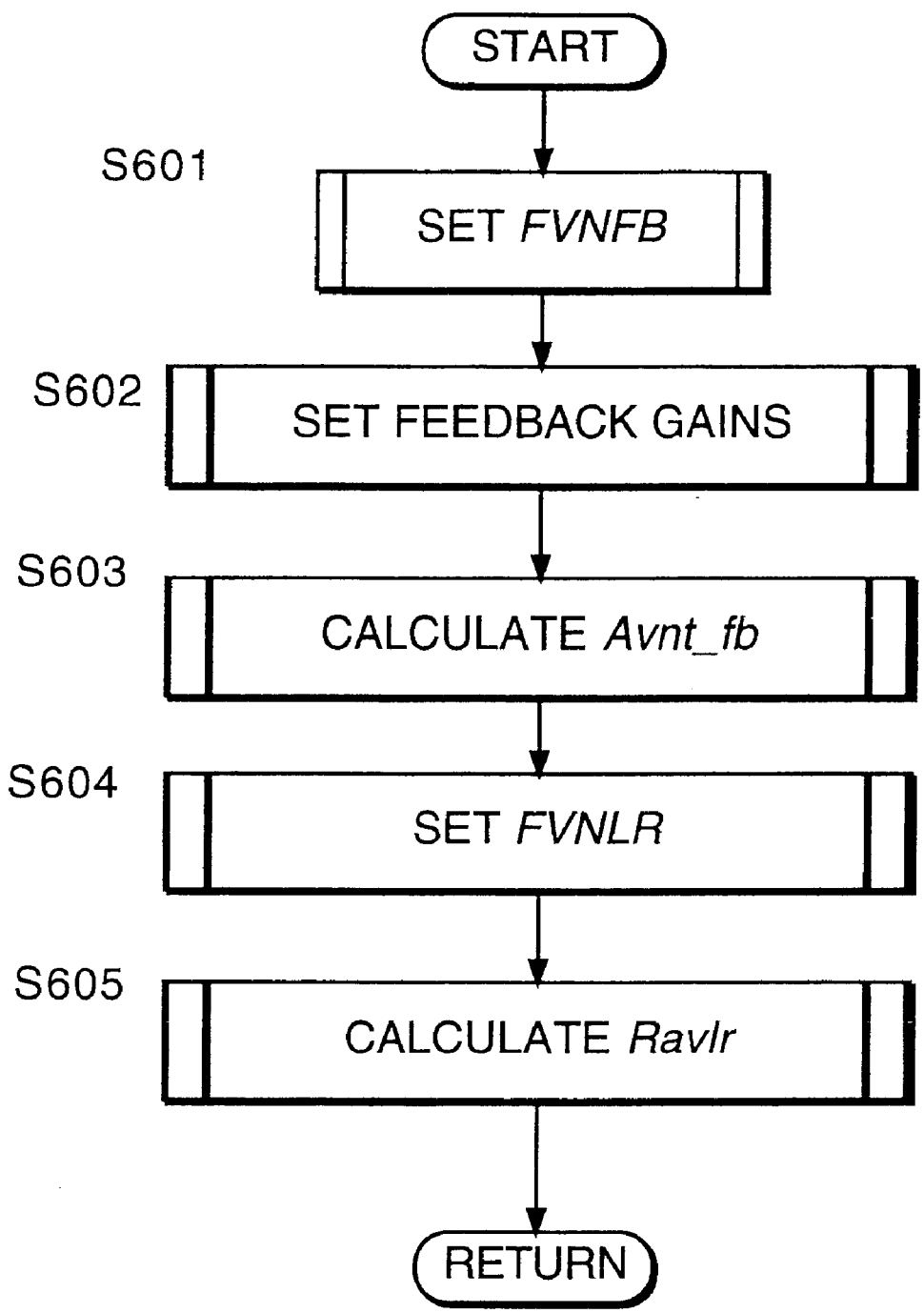
FIG. 66 is a flowchart describing a subroutine for calculating a feedback correction amount Avnt_fb of the opening rate of the variable nozzle and an opening rate learning value Ravlr performed by the controller.
Figure 67:
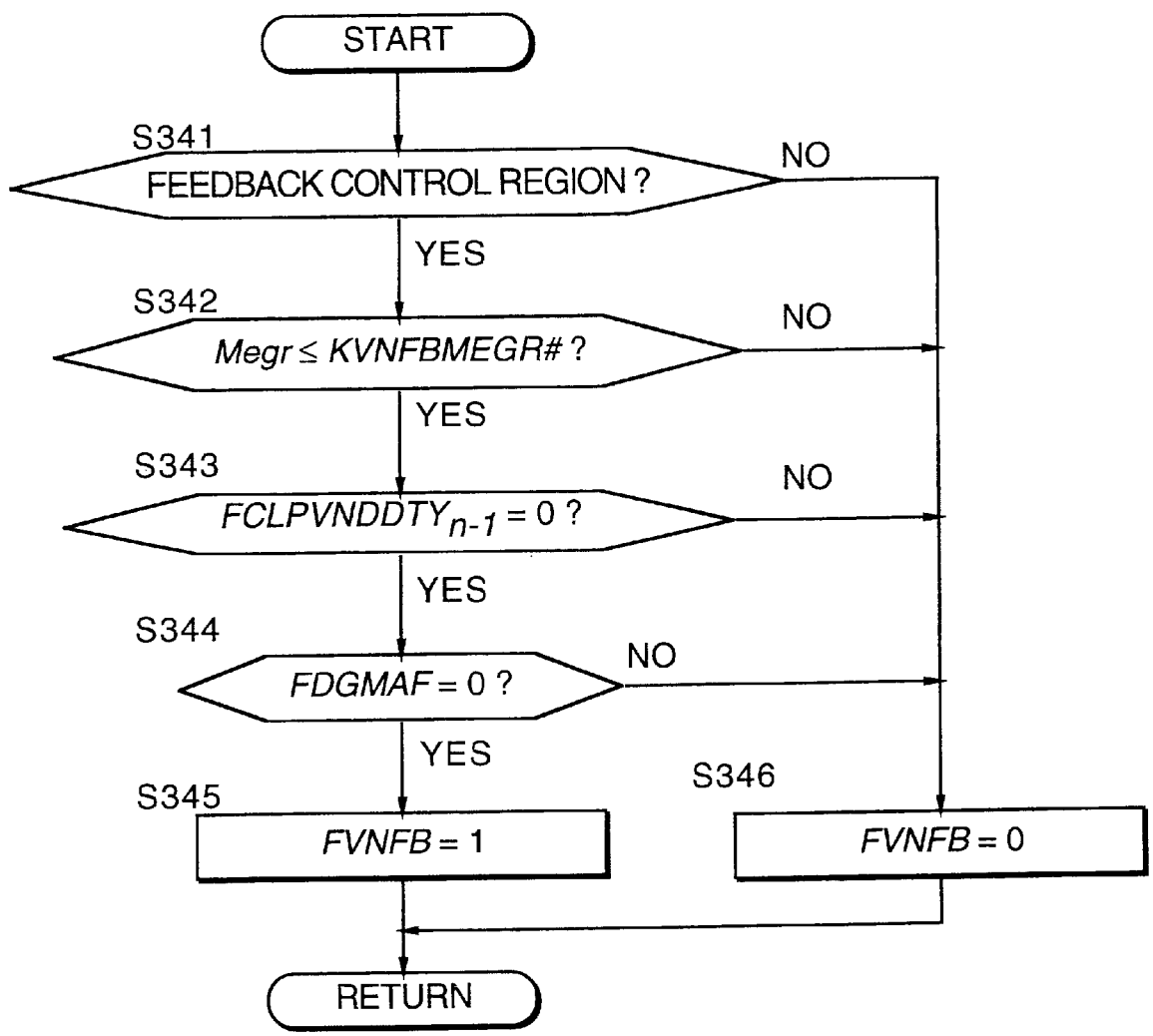
FIG. 67 is a flowchart describing a subroutine for setting a feedback control permission flag FVNFB of the opening rate of the variable nozzle performed by the controller.

Referring to FIG. 66, in a step S601, the controller 41 first sets a feedback control permission flag FVNFB of the opening rate of the variable nozzle 53 by a subroutine shown in FIG. 67.

Figure 68:
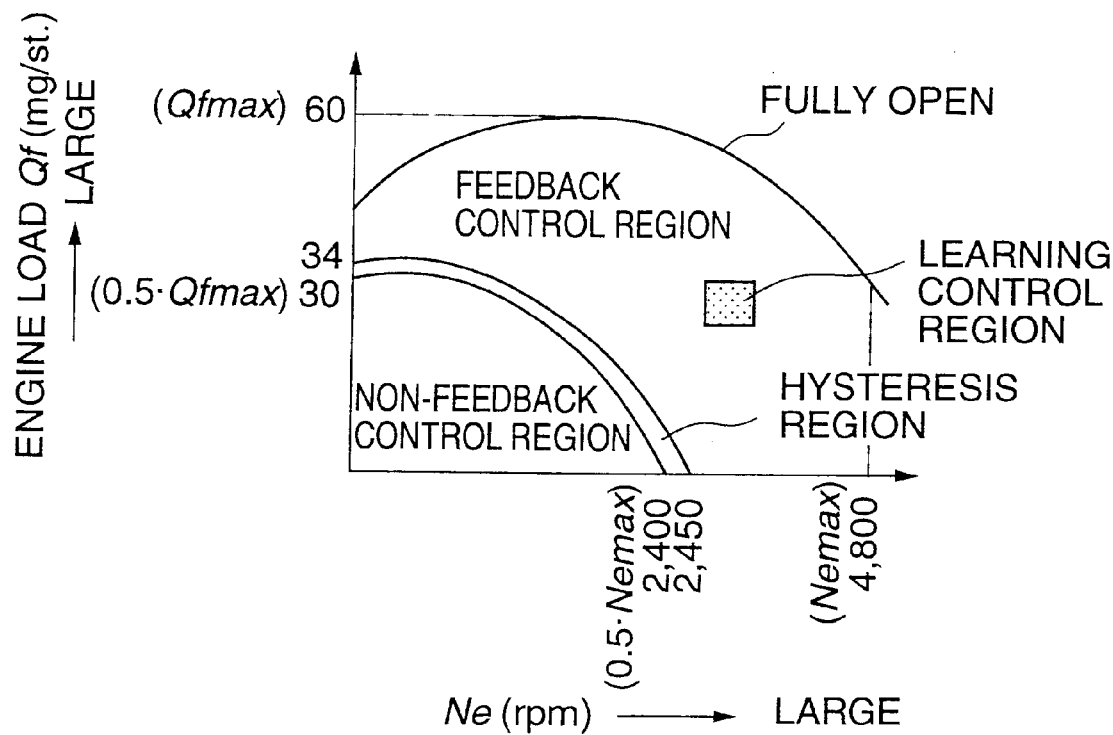
FIG. 68 is a diagram showing an operation region of the diesel engine where the controller feedback controls the opening rate of the variable nozzle.

Referring to FIG. 67, in a step S341, it is determined whether or not the running condition of the diesel engine 1 corresponds to a feedback control region of the opening rate of the variable nozzle 53 referring to a map prestored in the controller 41 whereof the contents are shown in FIG. 68.

In this map, the feedback control region is all running regions excluding low load and low rotation speed regions of the diesel engine 1. The non-feedback control region is defined by the engine load Qf and engine rotation speed Ne as shown in FIG. 68. Herein, the engine load Qf is represented by the fuel injection amount per piston stroke of a cylinder. The region defined by a curve which connects the point of 0.5·Nemax (e.g. 2,400 rpm) and the point of 0.5·Qfmax (e.g. 30 mg/st.) in the figure is regarded as the non-feedback control region. The reason why feedback control of the opening rate of the variable nozzle 53 is not performed under low load and at low rotation speed is because the intake fresh air amount hardly varies relative to variation of the opening rate of the variable nozzle 53 in this region, i.e., the sensitivity of the intake fresh air amount relative to variation of the opening rate is small. Therefore, in this region, not performing feedback control of the opening rate leads to stable control of the intake fresh air amount of the diesel engine 1 and the supercharging pressure of the turbocharger 50. A hysteresis region is provided as shown in the figure between the feedback control region and non-feedback control region. The hysteresis region is defined by a curve which connects for example the point of Ne=2,450 rpm and the point of Qf=34 mg/st.

In the step S341, when the running condition of the diesel engine 1 is in the feedback control region, the subroutine determines whether or not feedback control permission conditions are satisfied for the opening rate of the variable nozzle 53, from a step S342 to a step S344.

First, in the step S342 it is determined whether or not the target EGR rate Megr is less than a predetermined value KVNFBMEGR#.

In the step S343 it is determined whether or not an immediately preceding value $FCLPVNDTY_{n-1}$ of a command opening rate clamp flag FCLPVNDTY, described later, is zero showing a clamp state.

In the step S344, it is determined whether or not an air flow meter fault determining flag FDGMAF is zero, showing the normal state. The air flow meter determining flag FDGMAF is set to be one by a routine not described here when the air flow meter 39 does not operate correctly.

When the determination results of all of the steps S342–S244 are affirmative, the subroutine sets the feedback control permission flag FVNFB of the opening rate of the variable nozzle 53 to one in a step S345 and the subroutine is terminated. When the determination result of any of the steps S342–S344 is negative, the subroutine resets the feedback control permission flag FVNFB of the opening rate of the variable nozzle 53 to zero in a step S356, and the subroutine is terminated.

According to the step S342, in the EGR recirculation region, the feedback control permission flag FVNB is reset to zero, and opening rate feedback control of the variable nozzle 53 is not performed. This is due to the following reason. In the EGR recirculation region, the opening of the EGR valve 6 is feedback controlled. Therefore, feedback control of the opening rate of the variable nozzle 53 in this region causes interference between the two feedback controls, and the value of the opening rate tends to fluctuate.

According to the step S343, when the command opening rate is clamped, feedback control of the opening rate of the variable nozzle 53 is not performed. Clamping of the command opening rate is performed when the opening rate has converged, as described hereafter. In this case, there is no need to perform feedback control of the opening rate of the variable nozzle 53.

According to the step S344 feedback control of the opening rate of the variable nozzle 53 is not performed when the air flow meter 39 has a fault. This is in order to provide a fail-safe mechanism.

After setting the feedback control permission flag FVNFB, the controller 41 sets a feedback gain in the step S602 of FIG. 66. This processing is performed by a subroutine shown in FIG. 69.

First, in a step S351, the delay processing value tQacd of the target intake fresh air amount, cylinder intake fresh air amount Qac, real exhaust gas amount equivalent value Tqexhd and real opening rate Rvnte are read.

In a next step S352, it is determined whether or not the feedback control permission flag FVNFB is one.

When the feedback control permission flag FVNFB is not one i.e., when feedback control of the variable nozzle 53 is not performed, a control error Eqac is set to zero in a step S353. When the feedback control permission flag FVNFB is one, i.e., when feedback control of the variable nozzle 53 is performed, a value obtained by subtracting the delay processing value tQacd from the cylinder intake fresh air amount Qac is set to the control error Eqac in a step S354.

In normal feedback control, the target intake fresh air amount tQac is a target value set according to the running conditions, but in this invention, as a response time and a response time constant are the main objects of control, the target intake air amount delay processing value tQacd is taken as the target value of feedback control. The difference between the cylinder intake fresh air amount Qac and target value tQacd is considered as the control error Eqac.

Figure 70:
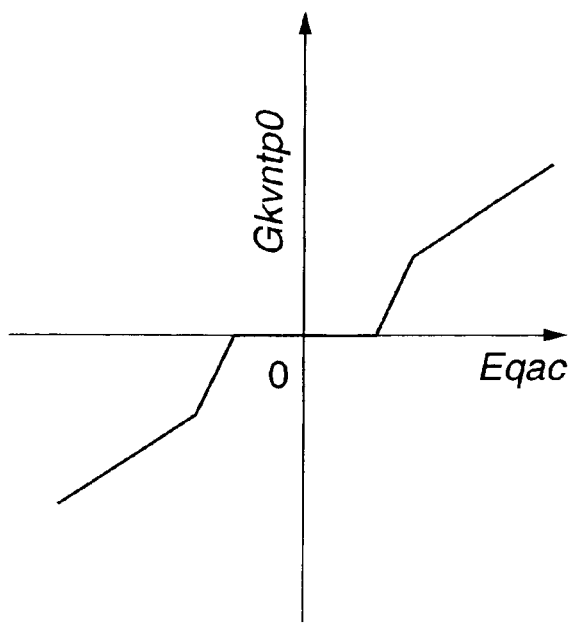
FIG. 70 is a diagram describing the contents of a map of a proportional gain basic value Gkvntp0 stored by the controller.
Figure 71:
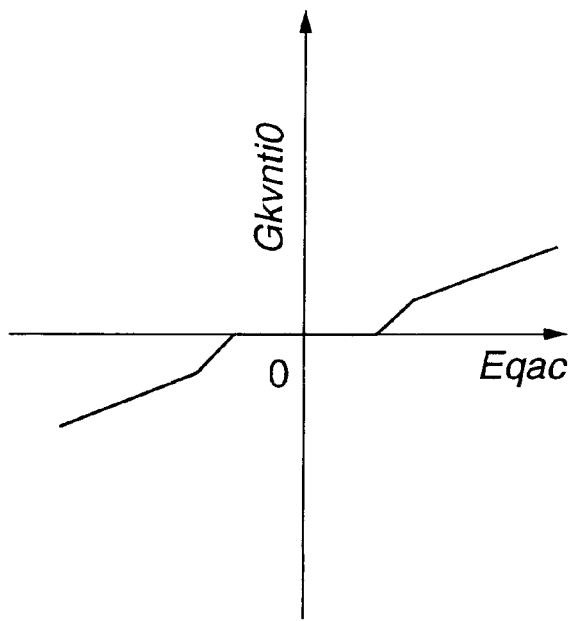
FIG. 71 is a diagram describing the contents of a map of an integral gain basic value Gkvnti0 stored by the controller.

After the step S353 or the step S354, the subroutine calculates a proportional gain basic value Gkvntp0 and integral gain basic value Gkvnti0 by looking up maps whereof the contents are shown in FIG. 70 and FIG. 71 which are prestored in the controller 41, from the control error Eqac. In these maps, an insensitive region is provided around the value zero of Eqac so that the feedback control does not fluctuate in the vicinity of the target value.

Figure 72:
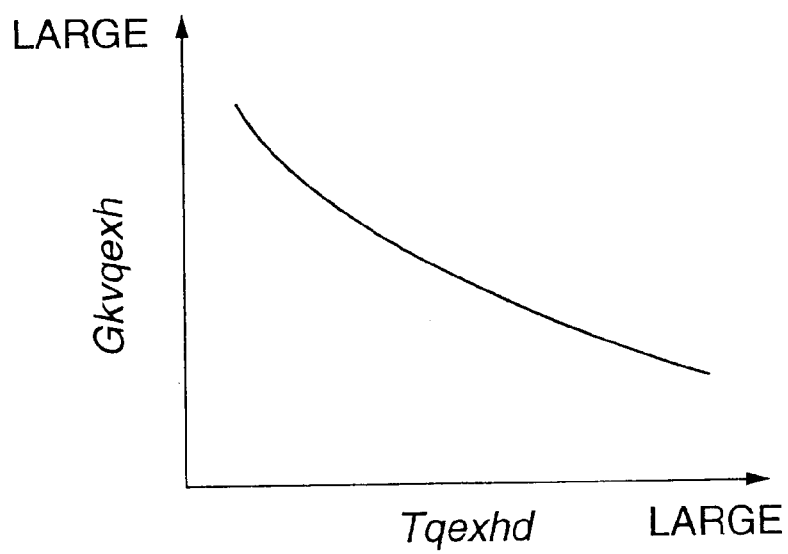
FIG. 72 is a diagram describing the contents of a map of an exhaust gas amount correction coefficient Gkvqexh stored by the controller.

In a following step S356, an exhaust gas amount correction coefficient Gkvqexh of the proportional gain and integral gain is calculated by looking up a map whereof the contents are shown in FIG. 72 which is prestored in the controller 41 from the real exhaust gas amount equivalent value Tqexhd.

Figure 73:
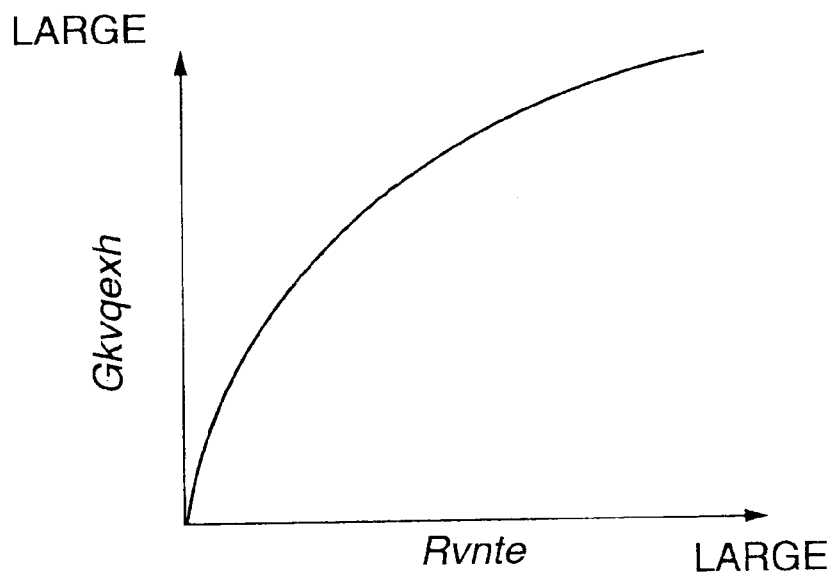
FIG. 73 is a diagram describing the contents of a map of an opening rate correction coefficient Gkvavnt stored by the controller.

In a next step S357, an opening rate correction coefficient Gkvavnt is calculated referring to a map whereof the contents are shown in FIG. 73 which is prestored in the controller 41 from the real opening rate Rvnte.

In a next step S358, the proportional gain Gkvntp and integral gain Gkvnti are calculated by the following equations from these basic values and correction coefficients.

$$Gkvntp=Gkvntp0 \cdot Gkvqexh \cdot Gkvavnt \tag{29}$$

$$Gkvnti=Gkvnti0 \cdot Gkvqexh \cdot Gkvavnt$$

Figure 100:
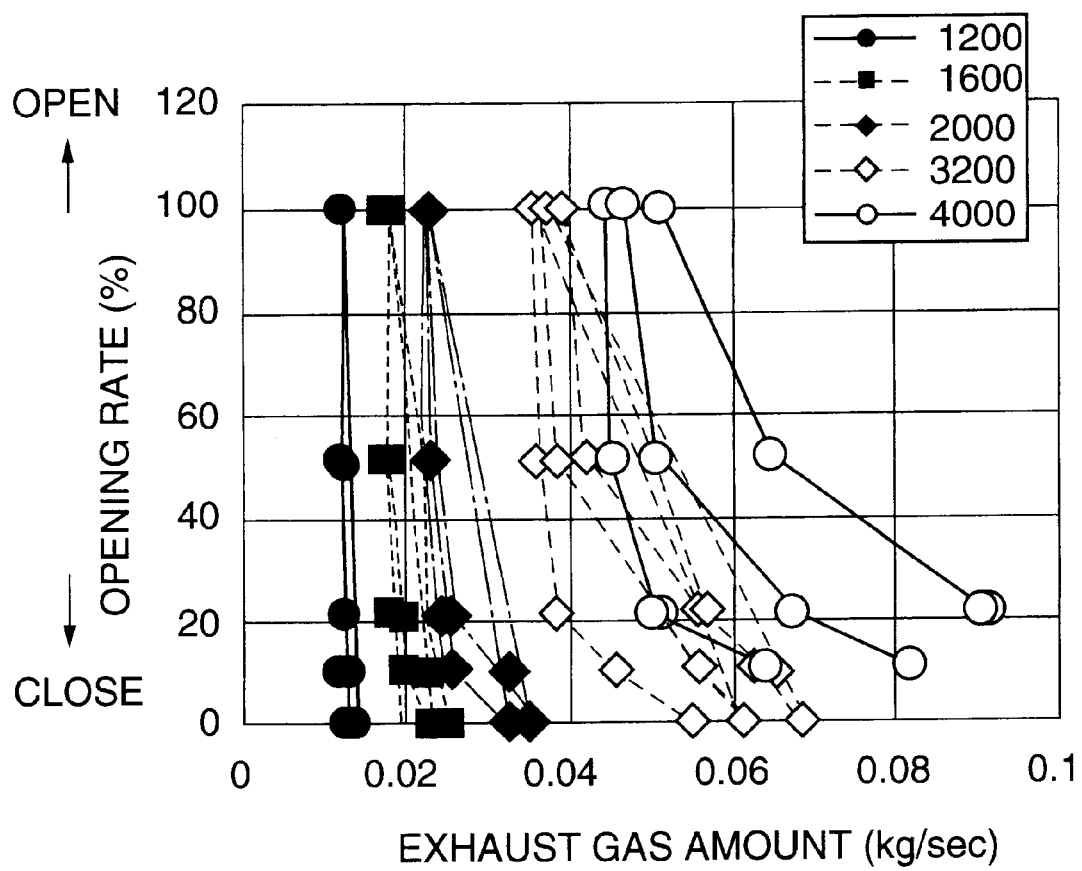
FIG. 100 is a diagram describing the relation between an exhaust gas amount of a diesel engine, and an opening rate of a variable nozzle.

The exhaust gas amount correction coefficient Gkvqexh shown in the map of FIG. 72 takes a smaller value the larger the real exhaust gas amount equivalent value Tqexhd. For an identical opening rate of the variable nozzle 53, the variation of supercharging pressure increases the larger the exhaust gas amount, therefore it is easier to make the supercharging pressure approach the target value. As shown in FIG. 100, at a low exhaust gas amount, the variation of supercharging pressure relative to the variation of opening rate is sluggish. Hence, to make the supercharging pressure at a low exhaust gas amount converge to the target value earlier, the exhaust gas amount correction coefficient Gkvqexh is set to be larger as the real exhaust gas amount equivalent value Tqexhd decreases. The map of FIG. 72 is obtained from the experimental results performed by the inventors which is shown in FIG. 100.

Figure 101:
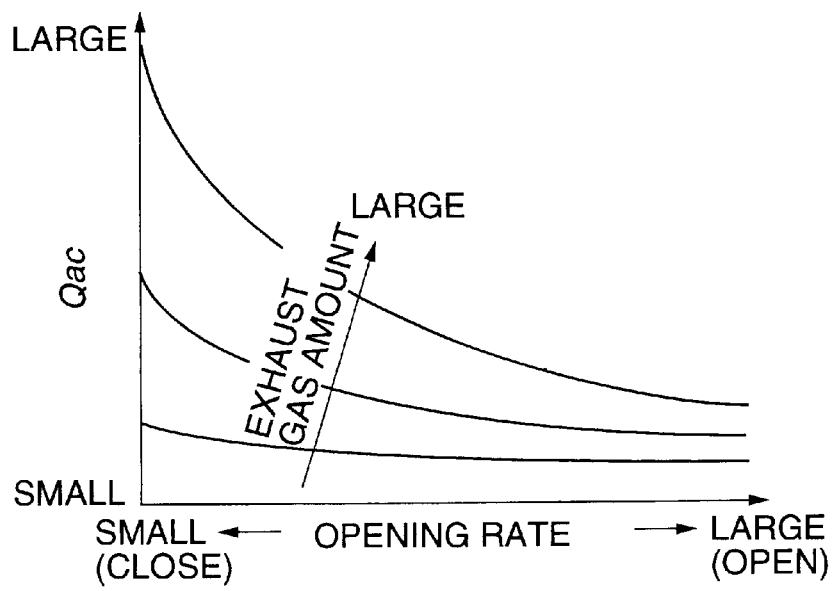
FIG. 101 is a diagram describing the relation between the opening rate of the variable nozzle, a cylinder intake fresh air amount Qac and the exhaust gas amount of the diesel engine.
Figure 102:
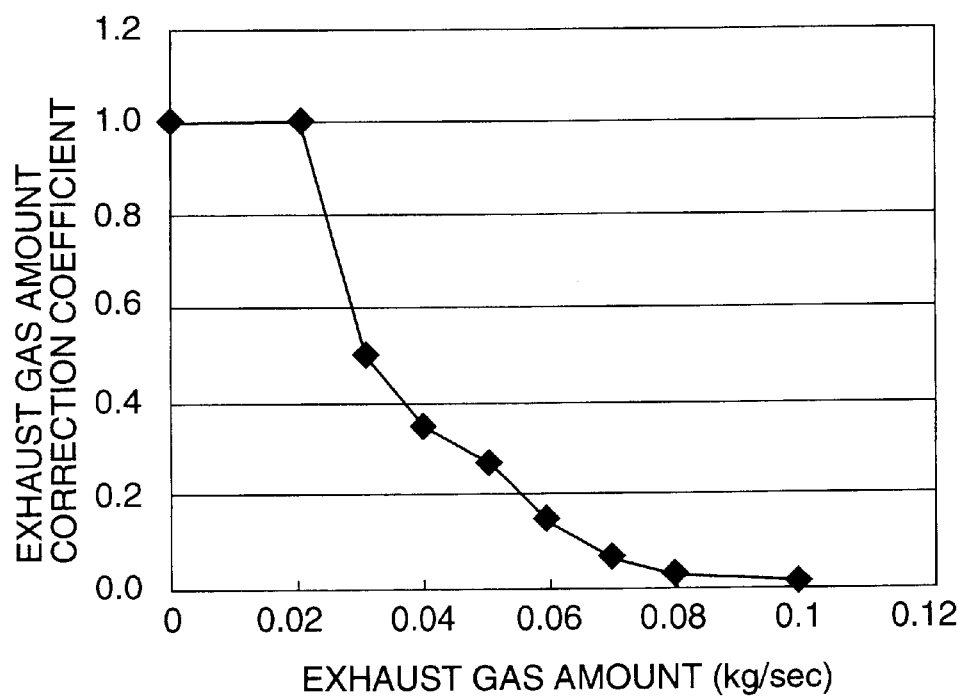
FIG. 102 is a diagram showing the relation of the exhaust gas amount of the diesel engine and an exhaust gas amount correction coefficient according to experiments by the inventors.
Figure 103:
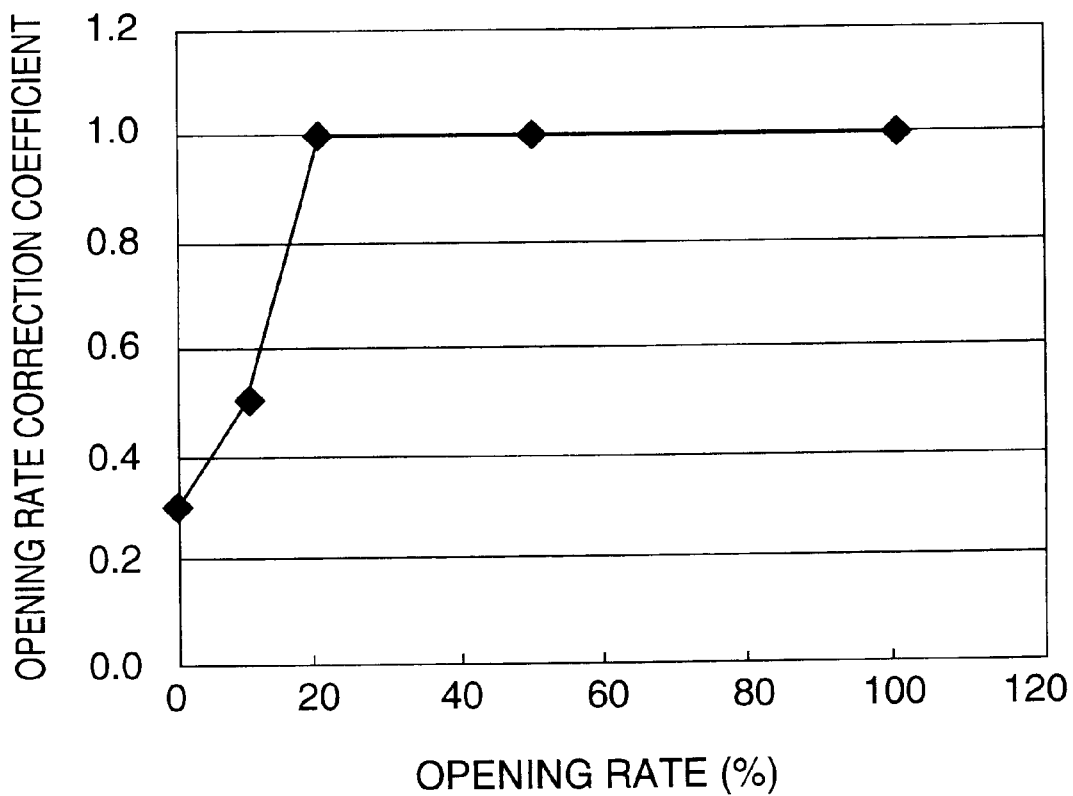
FIG. 103 is a diagram showing the relation of the variable nozzle opening rate and opening rate correction coefficient according to experiments by the inventors.

The opening rate correction coefficient Gkvavnt shown in the map of FIG. 73 takes a smaller value the smaller the real opening rate Rvnte. When the opening of the variable nozzle 53 is small, the cylinder intake fresh air amount Qac reacts more sensitively to a variation in the opening rate than when the opening is large. To average out the response, the opening rate correction coefficient Gkvavnt is set to take a smaller value the smaller the real opening rate Rvnte. The map of FIG. 73 is obtained from the experimental results performed by the inventors which is shown in FIG. 101.

Figure 69:
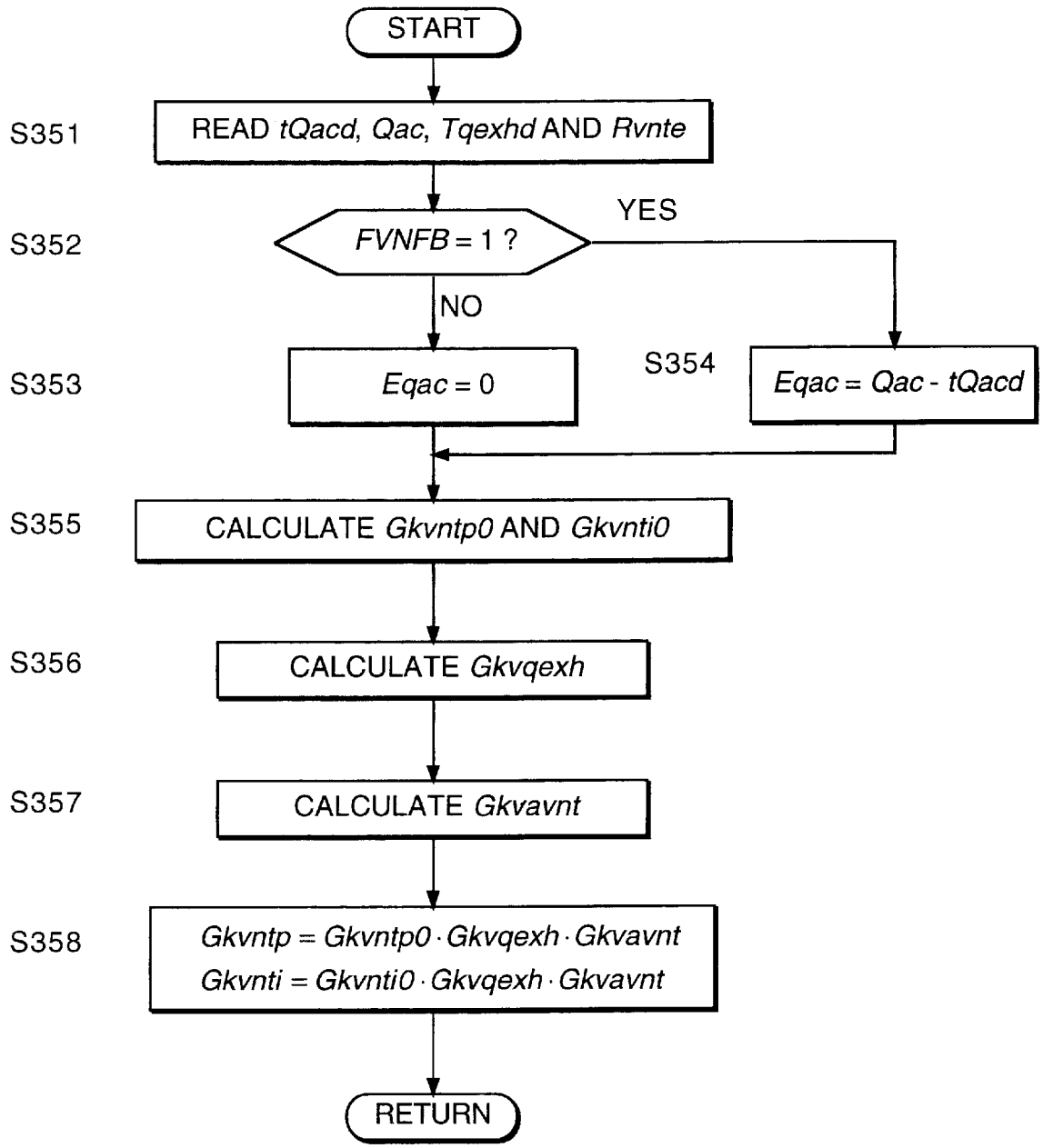
FIG. 69 is a flowchart describing a subroutine for setting feedback gains of the opening rate of the variable nozzle.
Figure 74:
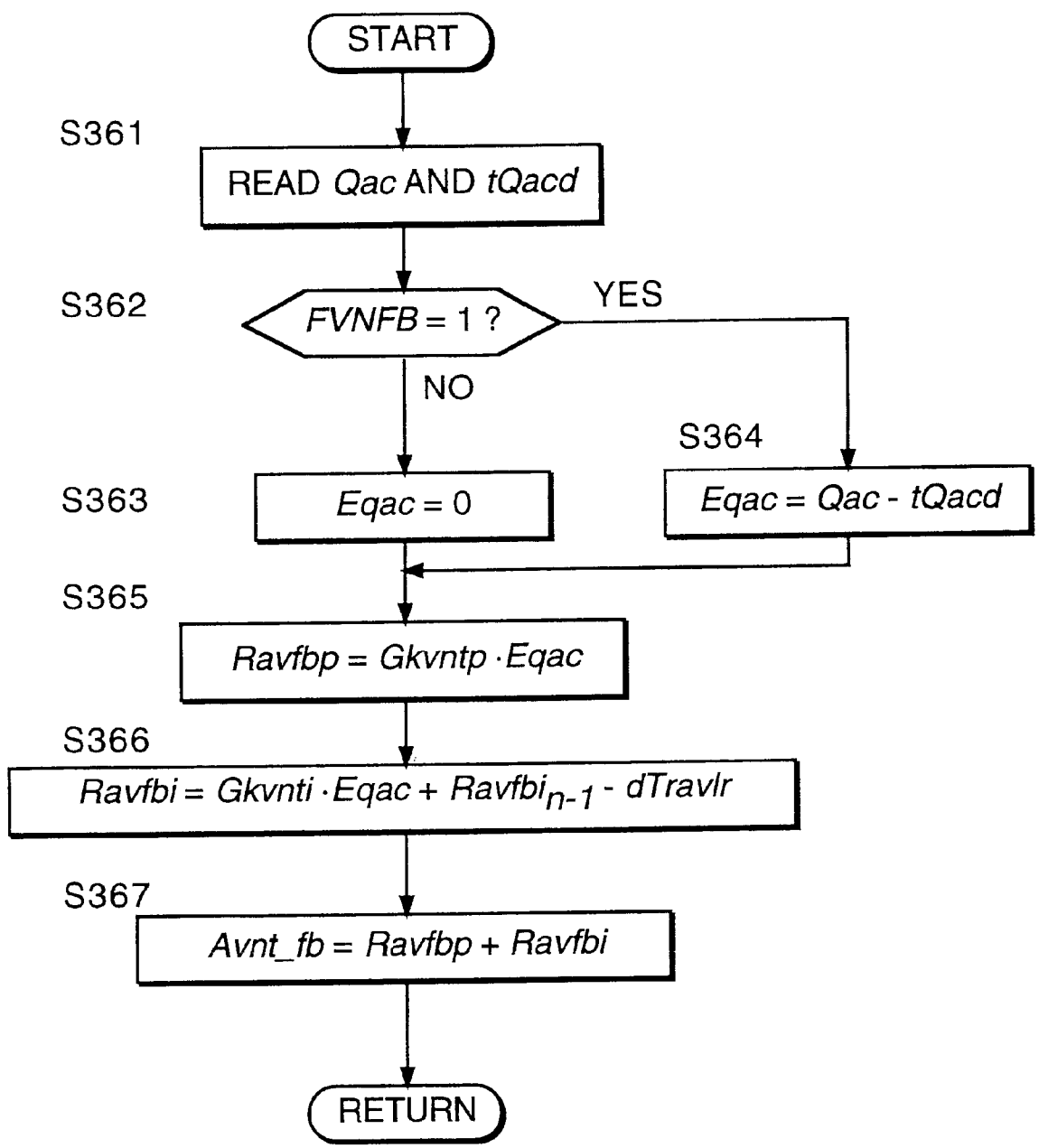
FIG. 74 is a flowchart describing a subroutine for calculating the feedback correction amount Avnt_fb of the opening rate of the variable nozzle performed by the controller.

In this way, after the feedback correction coefficients are set by the subroutine of FIG. 69, the controller 41 calculates the feedback correction amount Avnt_fb using a subroutine shown in FIG. 74 in a step S603 of FIG. 66.

Referring to FIG. 74, the controller 41 first reads the intake fresh air amount Qac and delay processing value tQacd of the target intake fresh air amount in a step S361.

In a step S362, it is determined whether or not a feedback control permission flag FVNFB is one.

When the feedback control permission flag FVNFB is not one, i.e., when feedback control of the variable nozzle 53 is not performed, the control error Eqac is set to zero in a step S363. When the feedback control permission flag FVNFB is one, i.e. when feedback control of the variable nozzle 53 is performed, a value obtained by subtracting the delay processing value tQacd from the cylinder intake fresh air amount Qac is set to the control error Eqac in a step S354. The processing of the steps S362 to S364 is identical to the processing of the steps S352 to S354 of FIG. 69.

In a step S365, a proportional correction value Ravfbp is calculated from the following equation (30).

$$Ravfbp=Gkvntp \cdot Eqac \tag{30}$$

Figure 77:
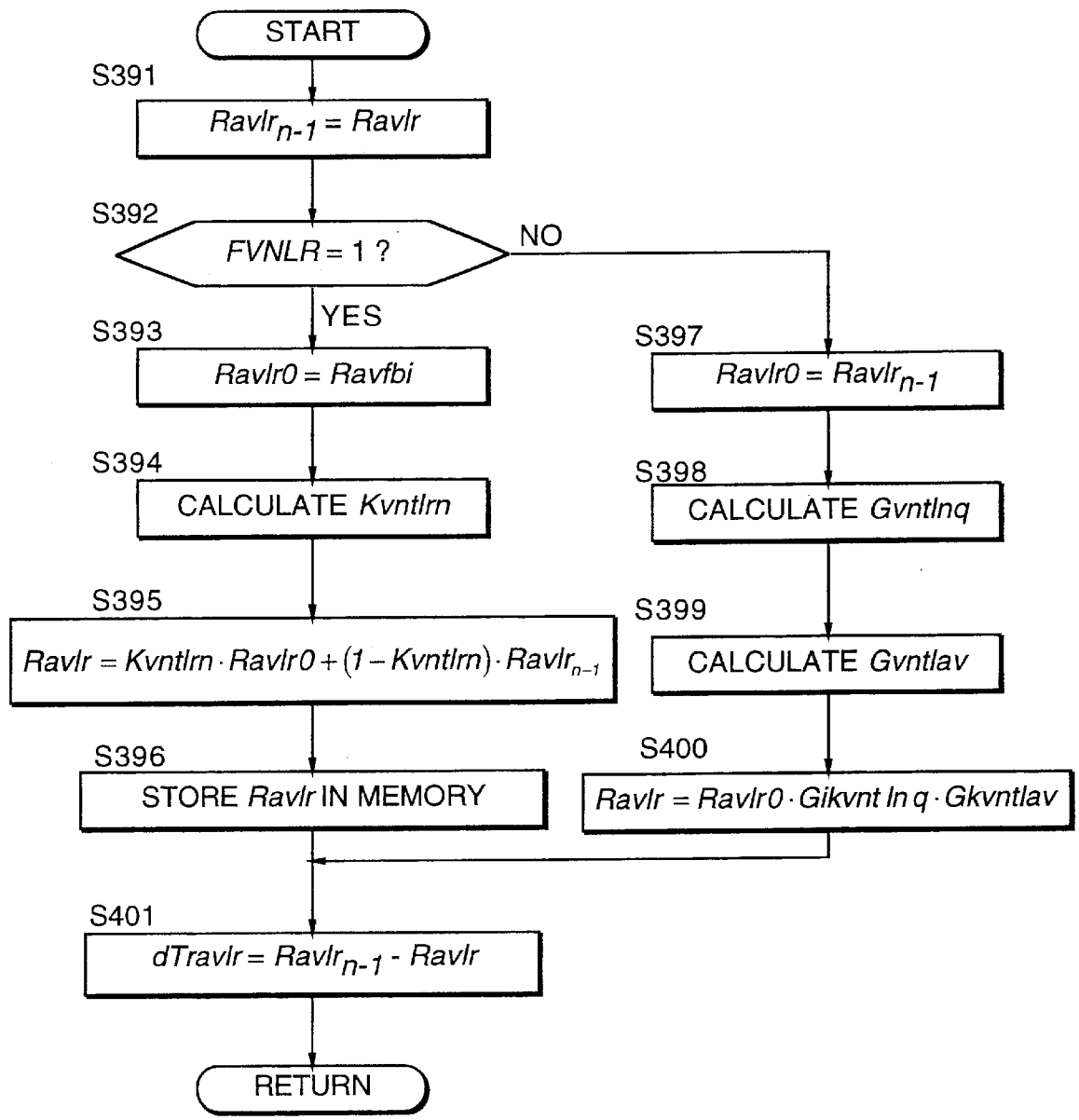
FIG. 77 is a flowchart describing a subroutine for calculating the opening rate learning value Ravlr performed by the controller.

In a next step S366 an integral correction value Ravfbi is calculated by the following equation (31).

$$Ravfbi=Gkvnti \cdot Eqac+Ravfbi_{n-1}-dtravlr \tag{31}$$

where, $Ravfbi_{n-1}$=Ravfbi calculated on immediately preceding occasion the subroutine was executed, and dtravlr=variation amount of the learning value Ravlr calculated by a subroutine of FIG. 77 described hereafter.

In a next step S367, the feedback amount Avnt_fb of the opening rate of the variable nozzle 53 is calculated by summing the proportional correction amount Ravfbp and integral correction amount Ravfbi.

Apart from the third term on the right-hand side of equation (31) used in the step S366, this equation corresponds to the calculation equation in ordinary learning control. According to this invention, the variation amount dTravlr of the learning value Ravlr is subtracted from the integral correction value Ravfbi obtained in the calculation equation of the prior art learning control. The calculation of the learning value Ravlr and its variation amount dTravlr will be described later, but the interval of the calculation of both the integral correction amount Ravfbi and learning value Ravlr is ten milliseconds.

After the controller 41 calculates the feedback correction amount Avnt_fb by the subroutine of FIG. 74 in this way, a learning permission flag FVLNR is calculated in a step S604 of FIG. 66. The learning permission flag FVLNR is a flag which determines whether or not learning of the integral correction amount Ravfbi is permitted. This calculation is performed by a subroutine shown in FIG. 75.

Figure 75:
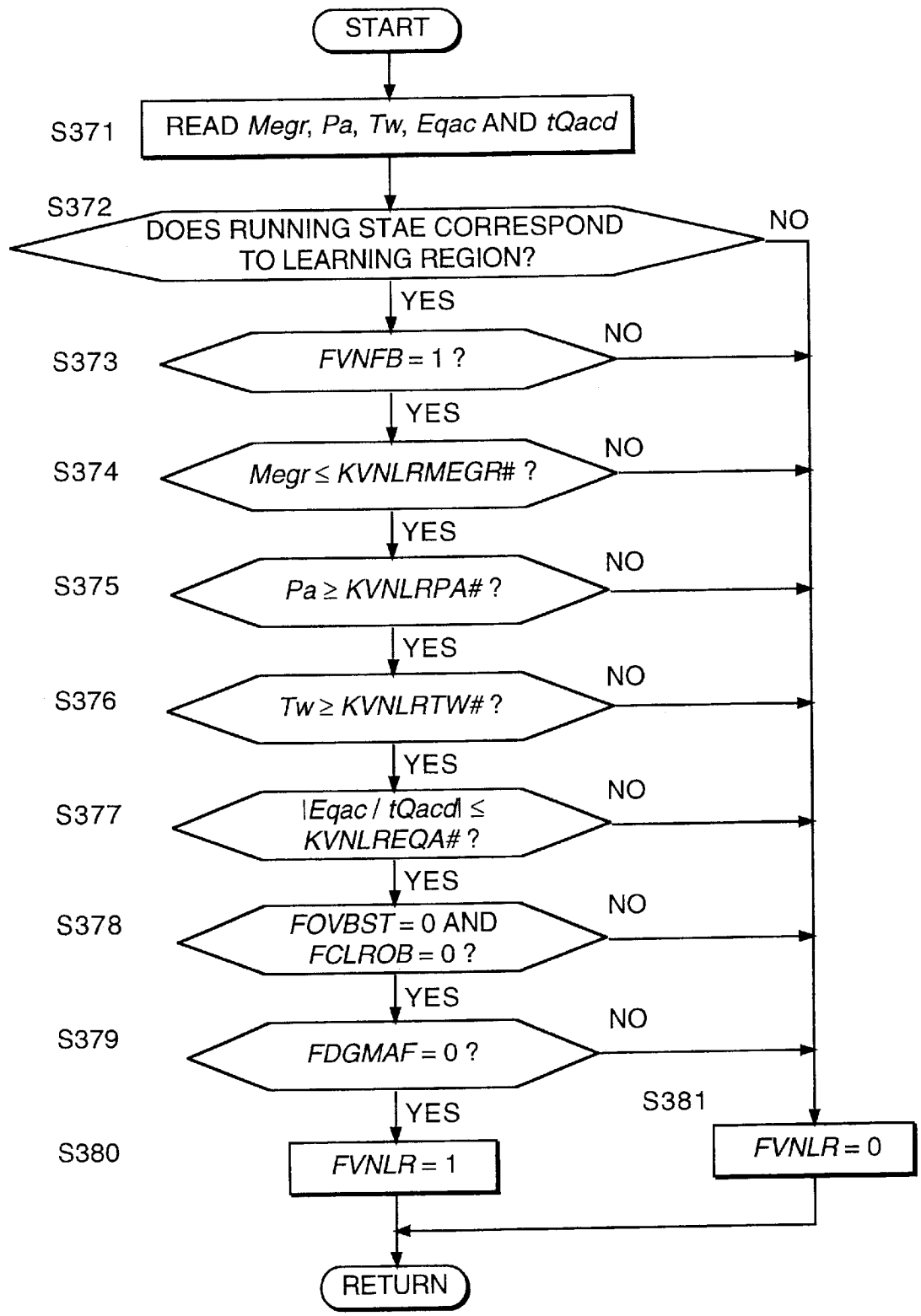
FIG. 75 is a flowchart describing a subroutine for setting a learning permission flag FVNLR of the opening rate of the variable nozzle performed by the controller.

Referring to FIG. 75, the controller 41 first reads the target EGR rate Megr, atmospheric pressure Pa, cooling water temperature Tw, control error Eqac and delay processing value tQacd of the target intake fresh air amount in a step S371.

In following steps S372–S379, it is determined whether or not the engine running conditions are suitable for learning of the integral correction amount Ravfbi from the parameters which were read.

Figure 76:
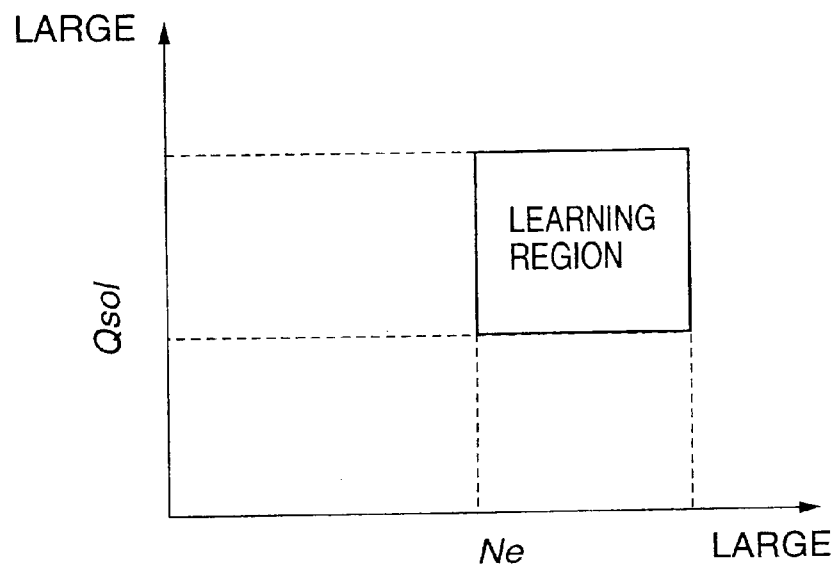
FIG. 76 is a diagram showing an operation region of the diesel engine where the controller perform learning control of the opening rate of the variable nozzle.

In the step S372, it is determined whether or not the running condition of the diesel engine 1 corresponds to a learning region specified in a map whereof the contents are shown in FIG. 76 which is prestored in the controller 41, from the rotation speed Ne of the diesel engine 1 and the target fuel injection amount Qsol which represents the load of the diesel engine 1. The map of FIG. 76 is simplified, but in practice, the region which is the supercharging pressure feedback control region and where the learning sensitivity is good, i.e., the region where the variation of the intake fresh air amount is large relative to the variation of opening rate of the variable nozzle 53 is set as the learning region.

In a step S373, it is determined whether or not the current value of the learning permission flag FVLNR is one.

In a step, it is determined whether or not the target EGR rate Megr is less than a predetermined rate KVNLRMEGR#. The predetermined rate KVNLRMEGR# is a value for determining whether or not exhaust gas recirculation is to be performed, and when the target EGR rate Megr is less than the predetermined value KVNLRMEGR#, exhaust gas recirculation is effectively not performed.

In a step S375, it is determined whether or not the atmospheric pressure Pa is higher than a predetermined pressure KVNLRPA#. The predetermined pressure KVNLRPA# is a pressure corresponding to running on high ground, and when the condition of the step S375 is satisfied, it shows that the vehicle is not running on high ground.

In a step S376, it is determined whether or not the cooling water temperature Tw is higher than a predetermined temperature KVNLRTW#. The predetermined temperature KVNLRTW# is a value which determines whether or not warm-up of the diesel engine 1 is complete, and when the cooling water temperature Tw is higher than the predetermined temperature KVNLRTW#, it is considered that warm-up is complete.

In a step S377, it is determined whether or not the absolute value of the ratio of the control error Eqac and the delay processing value tQacd of the target fresh air amount is less than a predetermined value KVNLREQA#. When the absolute value of this ratio is large, it signifies that the control of supercharging pressure is subject to the effect of external disturbance. The predetermined value KVNLREQA# is a reference value for performing this determination, and when the absolute value of this ratio is less than the predetermined value KVNLREQA#, it is considered that there is no effect due to external disturbance. The reason why the ratio of the delay processing value tQacd of the target intake fresh air amount and the control error Eqac is taken as the determining parameter, is in order to maintain the ratio of the control error relative to the target value constant even if the target value varies. However, to simplify the calculation, it is also possible to determine the presence or absence of external disturbance by comparing the absolute value of the control error Eqac with a predetermined value.

In a step S378, it is determined whether or not the overboost determining flag FOVBST and suppression release flag FCLROB are both zero. If these flags are zero, it signifies that the overboost suppression control is not performed.

In a step S379, it is determined whether or not an air flow meter fault determining flag FDGMAF is zero, showing the normal state.

When all the conditions of the steps S372–S379 are satisfied, the learning permission flag FVLNR is set to one in a step S380 so as to permit learning of the integral correction amount Ravfbi. When any of the conditions of the steps S372–S379 is not satisfied, the learning permission flag FVLNR is reset to zero in a step S381 so as to prohibit learning of the integral correction amount Ravfbi.

In this way, after setting the learning permission flag FVLNR, the controller 41 calculates the learning value Ravlr in a step S605 of FIG. 66. This calculation is performed by the subroutine of FIG. 77.

Referring to FIG. 77, first in a step S391, the controller 41 sets the immediately preceding value $Ravlr_{n-1}$ equal to the learning value Ravlr stored in a non-volatile memory in the controller 41.

In a next step S392, it is determined whether or not the learning permission flag FVLNR is one. When the learning permission flag FVLNR is one, learning of the integral correction amount Ravfbi is performed in steps S393–S396. On the other hand, when the learning permission flag FVLNR is not one, a processing outside the learning region is performed in steps S397–S400.

Here, learning means that the integral correction amount Ravfbi is learned, the learning value Ravlr for opening rate control is calculated based on a learning initial value Ravlr0 and immediately preceding value $Ravlr_{n-1}$ of the learning value Ravlr, and the immediately preceding value $Ravlr_{n-1}$ stored in the non-volatile memory is newly updated to the calculated value.

Processing outside the learning region means that the learning value Ravlr for opening rate control is calculated by multiplying the immediately preceding value $Ravlr_{n-1}$ by a predetermined coefficient. In this case, the value stored in the non-volatile memory is not updated.

The specific details of learning will now be described referring to the steps S393–S396.

In the step S393, the learning initial value Ravlr0 is set to equal to the integral correction amount Ravfbi of the opening rate of the variable nozzle 53.

Figure 78:
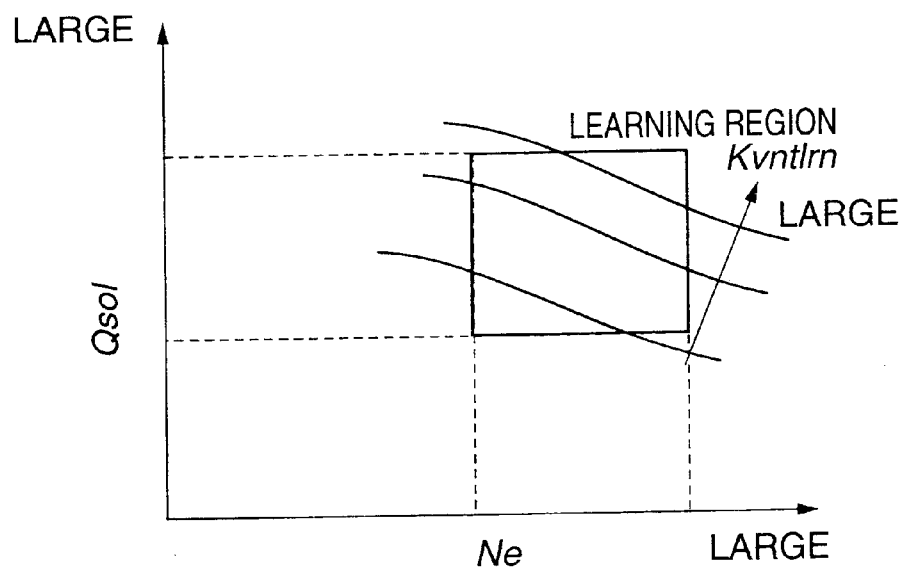
FIG. 78 is a diagram describing the contents of a map of a learning speed Kvntlrn stored by the controller.

In the next step S394, a learning rate Kvntlrn is calculated by looking up a map whereof the contents are shown in FIG. 78 which is prestored in the controller 41, based on the engine rotation speed Ne and the target fuel injection amount Qsol which represents the engine load. In this map, the learning rate Kvntlrn is increased, the larger the engine rotation speed Ne and the target fuel injection amount Qsol. However, when it increases, the variation of the intake fresh air amount relative to variation of opening rate of the variable nozzle 53 becomes more sensitive. Specifically, when the engine rotation speed Ne and target fuel injection amount Qsol are large, convergence to the target value of the supercharging pressure or intake fresh air amount is advanced by increasing the learning proportion of the feedback correction amount. For this purpose, the learning rate Kvntlrn is set large, the larger the engine rotation speed Ne and target fuel injection amount Qsol. However, the maximum value of the learning rate Kvntlrn is one.

In the next step S395, the learning initial value Ravlr0 and immediately preceding value $Ravlr_{n-1}$ of the learning value Ravlr are weighted by the following equation (32) to calculate the learning value Ravlr.

$$Ravlr = Kvntlrn \cdot Ravlr0 + (1 - Kvntlrn) \cdot Ravlr_{n-1} \quad (32)$$

According to equation (32), when the learning rate Kvntlrn is the maximum value of one, on the next occasion the control of the opening rate is performed, the total amount of the integral correction amount Ravfbi is used as the learning value Ravlr. When the learning rate Kvntlrn is less than 1, part of the integral correction amount Ravfbi is used as the learning value Ravlr on the next occasion control of the opening rate is performed.

In the next step S396, the calculated learning value Ravlr is stored in the non-volatile memory. This value is used as the immediately preceding value $Ravlr_{n-1}$ on the next occasion when the routine is performed.

Next, specific details of processing outside the learning region will be described referring to the steps S397 to S400.

In the step S397, the initial learning value Ravlr0 is set equal to the immediately preceding value $Ravlr_{n-1}$.

Figure 79:
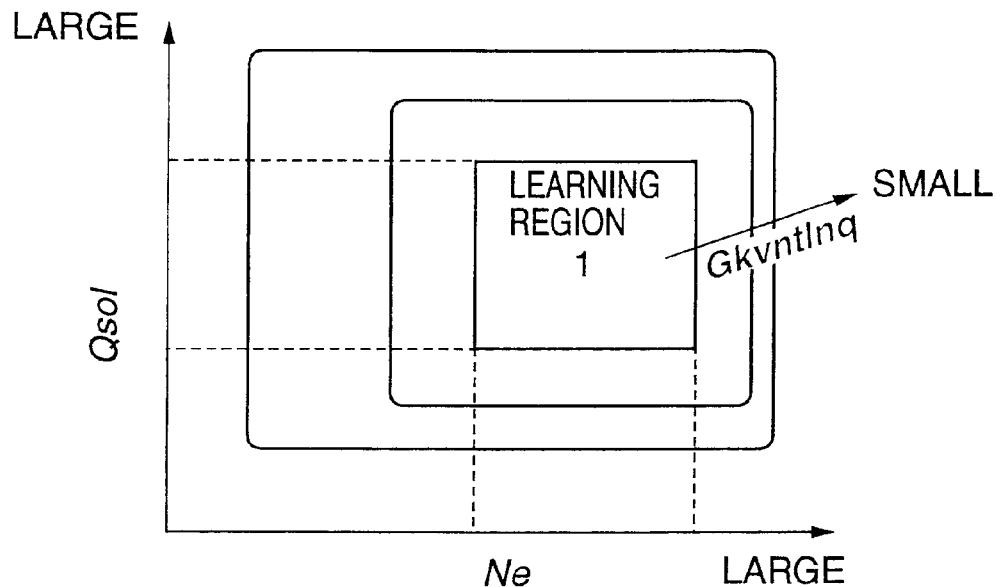
FIG. 79 is a diagram describing the contents of a map of an operation region reflection coefficient Gkvntlnq stored by the controller.

In the next step S398, the running region reflection coefficient Gkvntlnq of the learning value is calculated, referring to a map whereof the contents are shown in FIG. 79 which is prestored in the controller 41, based on the engine rotation speed Ne and target fuel injection amount Qsol.

Figure 80:
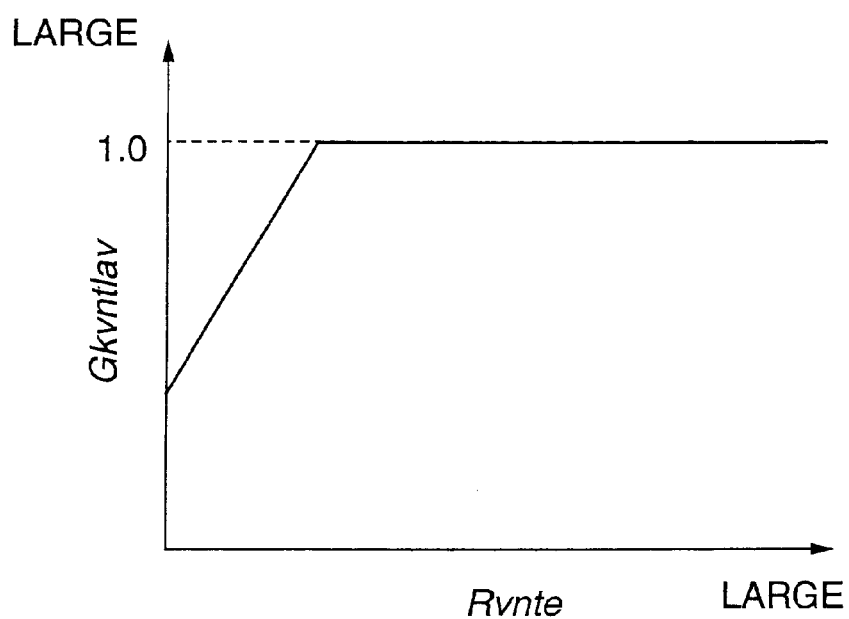
FIG. 80 is a diagram describing the contents of a map of an opening rate reflection coefficient Gkvntlav stored by the controller.

In the next step S399, the opening rate reflection coefficient Gkvntlav is calculated, referring to a map whereof the contents are shown in FIG. 80 which is prestored in the controller 41, based on the real opening rate Rvnte.

In the next step S400, the learning value Ravlr for the opening rate control is calculated by the following equation (33).

$$Ravlr = Ravlr0 \cdot Gikvntlnq \cdot Gkvntlav \quad (33)$$

The equation (33) is applied to have the learning value reflected in supercharging pressure control outside the learning region. The learning value Ravlr obtained is applied to learning control of the opening rate described hereafter, but the value stored in the non-volatile memory is not updated.

Referring to the map of FIG. 79, the running region reflection coefficient Gkvntlnq is one when the engine rotation speed Ne and target fuel injection amount Qsol are in the learning region, and become smaller, the further away from the learning region. In a region which is largely removed from the running region where the learning value Ravlr is learned, if opening rate control is performed applying the same learning value Ravlr as in the learning region, the error becomes too large, and the possibility of causing overboost increases. To prevent this overboost, the map characteristics are set so that the running region reflection coefficient Gkvntlnq become smaller the further away from the learning region.

In the map of FIG. 80, an opening rate reflection coefficient Gkvntlav is set to be small in a region where the real opening rate Rvnte is small. The variation of intake fresh air amount relative to the variation of opening rate, is larger the smaller the opening rate. As a result, in a region where the opening rate is small, when the learning value is largely reflected in supercharging pressure control, there is a high possibility of causing overboost. To prevent this overboost, in the region where the opening rate is small, the map characteristics are set so that the opening rate reflection coefficient Gkvntlav becomes smaller in the region where the opening rate is small.

After performing the processing of the steps S392–S396 or the steps S397 to S400 in this way, the controller 41 calculates the difference between the learning value Ravlr and immediately preceding value $Ravlr_{n-1}$ stored in the non-volatile memory in a step S401, as the variation amount dTravlr of the learning value. This variation amount dTravlr is a value used in the calculation of the step S365 of FIG. 74 described earlier. As can be seen from FIG. 66, the subroutine of FIG. 74 is performed before the subroutine of FIG. 77 which calculates the variation amount dTravlr. Therefore, the variation amount dTravlr calculated in the subroutine of FIG. 77 is used on the next occasion when the subroutine of FIG. 74 is performed.

When the subroutine of FIG. 77 terminates, the subroutine of FIG. 66 also terminates.

Here, referring again to the main routine of FIG. 38, after calculating the feedback correction amount Avnt_fband the variation amount dTravlr of the learning value by the subroutine of FIG. 66 in the step S245, the controller 41 calculates a final command opening rate Trvnt sand a command opening rate linearization processing value Ratdty in a following step S246. This calculation is performed by subroutines of FIG. 81 and FIG. 82

Figure 81:
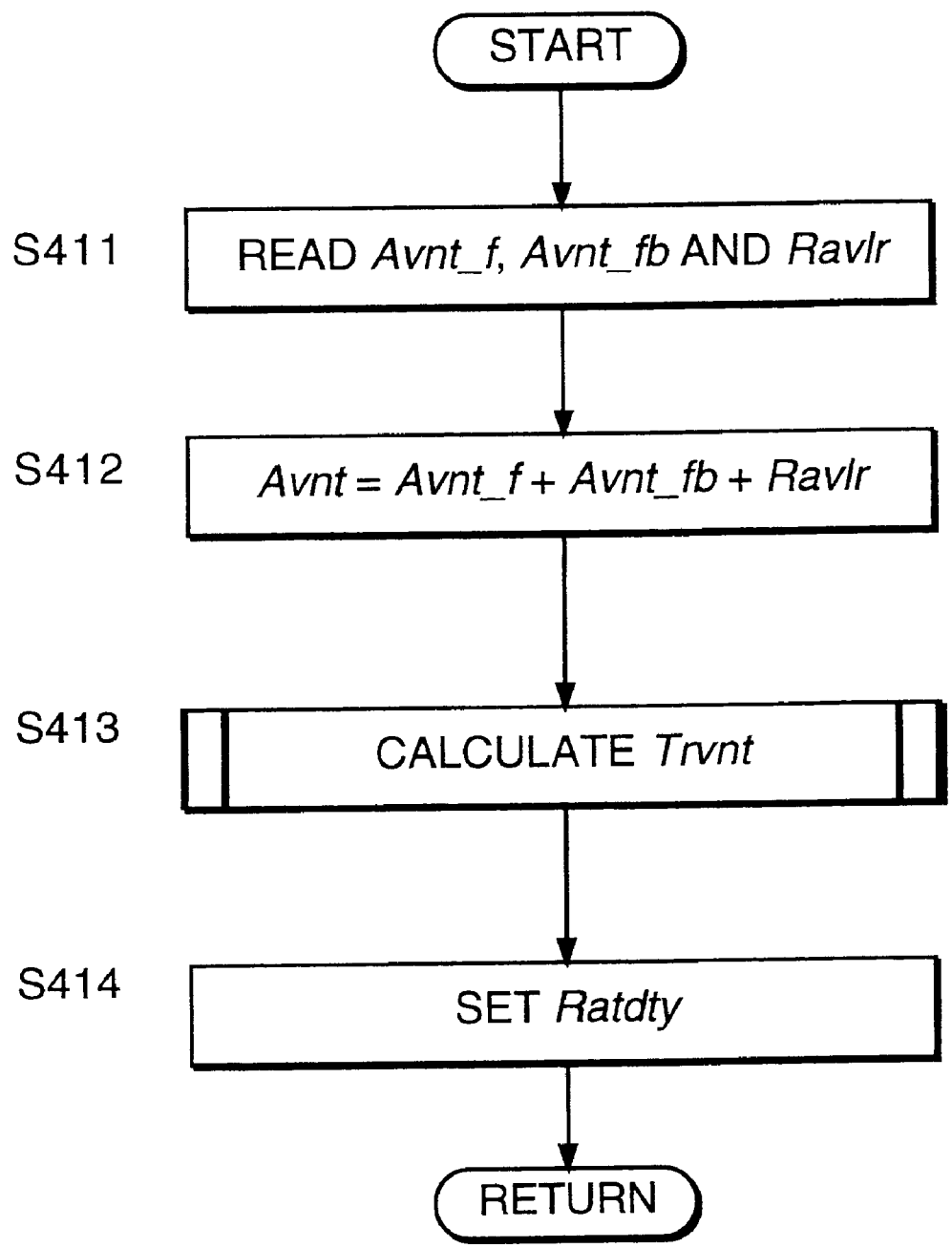
FIG. 81 is a flowchart describing a subroutine for calculating a command opening rate linearization processing value Ratdty performed by the controller.

Referring to FIG. 81, firstly in a step S411, the controller 41 reads the open loop control amount Avnt_f of the command opening rate, the feedback correction amount Avnt_fb of the command opening rate and the learning value Ravlr.

In a next step S412, the command opening rate Avnt is calculated by summing these values.

Figure 82:
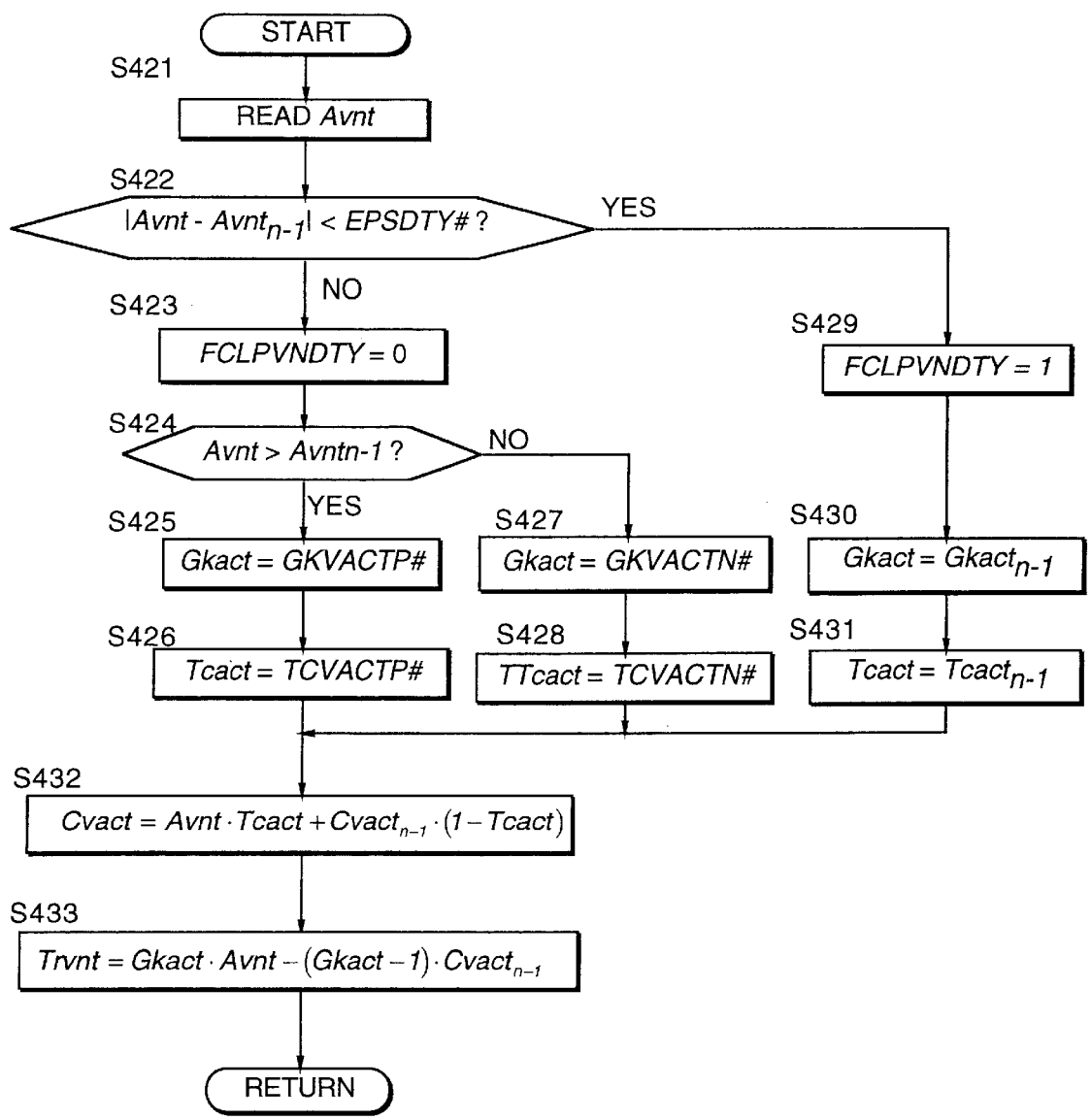
FIG. 82 is a flowchart describing a subroutine for calculating a final command opening rate Trvnt performed by the controller.

In a next step S413, to compensate the response delay of the pressure actuator 54, advance processing is performed on the command opening rate Avnt using a subroutine of FIG. 82. The pressure actuator 54 comprises the diaphragm actuator 59 which is operated by the supply pressure of the pressure control valve 56, so some time is required from when a duty signal is input to the pressure control valve 56 to when the diaphragm actuator 59 actually operates corresponding to the duty signal. The processing of the step S413 is processing to compensate this response delay. If the variable nozzle 53 is operated by a step motor instead of the pressure actuator 54, this step is unnecessary.

Referring to FIG. 82, the controller 41 first reads the command opening rate Avnt in a step S421.

In a next step S422, it is determined whether or not the absolute value of the difference between the immediately preceding value $Avnt_{n-1}$ of the command opening rate read on the immediately preceding occasion the subroutine was executed and the command opening rate Avnt read on the present occasion, is smaller than a predetermined value EPSDTY#.

When the determination result of the step S422 is negative, it shows that the command opening rate Avnt is varying. In this case, after resetting a clamp flag FCLPVNDTY of the command opening rate to zero in a step S423, the routine proceeds to a step S424 and subsequent steps.

On the other hand, when the determination result of the step S422 is affirmative, it shows that the command opening rate Avnt is not varying. In this case, after setting the clamp flag FCLPVNDTY of the command opening rate to one in a step S429, the routine proceeds to a step S430 and subsequent steps.

In the step S345 of FIG. 67 described above, the clamp flag FCLPVNDTY is used to determine whether or not feedback control of the opening rate is permitted. The clamp flag FCLPVNDTY varies from zero to one when the variation of the command opening rate Avnt is complete. In this case, as it is determined that feedback control of the opening rate is no longer necessary, the clamp flag FCLPVNDTY is set to one.

In the step S424, the controller 41 compares the command opening rate Avnt and the immediately preceding value $Avnt_{n-1}$ of the command opening rate. When Avnt is larger than $Avnt_{n-1}$, it shows that the actuator 54 is opening the variable nozzle 53. In this case, the subroutine sets an actuator advance correction gain Gkact equal to a constant value GKVACTP# for opening in a step S425, sets a time constant equivalent value Tcact for actuator advance correction equal to a constant value TCVACTP# for opening in a step S426, and proceeds to a step S432.

On the other hand, when Avnt is not larger than $Avnt_{n-1}$, the actuator 54 is closing the variable nozzle 53. In this case, the subroutine sets the actuator advance correction gain Gkact equal to a constant value GKVACTN# for closing in a step S427, sets the time constant equivalent value Tcact for actuator advance correction equal to a constant value TCVACTN# for closing in a step S428, and then proceeds to the step S432.

Here, GKVACTP#<GKVACTN# and TCVACTP#<TCVACTN#. The operation whereby the pressure actuator 54 closes the variable nozzle 53 is performed in opposition to the exhaust gas pressure. Therefore, the actuator advance correction gain Gkact in this case must be set larger than when the variable nozzle 53 is opened. Conversely, the time constant of the actuator advance correction when the pressure actuator 54 closes the variable nozzle 53 must be set smaller than when the variable nozzle 53 is opened. As the time constant equivalent value Tcact is the inverse of the time constant, the value when the pressure actuator 54 closes the variable nozzle 53 must be set larger than the value when the variable nozzle 53 is opened.

When the clamp flag FCLPVNDTY of the command opening rate is set to one in the step S429, in the subsequent step S430, the controller 41 sets the actuator advance correction gain Gkact equal to a value $Gkact_{n-1}$ set on the immediately preceding occasion the subroutine was executed.

In a subsequent step S431, the time constant equivalent value Tcact is set equal to a value $Tcact_{n-1}$ set on the immediately preceding occasion the subroutine was executed, and the routine proceeds to the step S432.

In the step S432, the opening prediction value Cvact is calculated by the following equation (34) using the time constant equivalent value Tcact and command opening rate Avnt.

$$Cvact = Avnt \cdot Tcact + Cvact_{n-1} \cdot (1 - Tcact) \qquad (34)$$

where, $Cvact_{n-1}$=opening prediction value Cvact calculated on the immediately preceding occasion the subroutine was executed.

Further, in a next step S433, the final command opening rate Trvnt is calculated by the following equation (35) using the opening prediction value Cvact and command opening rate Avnt.

$$Trvnt = Gkact \cdot Avnt - (Gkact - 1) \cdot Cvact_{n-1} \qquad (35)$$

The significance of the processing of the steps S432 and S433 is identical to that of the calculation of the intermediate value Rqec and target EGR amount Tqec in the steps S24 and S25 of FIG. 6.

Hence, in the subroutine of FIG. 82, advance processing is performed taking account only of the response delay of the pressure actuator 54. The advance correction related to the gas flow lag dependent on the intake air, exhaust gas flowrate and turbo lag is performed by the subroutine of FIG. 60 described above.

Figure 83:
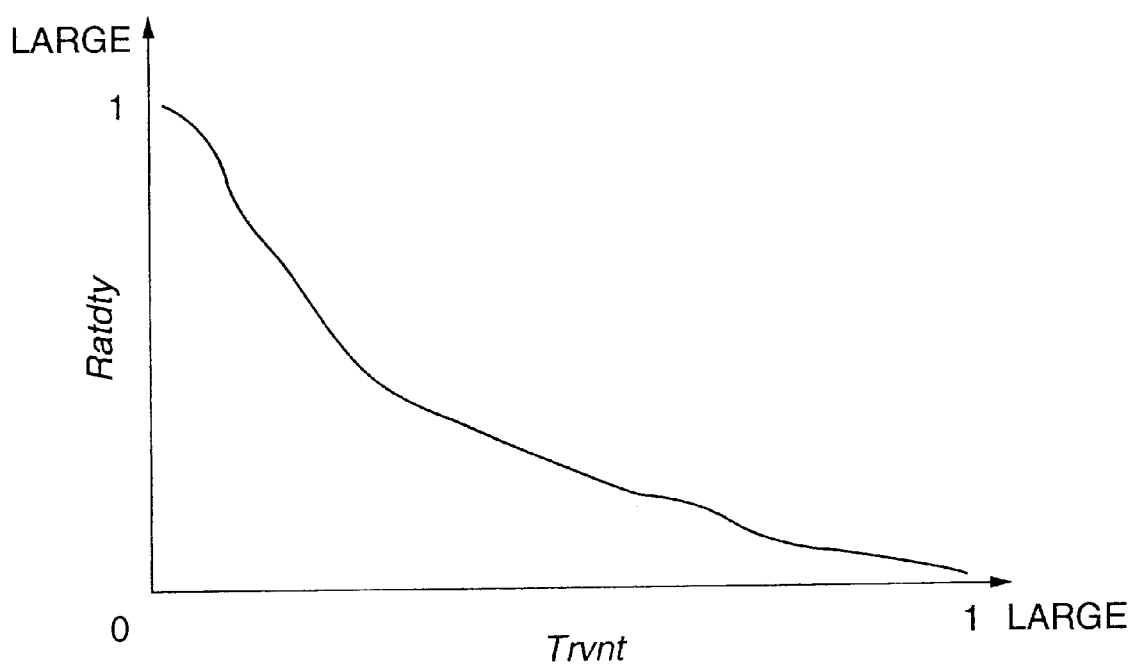
FIG. 83 is a diagram describing the contents of a map of the command opening rate linearization processing value Ratdty stored by the controller.

After calculating the final command opening rate Trvnt in this way, the controller 41 calculates a command opening rate linearization processing value Ratdty in a step S414 of FIG. 81. The command opening rate linearization processing value Ratdty is calculated by looking up a map whereof the contents are shown in FIG. 83 which is prestored in the controller 41, based on the final command opening rate Trvnt.

This linearization processing is required when the opening rate or opening surface area of the variable nozzle 53, and the duty signal output by the controller 41 through the pressure control valve 56, have a nonlinear correspondence.

Returning now to the main routine of FIG. 38, after the controller 41 calculates the command opening rate linearization processing value Ratdty, a duty value Dtyvnt of the duty signal output to the pressure control valve 56 is calculated in a step S247. This calculation is performed using the subroutine of FIG. 84.

Figure 84:
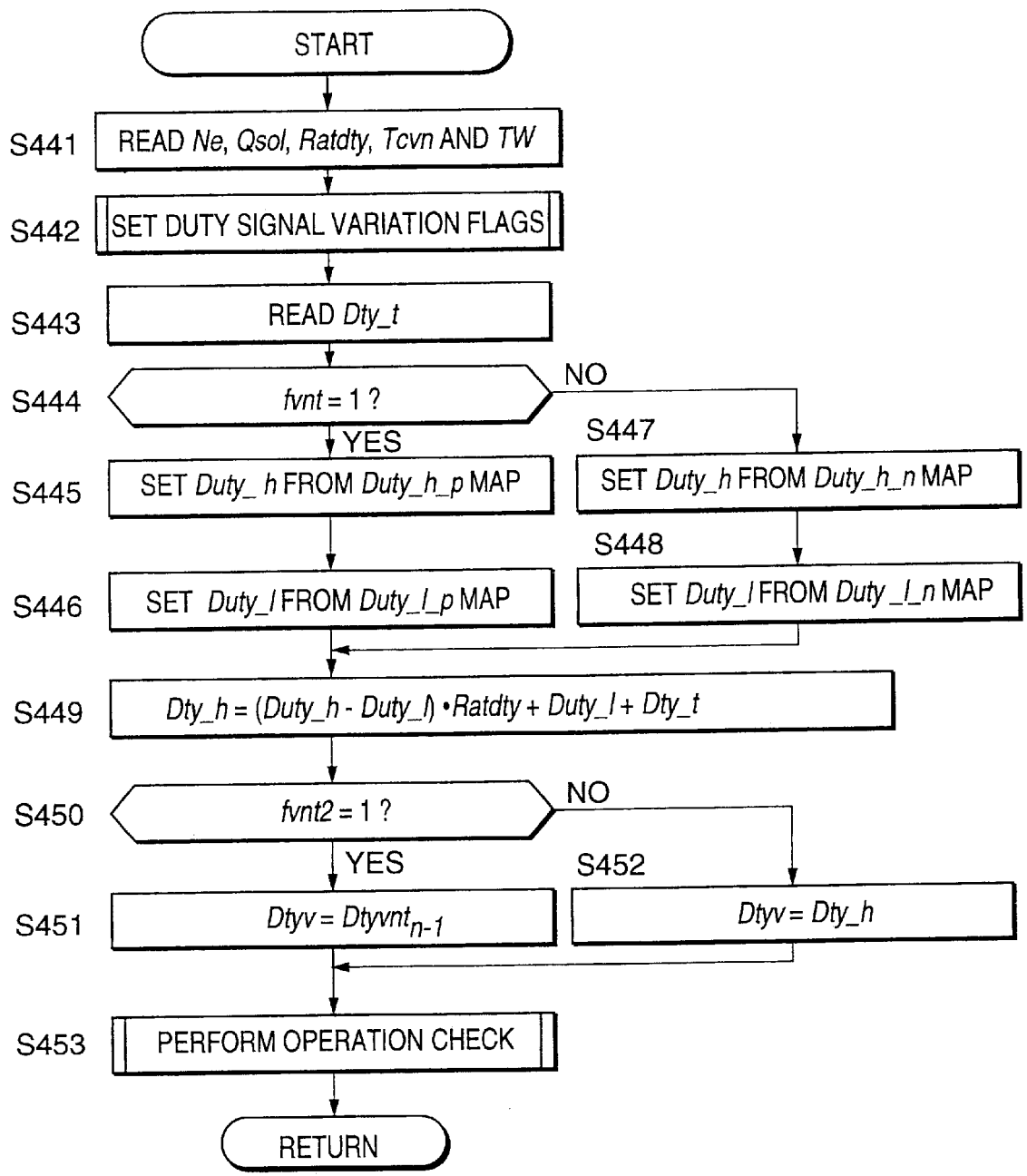
FIG. 84 is a flowchart describing a subroutine for calculating a command duty value Dtyv output to the pressure control valve, performed by the controller.

Referring to FIG. 84, in a step S441, the controller 41 reads the engine rotation speed Ne, target fuel injection amount Qsol, linearization processing value Ratdty of the command opening rate, advance correction time constant inverse value Tcvnt and cooling water temperature Tw of the diesel engine 1.

Figure 85:
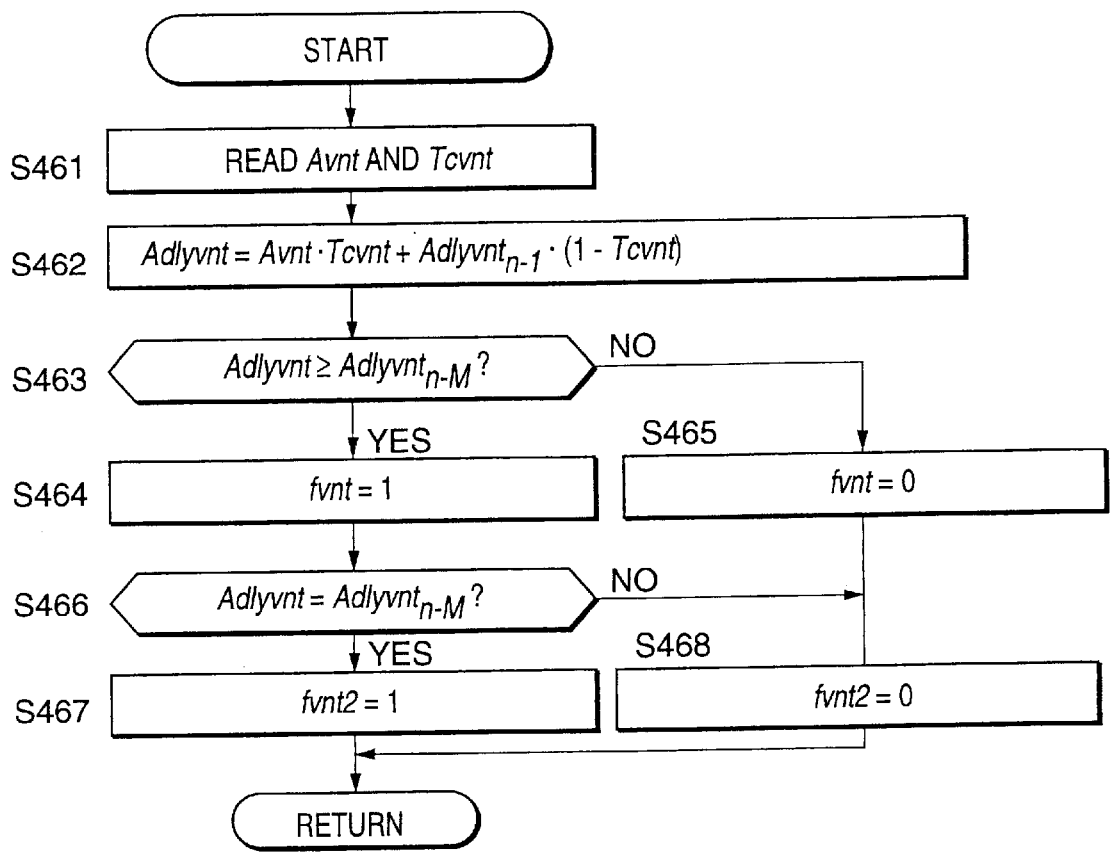
FIG. 85 is a flowchart describing a subroutine for setting a duty hold flag fvnt2 performed by the controller.

In a step S442, duty signal variation flags are set using the subroutine shown in FIG. 85.

Referring to FIG. 85, the controller 41 first reads the command opening rate Avnt and the advance correction time constant inverse value Tcvnt in a step S461.

In a next step S462, a command opening rate prediction value Adlyvnt is calculated by the following equation (36).

$$Adlyvnt = Avnt \cdot Tcvnt + Adlyvnt_{n-1} \cdot (1 - Tcvnt) \qquad (36)$$

where, $Adlyvnt_{n-1}$=value of Adlyvnt calculated on the immediately preceding occasion the subroutine was executed.

Here, the relation between the command opening rate Avnt and the command opening rate prediction value Adlyvnt corresponds to the relation between the target opening rate Rvnt and the opening prediction value Cavnt.

In a following step S463, the command opening rate prediction value Adlyvnt is compared with a command opening rate prediction value $Adlyvnt_{n-M}$ calculated by the subroutine executed M times ago.

When $Adlyvnt \geq Adlyvnt_{n-M}$, the command opening rate is increasing or constant. In this case, the subroutine sets an operation direction flag fvnt to one in a step S464, and proceeds to a step S466.

In the step S466, it is determined whether or not Adlyvnt= $Adlyvnt_{n-M}$. When Adlyvnt=$Adlyvnt_{n-M}$, in a step S467, a duty hold flag fvnt2 is set to one, and the subroutine is terminated.

When Adlyvnt=Adlyvnt$_{n-M}$ is not satisfied, the routine proceeds to a step S468.

When Adlyvnt<Adlyvnt$_{n-M}$ in the step S463, it shows that the command opening rate is decreasing. In this case, the subroutine resets the operation direction flag fnvt to zero in a step S465, and the routine proceeds to the step S468.

In the step S468, the duty hold flag fvnt2 is reset to zero, and the subroutine is terminated.

Thus, after setting the two flags fvnt and fvnt2, the controller 41 reads a duty value temperature correction amount Dty_t in a step S443 of FIG. 84. The duty value temperature correction amount Dty_t is calculated by a subroutine of FIG. 86 performed independently in synchronism with the REF signal.

Figure 86:
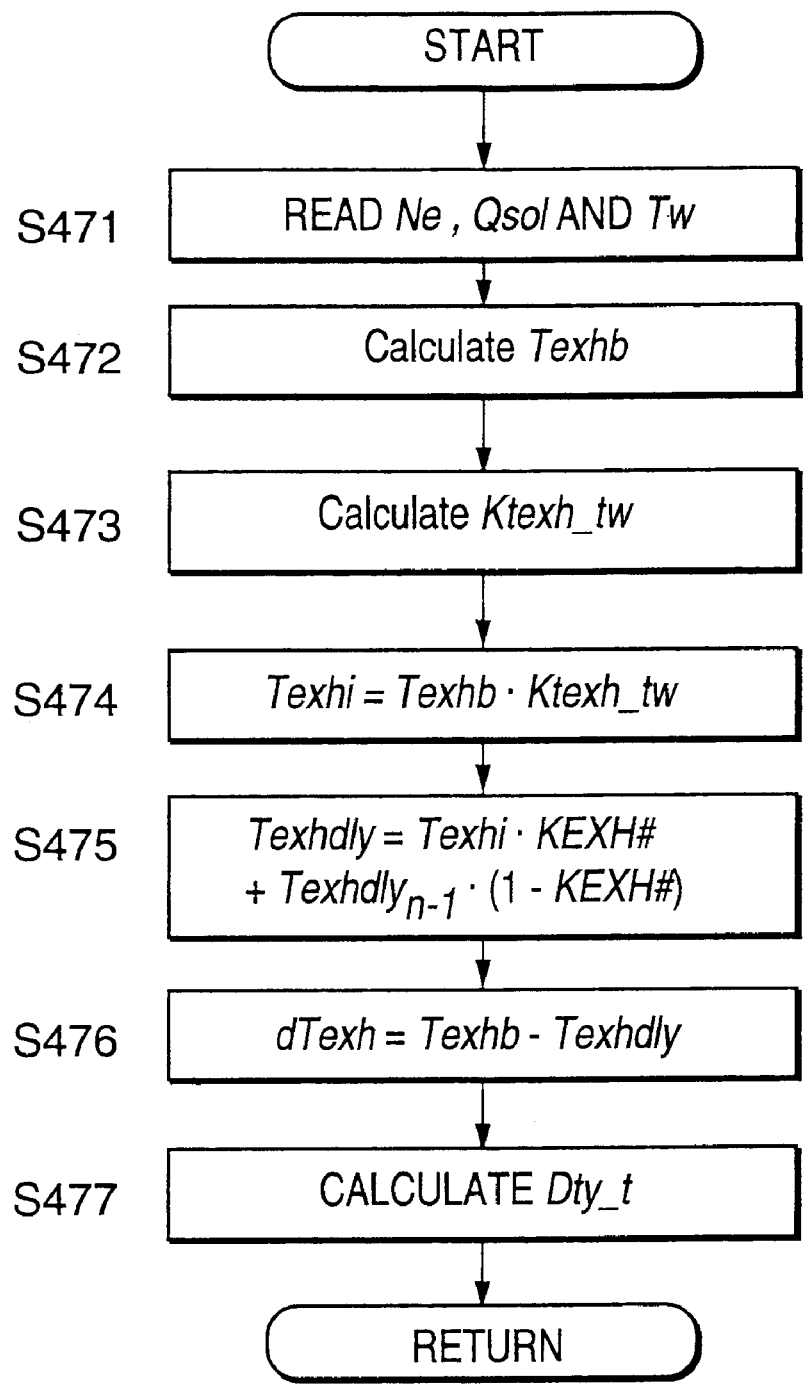
FIG. 86 is a flowchart describing a subroutine for calculating a temperature correction amount Dty_t performed by the controller.

Referring to FIG. 86, in a step S471, the controller 41 first reads the engine rotation speed Ne, target fuel injection amount Qsol and cooling water temperature Tw.

Figure 87:
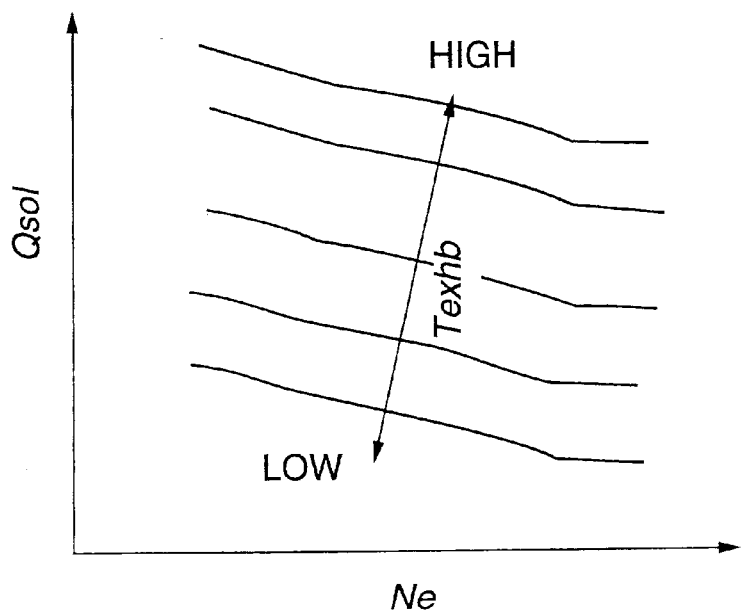
FIG. 87 is a diagram describing the contents of a map of a basic exhaust gas temperature Texhb stored by the controller.

In a step S472, a basic exhaust gas temperature Texhb is calculated from the engine rotation speed Ne and target fuel injection amount Qsol by looking up a map shown in FIG. 87 previously stored in the memory of the controller 41. The basic exhaust gas temperature Texhb is the exhaust gas temperature after the diesel engine 1 has completed warming up.

Figure 88:
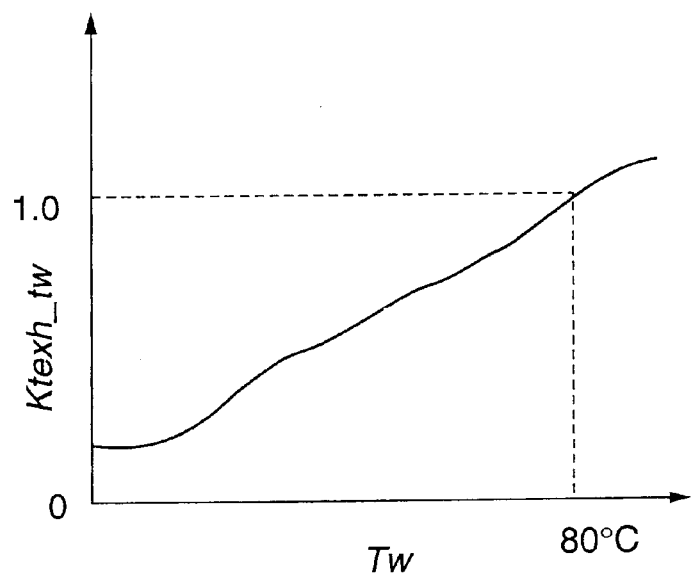
FIG. 88 is a diagram describing the contents of a map of a water temperature correction coefficient Ktexh_Tw stored by the controller.

In a next step S473, a water temperature correction coefficient Ktexh_tw is calculated by looking up a map shown in FIG. 88 stored in the controller 41, based on the cooling water temperature Tw.

In a step S474, an exhaust gas temperature Texhi is calculated by multiplying the basic exhaust gas temperature Texhb by the water temperature correction coefficient Ktexh_tw.

In a next step S475, a real exhaust gas temperature Texhdly is calculated by adding a first order processing delay to the exhaust gas temperature Texhi by the following equation (37). This value is a value which takes account of the delay due to the heat inertia in the variation of exhaust gas temperature.

$$Texhdly = Texhi \cdot KEXH\# + Texhdly_{n-1} \cdot (1-KEXH\#) \quad (37)$$

where, KEXH#=constant, and
Texhdly$_{n-1}$=Texhdly calculated on the immediately preceding occasion when the subroutine was executed.

In a following step S476, a difference dTexh of the basic exhaust gas temperature Texhb and this real exhaust gas temperature Texhdly is calculated.

Figure 89:
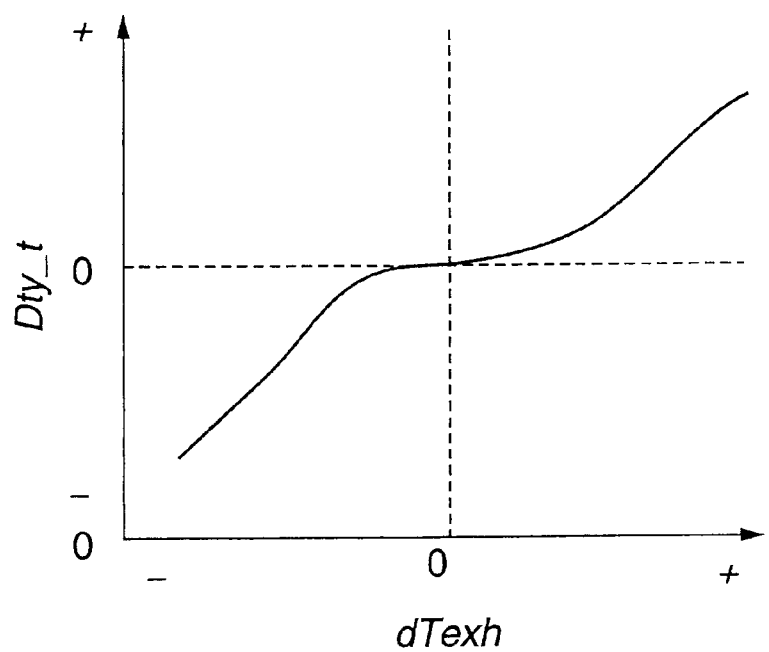
FIG. 89 is a diagram describing the contents of a map of the temperature correction amount Dty_t stored by the controller.

In a last step S477, the duty value temperature correction amount Dty_t is calculated by looking up a map shown in FIG. 89 previously stored in the memory of the controller 41, based on the difference dTexh. The meaning of the processing of the steps S476 and S477 will be described in detail later.

After the end of the subroutine, the controller 41 returns to the subroutine of FIG. 84 and performs processing after the step S444. Steps S444–S449 are steps which add hysteresis processing to the duty value.

Figure 90:
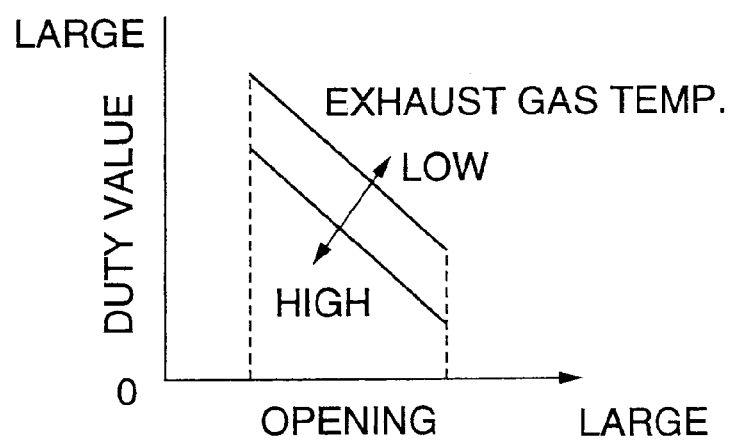
FIG. 90 is a diagram describing an effect of the temperature on the relation between the duty value of the pressure control valve and the opening rate of the variable nozzle.
Figure 95:
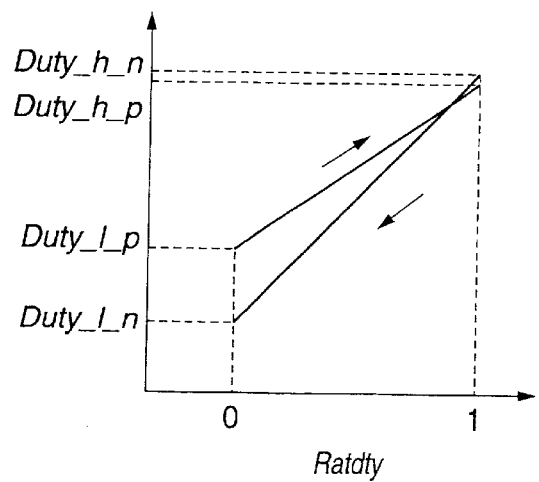
FIG. 95 is a diagram describing a hysteresis in the relation between the command opening rate linearization processing value Ratdty an d the duty values according to this invention.

Describing this hysteresis processing with reference to FIG. 95, when the linearization processing value Ratdty of the command opening rate Avnt is increasing, the duty value is made to vary according to a straight line which joins a command signal Duty_l_p when the variable nozzle 53 is fully open, and a command signal Duty_h_p when the variable nozzle 53 is fully closed. On the other hand, when the linearization processing value Ratdty is decreasing, the duty value is made to vary according to a straight line which connects a command signal Duty_l_n when the variable nozzle 53 is fully open, and a command signal Duty_h_n when the variable nozzle 53 is fully closed. In the drawing, two lines intersect in the region where the variable nozzle 53 is nearly closed, but this region is a region which is not used in actual control of the pressure control valve 56. These characteristics are set assuming that the diesel engine 1 has completely warmed up. When the real exhaust gas temperature Texhdly is low, the pressure actuator 54 has the characteristic of opening the variable nozzle 53 larger for the same duty value, as shown in FIG. 90. Hence, it is necessary to apply the temperature correction amount Dty_tcalculated in the steps S476, S477 of FIG. 86, to compensate the difference in the characteristic of the pressure actuator 54 due to the exhaust gas temperature.

Figure 91:
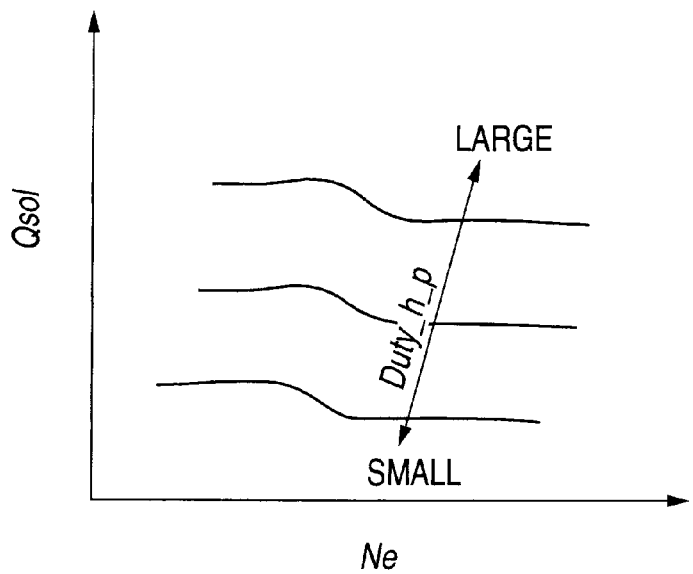
FIG. 91 is a diagram of the contents of a map of a duty value Duty_h_p when the variable nozzle is fully closed while the command opening rate linearization processing value Ratdty is increasing, stored by the controller.

Now, the controller 41 determines the operation direction flag fvnt in the step S444. When the operation direction flag fvnt is one, i.e., when the command opening rate Avnt is increasing or constant, the processing of steps S445, S446 is performed. In the step S445, a duty value Duty_h when the variable nozzle 53 is fully closed, is calculated based on the target fuel injection amount Qsol by looking up a Duty_h_p map shown in FIG. 91.

In the following step S446, a duty value Duty_l when the variable nozzle 53 is fully open, is calculated by looking up a Duty_l_p map shown in FIG. 92. After this processing, the subroutine proceeds to a step S449.

Figure 93:
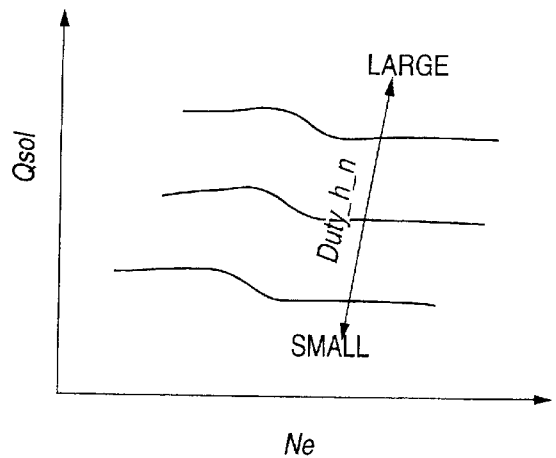
FIG. 93 is a diagram of the contents of a map of a duty value Duty_h_n when the variable nozzle is fully closed while the command opening rate linearization processing value Ratdty is decreasing, stored by the controller.

When the operation direction flag fvnt is zero in the step S444, i.e., when the command opening rate Avnt is decreasing, the processing of steps S447, S448 is performed. In the step S447, the duty value Duty_h when the variable nozzle 53 is fully closed, is calculated based on the target fuel injection amount Qsol by looking up a Duty_h_n map shown in FIG. 93. In the following step S448, the duty value Duty_l when the variable nozzle 53 is fully open, is calculated based on the target fuel injection amount Qsol by looking up a Duty_l_n map shown in FIG. 94.

After this processing, the subroutine proceeds to a step S449.

In the step S449, a command duty basic value Dty_h is calculated by performing linear interpolation processing by the following equation (38) using the duty values Duty_h, Duty_l found by the above processing, the linearization processing value Ratdty of the command opening rate Avnt, and the temperature correction amount Dty_t.

$$Dty\_h = (Duty\_h - Duty\_l) \cdot Ratdty + Duty\_l + Dty\_t \quad (38)$$

By changing the straight line used for linear interpolation processing in the case where the command opening rate Avnt, is decreasing, and the case where it is not, the command duty basic value Dty_h is made smaller, for the same linearization processing value Ratdty, in the case where the command opening rate Avnt is decreasing than in other cases.

In a next step S450, the duty hold flag fvnt2 is determined. When the duty hold flag fvnt2 is one, i.e., the command opening rate prediction value Adlyvnt is not changing, a command duty value Dtyv is set equal to the duty value Dtyvnt$_{n-1}$ calculated on the immediately preceding occasion the subroutine was executed, in a step S451. The duty value Dtyvnt$_{n-1}$ will be described in detail later.

When the duty hold flag fvnt2 is zero, i.e., when the command opening rate prediction value Adlyvnt is changing, in a step S452, the command duty value Dtyv is set equal to the command duty basic value Dty_h calculated in the step S449.

Figure 96:
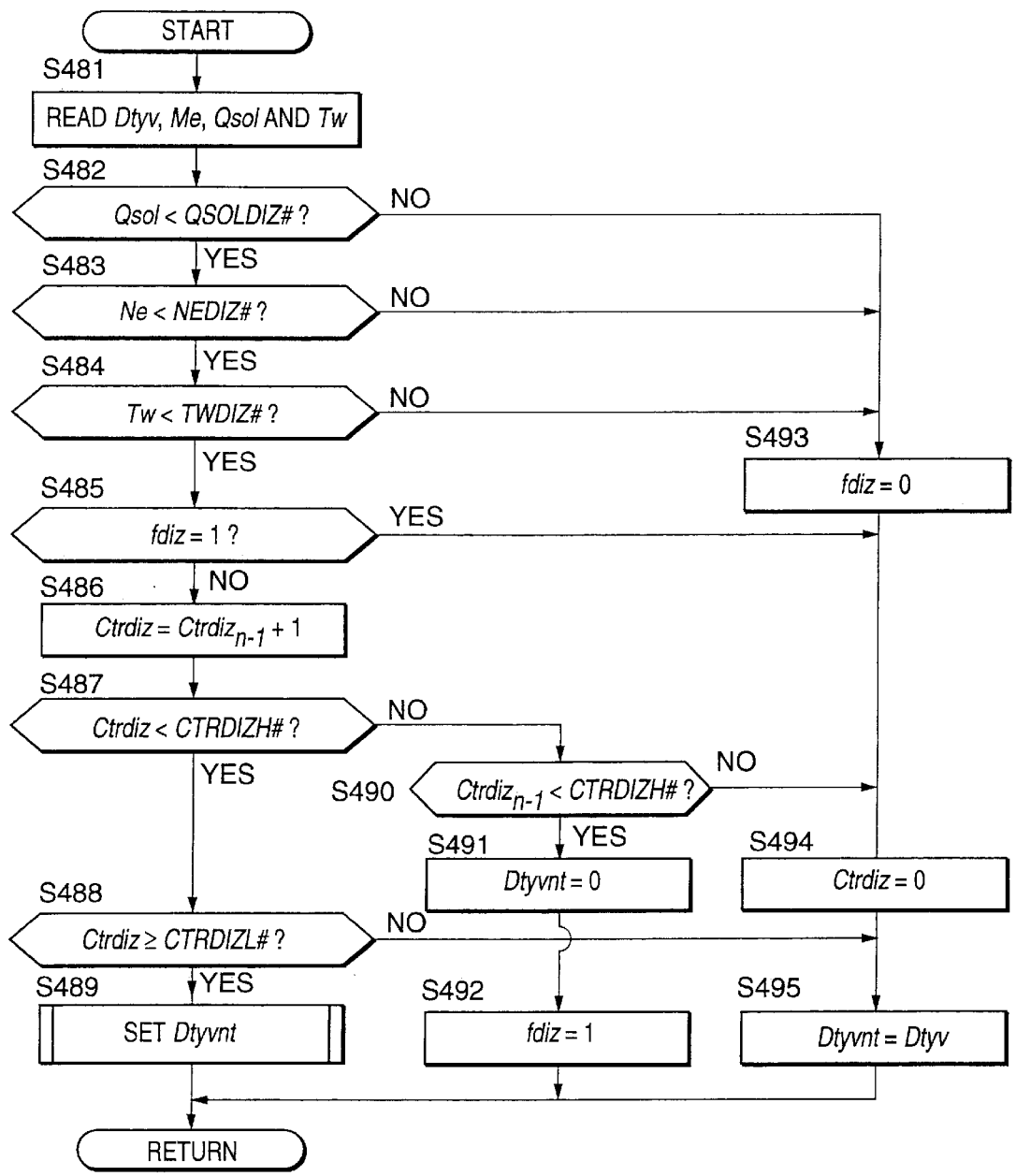
FIG. 96 is a flowchart describing a subroutine for checking the operation of the variable nozzle performed by the controller.

Thus, after determining the command duty value Dtyv in the step S451 or step S452, in a final step S453, the controller 41 performs an operation check on the variable nozzle 53 using the subroutine of FIG. 96 based on the command duty value Dtyv.

Referring to FIG. 96, in a step S481, the controller 41 first reads the command duty value Dtyv, engine rotation speed Ne, target fuel injection amount Qsol and the cooling water temperature Tw.

In subsequent steps S482–S485, it is determined whether or not operation check conditions are satisfied. An operation check is performed only when all these conditions are satisfied.

In the step S482, it is determined whether or not the target fuel injection amount Qsol is less than a predetermined value QSOLDIZ#. When this condition is satisfied, it means that the diesel engine 1 is performing fuel cut.

In the step S483, it is determined whether or not the engine rotation speed Ne is less than a predetermined value NEDIZ#. When this condition is satisfied, it means that the rotation speed Ne of the diesel engine 1 is in an intermediate or low speed region.

In the step S484, it is determined whether or not the cooling water temperature Tw is less than a predetermined value TWDIZ#. When this condition is satisfied, it means that warming up of the diesel engine 1 is not complete.

In the step S485, it is determined whether or not an operation check flag Fdiz is zero. When this condition is satisfied, it means that an operation check has not yet been performed.

When all the conditions are satisfied, an operation check counter value CtFdiz is incremented in a step S486, and the routine proceeds to a step S487.

If any of the determination results of the steps S482–S484 is not satisfied, the subroutine resets the operation check flag Fdiz to zero in a step S493, and proceeds to a step S494. However, when the operation check flag fdiz is one in the step S485, it proceeds to the step S494 immediately.

In a step S487, the operation check counter value CtFdiz is compared with a predetermined upper limiting value CTRDIZH#.

When the operation check counter value CtFdiz is smaller than the upper limiting value CTRDIZH#, in a step S488, the operation check counter value CtFdiz is compared with a predetermined lower limiting value CTRDIZL#. When the operation check counter value CtFdiz is not less than the lower limiting value CTRDIZL#, in a step S489, a duty value Dtyvnt is set for checking operation using a subroutine shown in FIG. 97.

The upper limiting value CTRDIZH# is set to, for example, seven seconds, and the lower limiting value CTRDIZL# is set to, for example, two seconds. In this case, the duty value for checking operation is set only in a five second interval of the difference between the upper limiting value and lower limiting value.

Here, referring to FIG. 97, a subroutine for setting the duty value for operation check will be described.

The controller 41, in a step S501, first reads the operation check counter value CtFdiz and engine rotation speed Ne.

Figure 98:
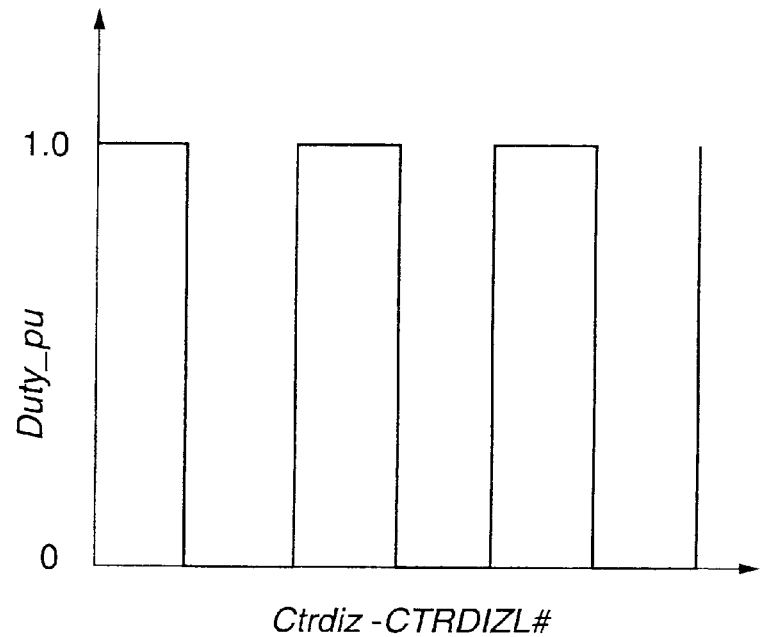
FIG. 98 is a diagram describing the contents of a map of a control pattern value Duty_pu stored by the controller.

In a following step S502, a control pattern value Duty_pu is set by looking up a map shown in FIG. 98 based on the difference of the operation check counter value CtFdiz and lower limiting value CTRDIZL#. This map is previously stored in the memory of the controller 41 The control pattern value Duty_pu is set so that it repeatedly varies between zero and one with a short period according to the elapsed time after the operation check counter value CtFdiz exceeds the lower limiting value CTRDIZL#.

Figure 99:
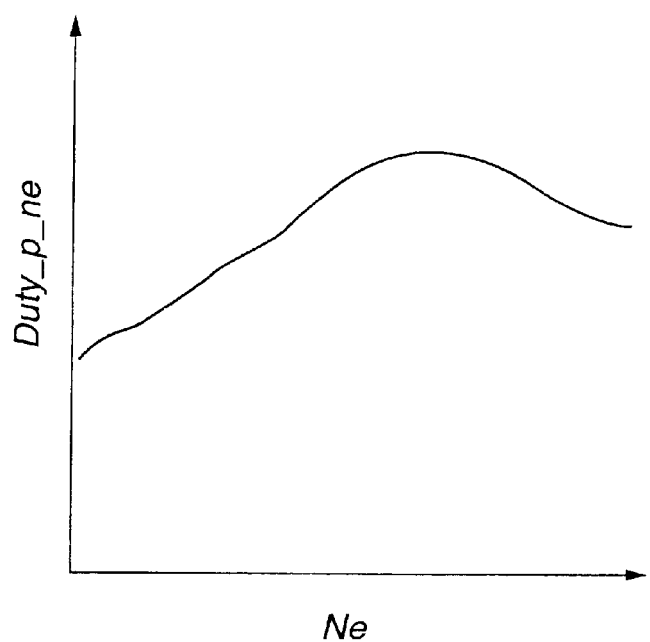
FIG. 99 is a diagram describing the contents of a map of a duty value Duty_p_ne for checking the operation of the variable nozzle, stored by the controller.

In a next step S503, a duty value Duty_p_ne commanded to the pressure control valve 56 is calculated by looking up a map shown in FIG. 99 previously stored in the memory of the controller 41, based on the engine rotation speed Ne. The duty value Duty_p_ne is set supposing that the duty for checking the opening and closing operation of the variable nozzle 53 differs according to the engine rotation speed Ne. For example, when the variable nozzle 53 is to be closed, it must close against the exhaust gas pressure. The exhaust gas pressure increases in accordance with the increase in engine rotation speed Ne.

Further, when the engine rotation speed Ne is in the high-speed region, the closing of the variable nozzle 53 to check operation has a major impact on the engine running environment. Therefore, in the high speed region, the duty value Duty_p_ne is decreased as the engine rotation speed Ne increases so as to reduce the impact on the engine running environment.

In a following step S504, the duty value Dtyvnt is calculated by multiplying the duty value Duty_p_ne by the control pattern value Duty_pu, and the subroutine is terminated.

Figure 97:
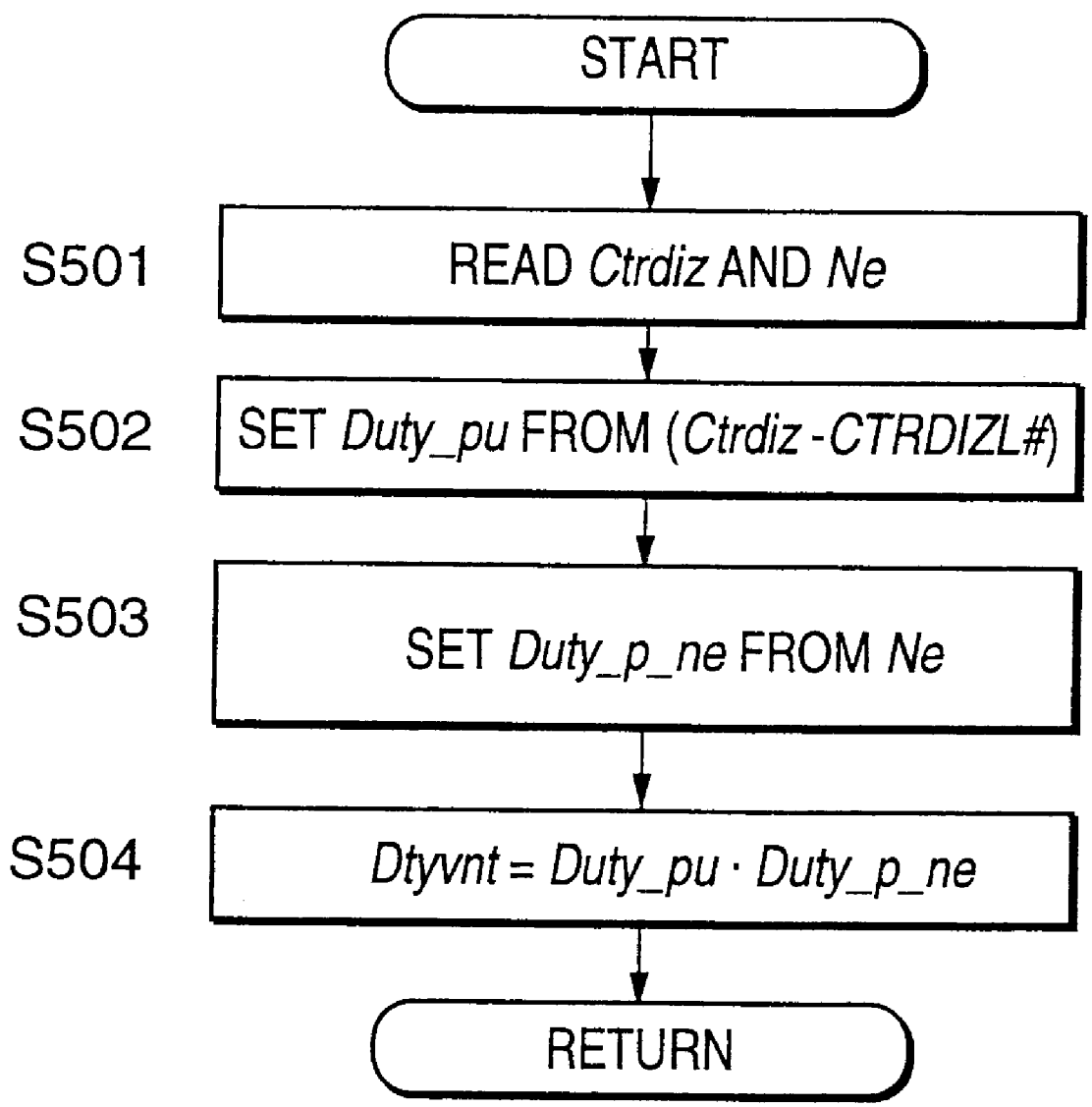
FIG. 97 is a flowchart describing a routine for calculating the duty value Dtyvnt of the pressure control valve performed by the controller.

In this way, by terminating the subroutine of FIG. 97, the processing of the step S489 of FIG. 96 is terminated and the subroutine of FIG. 96 is also terminated.

On the other hand, in the step S487 of FIG. 96, when the operation check counter value CtFdiz is not less than the upper limiting value CTRDIZH#, the processing of the step S490 is performed. Here, an immediately preceding value CtFdiz$_{n-1}$ of the operation check counter value CtFdiz operation is compared with the upper limiting value CTRDIZH#. If the immediately preceding value CtFdiz$_{n-1}$ is less than the upper limiting value CTRDIZH#, it means that CTRDIZH# reached the upper limiting value CTRDIZH# for the first time in the repeat execution of this subroutine, the duty value Dtyvnt is set to zero in a step S491, the operation check flag fdiz is set to one in a step S492, and the subroutine is terminated.

By once setting the duty value Dtyvnt to zero in the step S491 when the operation check is completed, the variable nozzle 53 fully opens. This operation aims to maintain control precision during ordinary control performed thereafter. By setting the operation check flag fdiz to one, the determination result of the step S485 will always be affirmative in the execution of the subroutine thereafter. It means the operation check of the variable nozzle 53 is performed only once after starting the diesel engine 1.

On the other hand, when the immediately preceding value Ctfdiz$_{n-1}$ of the operation check counter value Ctfdiz is not less than the upper limiting value CTRDIZH# in the step S490, the subroutine proceeds to the step S494. In the step S494, the operation check counter value Ctfdiz is reset to zero, and the routine proceeds to a step S495.

When the operation check counter value Ctfdiz is less than the predetermined lower limiting value CTRDIZL# in the step S488, the subroutine also proceeds to the step S495.

In the step S495, the duty value Dtyvnt for operation check is set equal to the command duty value Dtyv determined in the step S451 or step S452 of FIG. 84, and the subroutine is terminated. In this case therefore, the ordinary control of the variable nozzle 53 is performed.

In particular, when operation of the pressure actuator 54 is unstable such as at low temperatures etc., this operation check of the variable nozzle 53 makes the operation of the variable nozzle 53 smooth and increases reliability in control of supercharging pressure.

In this way, by ending the subroutine of FIG. 96, the processing of the subroutine of FIG. 84 is terminated and the routine of FIG. 38 is also terminated.

Thus, according to this invention, feedback control of the opening rate of the variable nozzle 53 of the turbocharger 50 is performed based on the delay processing value tQacd of the target intake fresh air amount tQac as mentioned above.

FIGS. 104A and 105A show the control target value of the opening rate of the variable nozzle and the actual variation of the intake fresh air amount according to the prior art.

As shown in FIG. 104A, when the opening rate of the variable nozzle 53 of the turbocharger 50 is varied correspondingly to the stepwise change of the target fresh air amount tQac, the response time until the real fresh air amount starts to change is several hundred milliseconds, and the time constant of the subsequent intake fresh air amount variation is in units of several seconds as shown by the broken line in the figure that represents a theoretical expectation of the actual intake fresh air amount.

Due to this response delay, an integral correction value Ravfbi amount accumulates, and unlike the theoretical expectation shown by the broken line of FIG. 104A, the real fresh air amount oscillates considerably until it converges to the target value, as shown by the solid line of FIG. 104B.

Next, referring to FIGS. 105A and 105B, when feedback control of the opening rate is performed based on the delay processing value tQacd wherein the variation of target intake fresh air amount tQac is smoothed, the target value of the opening rate slopes gently as shown by the dot-and-dash line of FIG. 105A.

Therefore, a control error Eqac being the difference between the target value and the real value is small, and the integral correction value Ravfbi does not accumulate much as a result.

The real intake fresh air amount is therefore stably controlled to the target value without oscillating, as shown in FIG. 105B. In other words, the real fresh air amount follows a locus substantially equal to the theoretical variation shown by the broken line of FIG. 105A.

If control of the intake fresh air amount is unstable, the intake air pressure and exhaust gas pressure tend to fluctuate, the EGR amount also varies as a result, and the discharge of nitrogen oxides (NOx) will increase.

Therefore, the control whereby the intake fresh air amount is stabilized also has a desirable effect on the exhaust gas composition.

Next, a second embodiment of this invention relating to a subroutine for calculating the target opening rate Rvnt will be described referring to FIG. 56–58.

Figure 56:
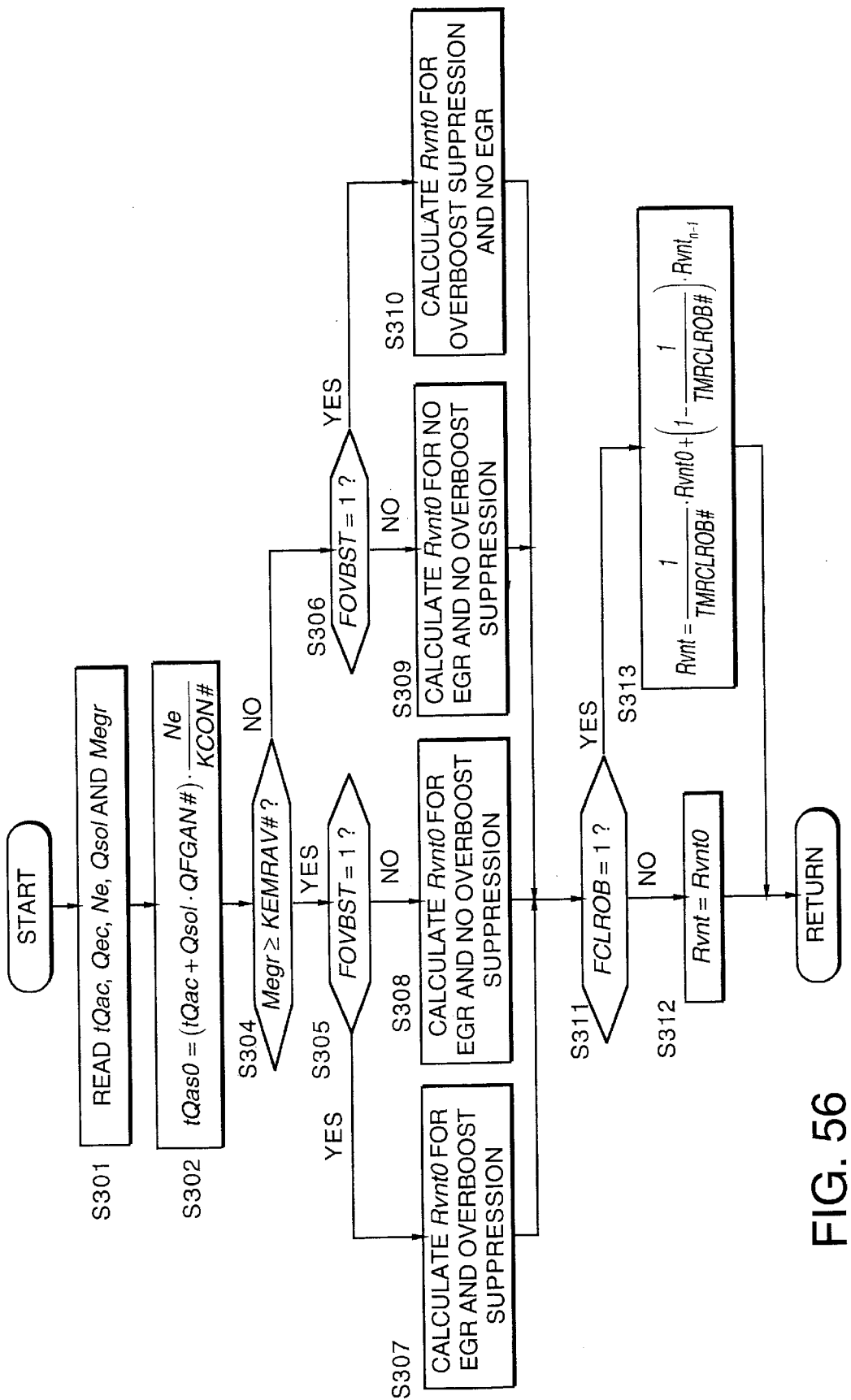
FIG. 56 is similar to FIG. 51, but showing a second embodiment of this invention with respect to the subroutine for calculating the target opening rate Rvnt of the variable nozzle.

According to this embodiment, the target opening rate Rvnt is calculated using a subroutine shown in FIG. 56 instead of the subroutine of FIG. 51.

In the subroutine of FIG. 56, the target EGR rate Megr is used for calculating the target opening rate basic value Rvnt0 instead of the EGR amount equivalent value Qes0 used in the subroutine of FIG. 51. As a result, in this subroutine, the step S303 which calculates the EGR amount equivalent value Qes0 in the subroutine of FIG. 51 is omitted.

Figure 57:
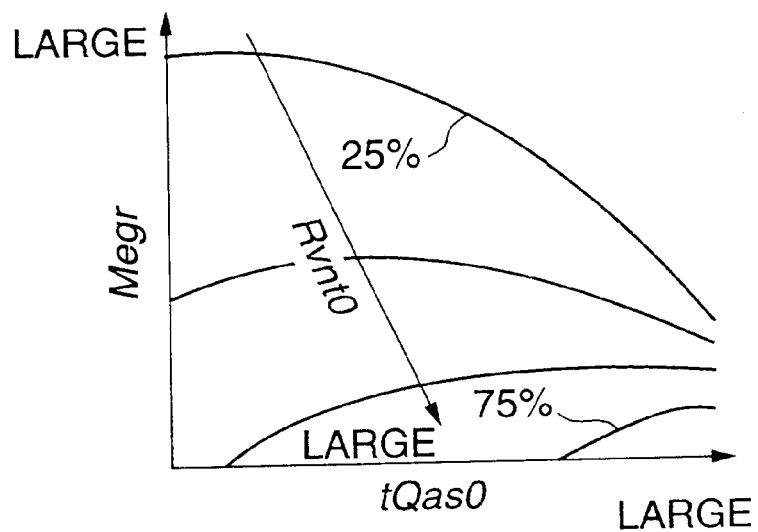
FIG. 57 is a diagram describing the contents of a map of the target opening rate basic value Rvnt0 of the variable nozzle in the EGR operation region under the overboost suppressing control, according to the second embodiment of this invention.

Further, in the step S307, the target opening rate basic value Rvnt0 is calculated from the set intake fresh air amount equivalent value tQas0 and target EGR rate Megr using the map of FIG. 57 instead of the map of FIG. 52. Likewise, in the step S308, the target opening rate basic value Rvnt0 is calculated from the set intake fresh air amount equivalent value tQas0 and target EGR rate Megr using the map of FIG. 58 instead of the map of FIG. 53.

The remaining features of the process are identical to those of the subroutine of FIG. 51.

Figure 58:
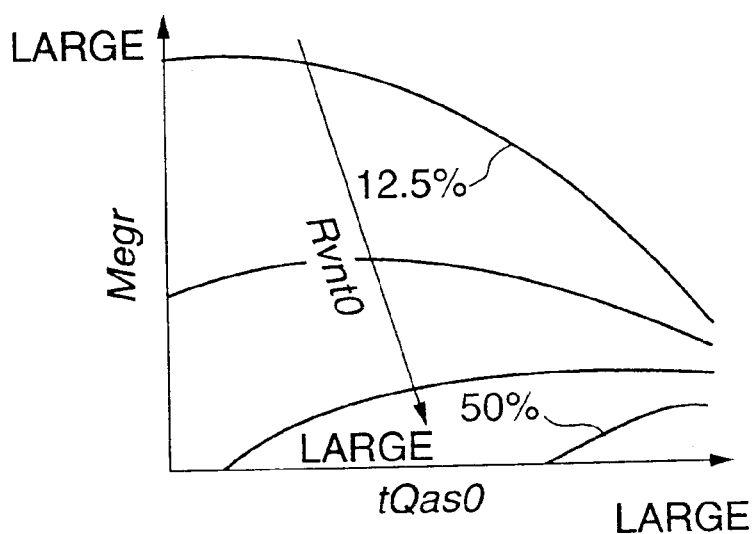
FIG. 58 is a diagram describing the contents of a map of the target opening rate basic value Rvnt0 of the variable nozzle in the EGR operation region under the normal engine control, according to the second embodiment of this invention.

In the maps of FIG. 57 and FIG. 58, the target opening rate basic value Rvnt0 may be set based on the target intake fresh air amount tQac and real EGR rate Megrd instead of setting it based on the set intake fresh air amount equivalent value tQas0 and target EGR rate Megr. Further, the target opening rate basic value Rvnt0 may be set based on the target intake fresh air amount tQac and target EGR rate Megr.

In the transient running state of the diesel engine 1, a delay occurs until the real EGR rate Megrd catches up with the target EGR rate Megr, and due to the deviation from the EGR amount corresponding to the delay, an error occurs in the target opening rate basic value Rvnt0. When the target opening rate basic value Rvnt0 is set by using the real EGR amount Megrd, which is a value obtained by applying delay processing to the target EGR rate Megr, the optimum target intake fresh air amount is obtained for all preselected characteristics including fuel consumption, exhaust gas composition and acceleration performance even in the transient running state of the diesel engine 1. Further, simpler conformity and simplification of control logic can be achieved.

Next, a third embodiment of this invention will be described referring to FIGS. 106 and 107.

Figure 92:
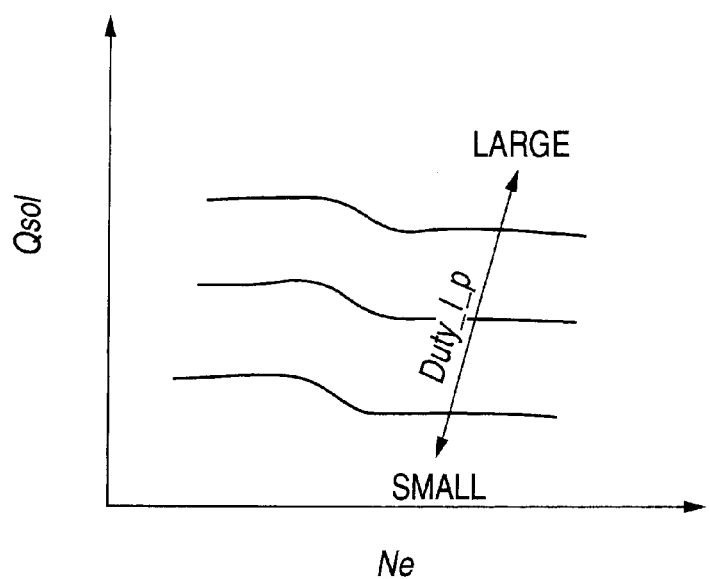
FIG. 92 is a diagram of the contents of a map of a duty value Duty_l_p when the variable nozzle is fully open while the command opening rate linearization processing value Ratdty is increasing, stored by the controller.
Figure 106:
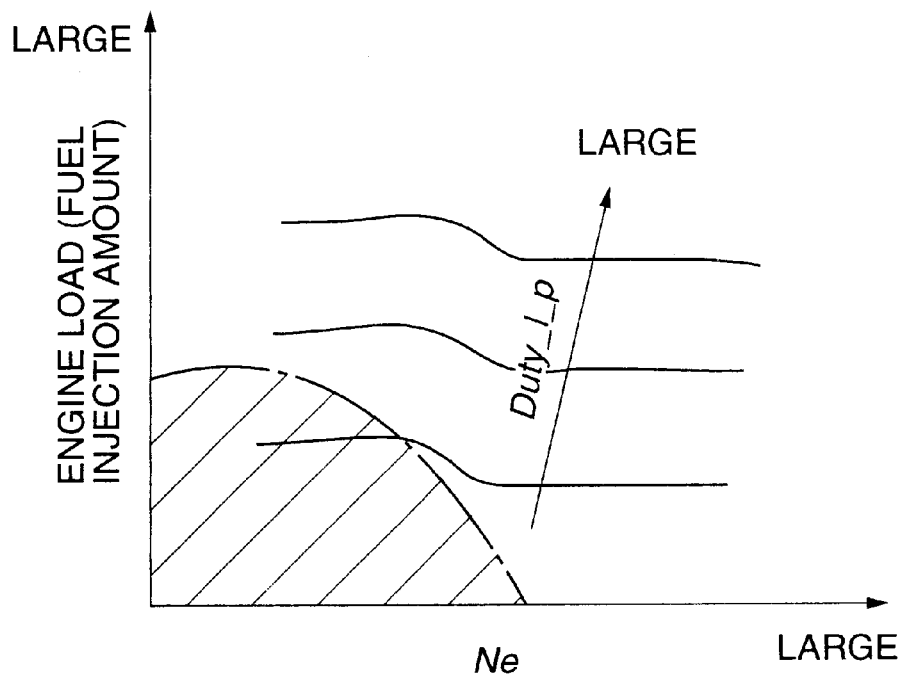
FIG. 106 is similar to FIG. 92, but showing a third embodiment of this invention.
Figure 107:
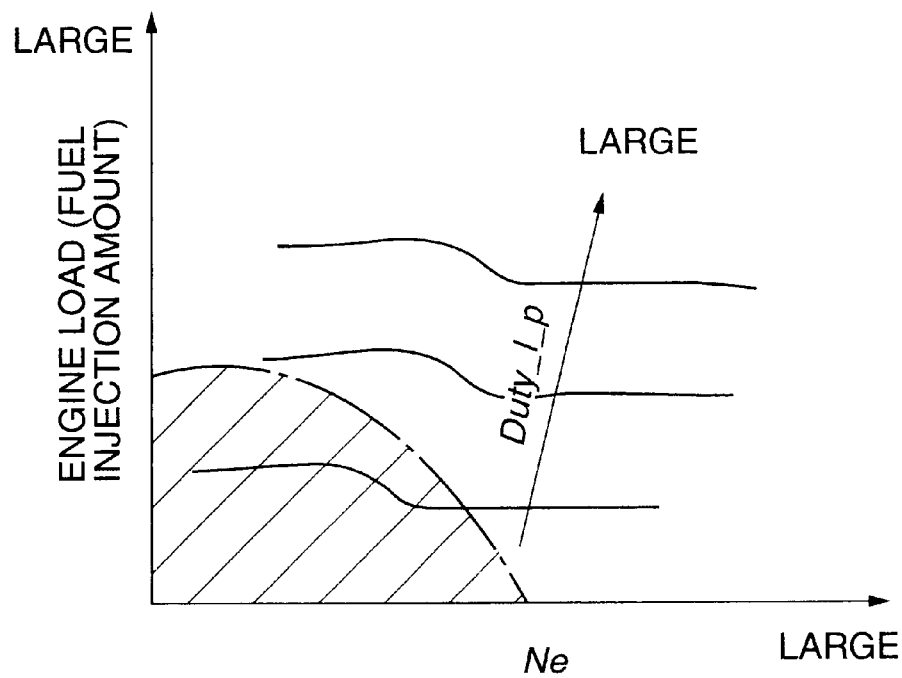
FIG. 107 is similar to FIG. 94, but showing the third embodiment of this invention.

In this embodiment, the map of FIG. 106 is used instead of the Duty_$1_{13}$ p map of FIG. 92 used for hysteresis processing related to the command signal to the pressure control valve 56 in the first or second embodiment. Likewise, the map of FIG. 107 is used instead of the Duty_1_n map of FIG. 94.

In the first and second embodiments, feedback control of the opening rate of the variable nozzle 53 was prohibited in a non-feedback region when the diesel engine 1 was under low load and at a low rotation speed, as shown in the map of FIG. 68. In this embodiment, instead of setting a non-feedback region, the duty value Duty_1 is limited when the variable nozzle 53 is fully open.

Figure 94:
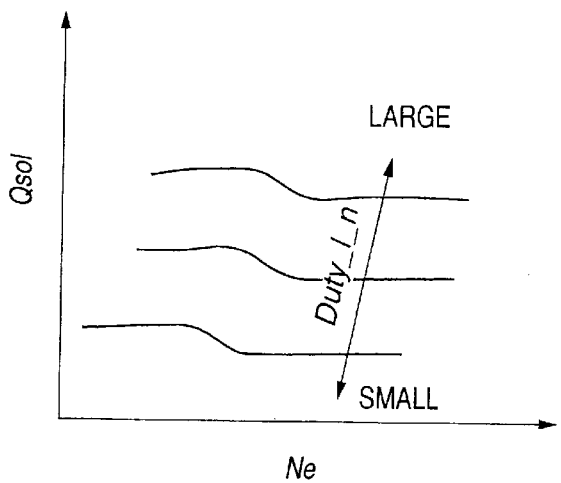
FIG. 94 is a diagram of the contents of a map of a duty value Duty_/_n when the variable nozzle is fully open while the command opening rate linearization processing value Ratdty is decreasing, stored by the controller.

The opening rate of the variable nozzle 53 becomes smaller as the duty value increases. The controllable range of the duty value is, for example, 10–60%. In the maps of FIGS. 92 and 94 which define the duty value when the variable nozzle 53 is fully open, the minimum value of the duty value is set near 10%. In the shaded area of FIGS. 106, 107, this value is fixed to a larger value than 10%.

When the accelerator pedal is depressed and the vehicle is accelerated from the low load, low rotation speed region, when the opening of the variable nozzle 53 is small, the rise of exhaust gas pressure is rapid, and the pressure differential upstream and downstream of the EGR valve 6 becomes large.

As a result, even if the EGR valve 6 has the same opening, the EGR amount will increase when the opening rate of the variable nozzle 53 becomes small. That is, in the low load, low rotation speed region, a desirable effect is obtained in that the control sensitivity of the EGR valve 6 increases by fixing the duty value at a larger value than 10%.

Next, a fourth embodiment of this invention will be described referring to FIGS. 108–111.

Figure 108:
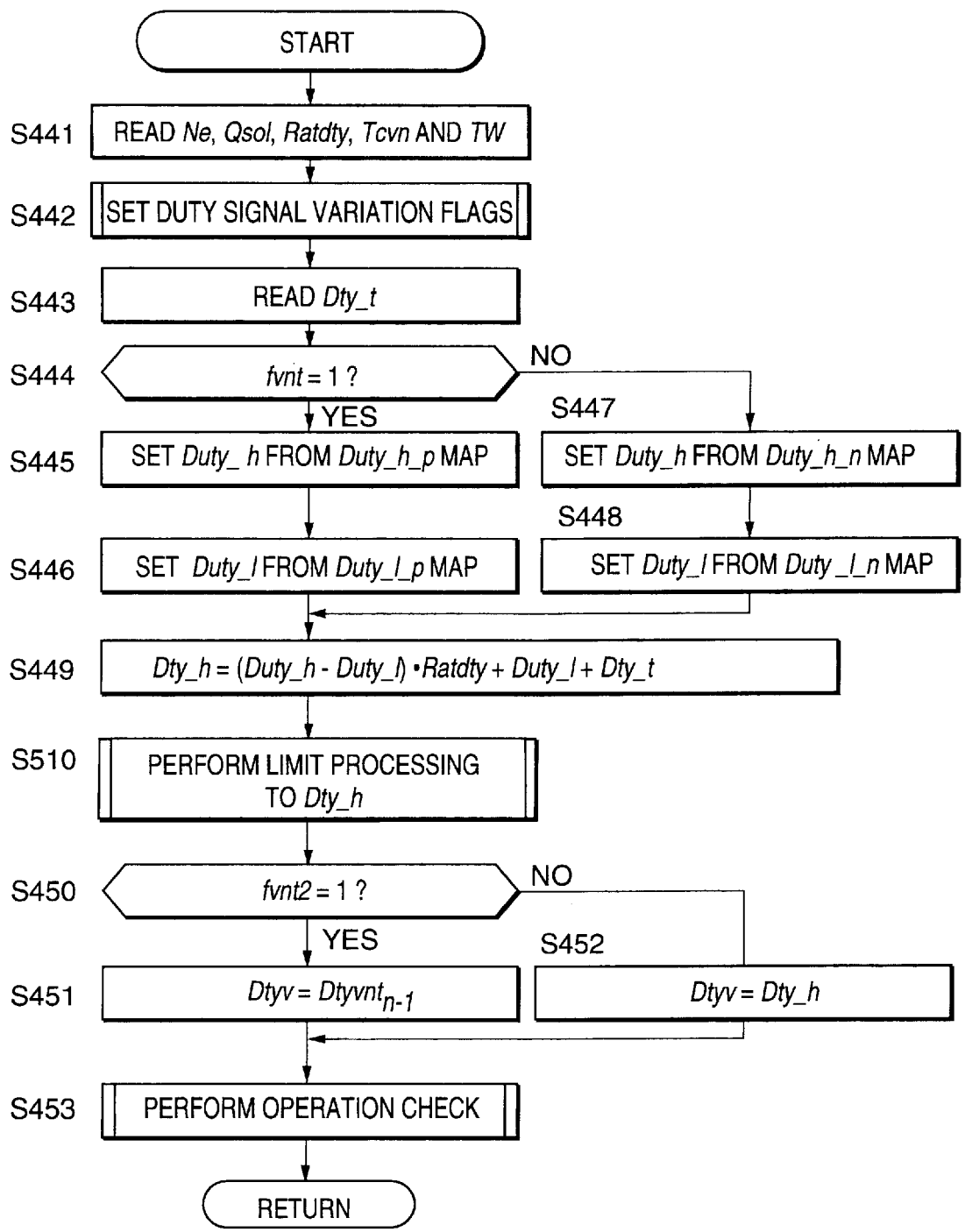
FIG. 108 is similar to FIG. 84, but showing a fourth embodiment of this invention.

In this embodiment, a subroutine shown in FIG. 108 is used instead of the subroutine of FIG. 84 used in the first and second embodiments for calculating the command duty value Dtyv supplied to the pressure control valve 56. As described above, in the first and second embodiments, feedback control of the opening rate of the variable nozzle 53 is prohibited in the low load, low rotation speed region of the diesel engine 1.

In the third embodiment, in the map of the duty value when the variable nozzle 53 is fully open, the duty value in the low load, low rotation speed region is fixed.

Figure 110:
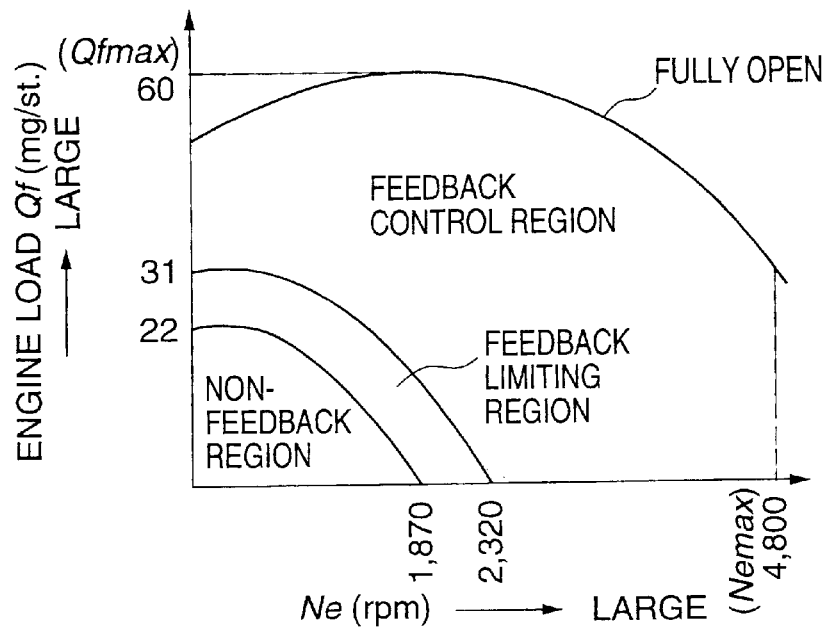
FIG. 110 is a diagram describing the contents of a map of a non-feedback region and a feedback limiting region stored in the controller according to the fourth embodiment of this invention.

In this embodiment, a non-feedback region is made smaller than in the map of FIG. 68, as shown in FIG. 110. Herein, the non-feedback region is defined by a curve connecting the point of Ne=1870 rpm and the point of Qf=22 mg/st.

Also, a feedback limiting region is newly provided between the feedback region and the non-feedback region. The feedback limiting region is set for example between a curve connecting the point of Ne=2320 rpm and the point of Qf=31 mg/st and the non-feedback region.

In the feedback limiting region, processing is added to the command duty basic value Dty_h while performing feedback control of the opening rate of the variable nozzle 53. In this way, the stability of supercharging pressure control in a region where the sensitivity of the exhaust gas amount to a change in the opening rate of the variable nozzle 53 is small, is enhanced.

The only difference from the subroutine of FIG. 84 in the subroutine of FIG. 108 is the provision of a new step S510 which adds limit processing to the command duty basic value Dty_h.

Figure 109:
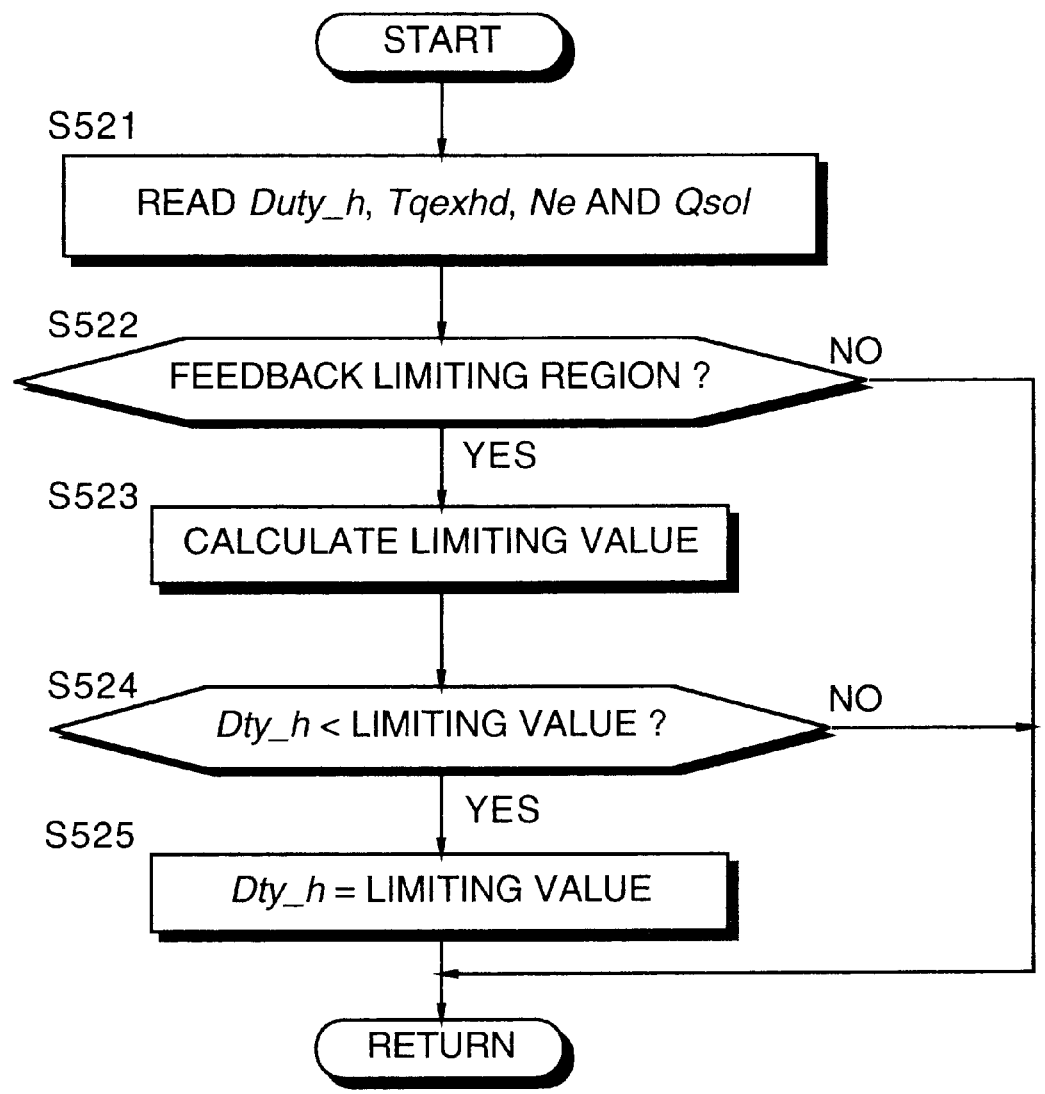
FIG. 109 is a flowchart describing a subroutine for limit processing of a command duty basic value Dty_h performed by the controller according to the fourth embodiment of this invention.

This processing is performed using the subroutine of FIG. 109.

Referring to FIG. 109, firstly, the controller 41 reads the command duty basic value Dty_h, real exhaust gas amount equivalent value Tqexhd, engine rotation speed Ne and target fuel injection amount Qsol in a step 521.

In the following step S522, it is determined whether or not a running condition specified by the engine rotation speed Ne and target fuel injection amount Qsol corresponds to a feedback limiting region in a map having the contents shown in FIG. 110 which is prestored in the controller 41.

When the running condition corresponds to the feedback limiting region, the subroutine proceeds to a step S523.

Figure 111:
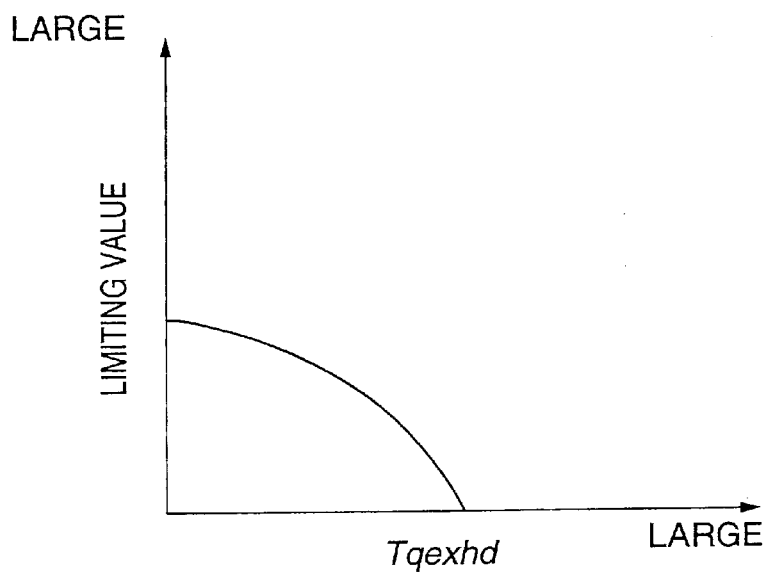
FIG. 111 is a diagram describing the contents of a map of a limiting value stored in the controller according to the fourth embodiment of this invention.

In the step S523, a limiting value is calculated from a real exhaust gas amount equivalent value Tqexhd referring to a map having the contents shown in FIG. 111 which is prestored in the controller 41.

In the third embodiment, whereas the duty value was fixed in the low load, low flowrate region, the limiting value in this embodiment is set to increase, the smaller the real exhaust gas amount equivalent value Tqexhd.

In a following step S524, the command duty basic value Dty_h is compared with the limiting value.

When the command duty basic value Dty_h is smaller than the limiting value, in a next step S525, the command duty basic value Dty_h is set equal to the limiting value, and the subroutine is terminated.

On the other hand, when the running conditions do not correspond to the feedback limiting region in the step S522, or the command duty basic value Dty_h is not smaller than the limiting value in the step S524, the subroutine is immediately terminated.

According to this embodiment, as the command duty basic value Dty_h is limited according to the exhaust gas amount, the opening rate of the variable nozzle 53 can be finely controlled.

The contents of Tokugan 2000-306484 with a filing date of Oct. 5, 2000 in Japan, and Tokugan 2000-309557 with a filing date of Oct. 10, 2000 are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in all of the above embodiments, the target opening rate Rvnt of the variable nozzle 53 is taken as the operating target value of the turbocharger 50, but the target opening surface area may also be used instead of the target opening rate Rvnt.

The map of FIG. 80 which specifies the opening rate reflection coefficient Gkvntlav used in the subroutine of FIG. 77 sets the coefficient Gkvntlav based on the real opening rate Rvnte showing the actual operating state, but to simplify processing, it may also be set based on the target opening rate Rvnt showing the operating target of the turbocharger 50.

The fresh air amount and supercharging pressure correspond with each other, so a delay processing value of the target supercharging pressure may also be used instead of the delay processing value tQacd of the target intake fresh air amount as the parameter for the feedback control of the opening rate of the variable nozzle 53.

The turbocharger to which this invention is applied is not limited to a turbocharger comprising the variable nozzle 53. This invention may also be applied to all variable geometric turbochargers which permit variation of the geometry of the exhaust gas turbine, such as a turbocharger comprising a scroll or diffuser which modifies the exhaust gas passage cross-sectional surface area of the exhaust gas turbine of the turbocharger.

This invention may be applied also to a diesel engine which does not perform exhaust gas recirculation. The diesel engine 1 is not limited to a "low-temperature premixing combustion type" in which the heat generation is produced by a single stage combustion. Thus, the invention may be applied also to an ordinary diesel engine in which diffusion combustion is performed after premixing combustion.

The embodiments of this invention in which an exclusive property or privilege is claimed are defined as follows:

INDUSTRIAL FIELD OF APPLICATION

As mentioned above, this invention suppresses fluctuation of the intake air amount of the engine resulting from operation of the exhaust gas flowpath cross-sectional area adjustment mechanism with which the turbocharger is provided. Therefore, the exhaust gas composition of a diesel engine may be improved by applying this invention to a vehicle diesel engine provided with a turbocharger and EGR device.

What is claimed is:

1. A control device for a turbocharger of an engine, the turbocharger comprising exhaust gas turbine driven by an exhaust gas of the engine, a compressor which supplies fresh air to the engine under a supercharging pressure according to a rotation of the exhaust gas turbine, and a mechanism which adjusts a flowpath cross-sectional area of the exhaust gas led to the exhaust gas turbine, the control device comprising:

a sensor which detects a running state of the engine;

a sensor which detects an intake air amount of the engine; and a controller functioning to:

set an open loop control value of the flowpath cross-sectional area based on the running state, set a target intake air amount of the engine based on the running state;

calculate a processing value wherein predetermined smoothing is performed on the target intake air amount;

calculate a feedback correction amount which makes the intake air amount coincide with the processing value; and control the exhaust gas flowpath cross-sectional area of the mechanism based on the open loop control value and feedback correction amount.

2. The control device as defined in claim 1, wherein the smoothing is realized by performing delay processing on the target intake air amount based on the flow of intake air.

3. The control device as defined in claim 1 wherein the controller is further functioning to calculate the feedback correction amount based on a value obtained by multiplying a difference of the intake air amount and the processing value by a predetermined feedback gain.

4. The control device as defined in claim 3, wherein the control device further comprises a sensor which detects an exhaust gas amount of the engine, and the controller is further functioning to set the feedback gain based on the exhaust gas amount.

5. The control device as defined in claim 3, wherein the controller is further functioning to set the feedback gain based the open loop control value.

6. The control device as defined in claim 1, wherein the running state detection sensor comprises a sensor which detects a rotation speed of the engine and a sensor which detects a load of the engine, and the controller is further functioning to prohibit calculation of the feedback correction amount when the rotation speed is smaller than a predetermined speed and the load is smaller than a predetermined load.

7. The control device as defined in claim 1, wherein the running state detection sensor comprises a sensor which detects a rotation speed of the engine and a sensor which detects a load of the engine, and the controller is further functioning to perform control of the exhaust gas flowpath cross-sectional area adjustment mechanism so that the exhaust gas flowpath cross-sectional area is less than a predetermined value when the rotation speed is less than a predetermined speed and the load is smaller than a predetermined load.

8. The control device as defined in claim 7, wherein the control device further comprises a sensor which detects an exhaust gas amount of the engine, and the controller is further functioning to set the predetermined value to a larger value as the exhaust gas amount increases.

9. The control device as defined in claim 1, wherein the engine further comprises an exhaust gas recirculation device which mixes part of the exhaust gas with the fresh air.

10. The control device as defined in claim 1, wherein the controller is further functioning to calculate the flowpath cross-sectional area from the target intake air amount, and calculate the open loop control value by performing advance processing which compensates a time delay from an operation of the flowpath cross-sectional area adjustment mechanism on the flowpath cross-sectional area until the intake air amount changes.

11. A control device for a turbocharger of an engine, the turbocharger comprising an exhaust gas turbine driven by an exhaust gas of the engine, a compressor which supplies fresh air to the engine under a supercharging pressure according to a rotation of the exhaust gas turbine, and a mechanism which adjusts a flowpath cross-sectional area of the exhaust gas led to the exhaust gas turbine, the control device comprising:

means for detecting a running state of the engine;

means for detecting an intake air amount of the engine;

means for setting an open loop control value of the flowpath cross-sectional area based on the running state, set a target intake air amount of the engine based on the running state;

means for calculating a processing value wherein predetermined smoothing is performed on the target intake air amount;

means for calculating a feedback correction amount which makes the intake air amount coincide with the processing value; and means for controlling the exhaust gas flowpath cross-sectional area of the mechanism based on the open loop control value and feedback correction amount.

12. A control method of a turbocharger of an engine, the turbocharger comprising an exhaust gas turbine driven by an exhaust gas of the engine, a compressor which supplies fresh air to the engine under a supercharging pressure according to a rotation of the exhaust gas turbine, and a mechanism which adjusts a flowpath cross-sectional area of the exhaust gas led to the exhaust gas turbine, the control method comprising:

detecting a running state of the engine;

detecting an intake air amount of the engine;

setting an open loop control value of the flowpath cross-sectional area based on the running state, set a target intake air amount of the engine based on the running state;

calculating a processing value wherein predetermined smoothing is performed on the target intake air amount;

calculating a feedback correction amount which makes the intake air amount coincide with the processing value; and controlling the exhaust gas flowpath cross-sectional area of the mechanism based on the open loop control value and feedback correction amount.

* * * * *